(12) United States Patent
Imamura et al.

(10) Patent No.: US 12,210,124 B2
(45) Date of Patent: Jan. 28, 2025

(54) MANAGEMENT SYSTEM

(71) Applicant: NEC Corporation, Tokyo (JP)

(72) Inventors: Toshiki Imamura, Tokyo (JP); Koya Takata, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 17/789,556

(22) PCT Filed: Jan. 28, 2021

(86) PCT No.: PCT/JP2021/003034
§ 371 (c)(1),
(2) Date: Jun. 28, 2022

(87) PCT Pub. No.: WO2021/181933
PCT Pub. Date: Sep. 16, 2021

(65) Prior Publication Data
US 2023/0031320 A1    Feb. 2, 2023

(30) Foreign Application Priority Data

Mar. 9, 2020  (JP) ................................. 2020-039649

(51) Int. Cl.
*G01S 7/484*   (2006.01)
*G01S 7/481*   (2006.01)
*G01S 17/06*   (2006.01)

(52) U.S. Cl.
CPC ............ *G01S 7/484* (2013.01); *G01S 7/4814* (2013.01); *G01S 17/06* (2013.01)

(58) Field of Classification Search
None
See application file for complete search history.

(56) References Cited

U.S. PATENT DOCUMENTS

| 9,557,630 | B1 | 1/2017 | Marason et al. |
| 9,984,354 | B1 | 5/2018 | Chinoy et al. |
| 10,027,410 | B2 * | 7/2018 | Rains ..................... H04N 23/54 |

FOREIGN PATENT DOCUMENTS

| JP | H01-258193 A | 10/1989 |
| JP | 2003-317169 A | 11/2003 |
| JP | 2008-070923 A | 3/2008 |
| JP | 2009-239800 A | 10/2009 |
| WO | 2017/013863 A1 | 1/2017 |
| WO | 2018/055449 A2 | 3/2018 |

OTHER PUBLICATIONS

International Search Report for PCT Application No. PCT/JP2021/003034, mailed on Apr. 13, 2021.
English translation of Written opinion for PCT Application No. PCT/JP2021/003034, mailed on Apr. 13, 2021.

* cited by examiner

*Primary Examiner* — Edwin C Gunberg
(74) *Attorney, Agent, or Firm* — Sughrue Mion, PLLC

(57) ABSTRACT

A management system includes a monitoring device and at least one detection device. The monitoring device projects detection light for detecting a monitoring target, and identifies the monitoring target based on a detection pattern of reflected light of the detection light. The detection device is installed on the monitoring target. The detection device receives the detection light projected by the monitoring device, and reflects the detection light at a timing set to the detection device in a predetermined period starting from a timing at which the detection light is received.

15 Claims, 42 Drawing Sheets

Fig. 19

| IDENTIFICATION NUMBER | LIGHT RECEPTION TIMING | | | | |
|---|---|---|---|---|---|
| | $t_1$ | $t_2$ | $t_3$ | $t_4$ | $t_5$ |
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| ⋮ | ⋮ | ⋮ | ⋮ | ⋮ | ⋮ |
| 30 | 1 | 1 | 1 | 1 | 0 |
| 31 | 1 | 1 | 1 | 1 | 1 |

| POSITION | IDENTIFICATION NUMBER |
|---|---|
| $(x_1, y_1)$ | 21 |
| $(x_2, y_2)$ | 28 |
| $(x_3, y_3)$ | 30 |
| $(x_4, y_4)$ | 15 |
| $(x_5, y_5)$ | 16 |

| IDENTIFICATION NUMBER | LIGHT RECEPTION TIMING | | | | | WARNING RANGE |
|---|---|---|---|---|---|---|
| | $t_1$ | $t_2$ | $t_3$ | $t_4$ | $t_5$ | |
| 0 | 0 | 0 | 0 | 0 | 0 | 5m |
| 1 | 0 | 0 | 0 | 0 | 1 | 1m |
| 2 | 0 | 0 | 0 | 1 | 0 | 1m |
| 3 | 0 | 0 | 0 | 1 | 1 | 7m |
| ... | ... | ... | ... | ... | ... | |
| 30 | 1 | 1 | 1 | 1 | 0 | 1m |
| 31 | 1 | 1 | 1 | 1 | 1 | 1m |

| POSITION | IDENTIFICATION NUMBER | WARNING RANGE | WARNING FLAG |
|---|---|---|---|
| $(x_1, y_1)$ | 21 | 1m | 1 |
| $(x_2, y_2)$ | 28 | 5m | 1 |
| $(x_3, y_3)$ | 30 | 1m | 0 |
| $(x_4, y_4)$ | 15 | 0m | 0 |
| $(x_5, y_5)$ | 16 | 7m | 0 |

| IDENTIFICATION NUMBER | LIGHT RECEPTION TIMING ||||| WARNING RANGE ||
| | $t_1$ | $t_2$ | $t_3$ | $t_4$ | $t_5$ | INITIAL VALUE | CORRECTION VALUE |
|---|---|---|---|---|---|---|---|
| 0 | 0 | 0 | 0 | 0 | 0 | 5m | 0m |
| 1 | 0 | 0 | 0 | 0 | 1 | 1m | 0m |
| ... | ... | ... | ... | ... | ... | | |
| 16 | 0 | 0 | 0 | 1 | 1 | 7m | +2m |
| ... | ... | ... | ... | ... | ... | | |
| 30 | 1 | 1 | 1 | 1 | 0 | 1m | 0m |
| 31 | 1 | 1 | 1 | 1 | 1 | 1m | 0m |

5440

MANAGEMENT SYSTEM

This application is a National Stage Entry of PCT/JP2021/003034 filed on Jan. 28, 2021, which claims priority from Japanese Patent Application 2020-039649 filed on Mar. 9, 2020, the contents of all of which are incorporated herein by reference, in their entirety.

TECHNICAL FIELD

The present invention relates to a management system that performs safety management by grasping a positional relationship of a monitoring target.

BACKGROUND ART

PTL 1 discloses a system that monitors a monitoring target based on images captured by a plurality of monitoring cameras installed indoors. The system of PTL 1 includes an identification-signal-generation unit and an imaging/monitoring unit. The identification-signal-generation unit is installed in a monitoring target and transmits an identification signal. The imaging/monitoring unit is installed at a required position and the imaging/monitoring unit receives an output signal of the identification-signal-generation unit. When recognizing the output signal of the identification-signal-generation unit, the imaging/monitoring unit of PTL 1 discriminates the transmission direction of the output signal, tracks the imaging/monitoring target, and displays the output signal of the imaging/monitoring means on a monitor.

CITATION LIST

Patent Literature

[PTL 1] JP 2003-317169 A

SUMMARY OF INVENTION

Technical Problem

In the method of PTL 1, it is possible to track a monitoring target based on images captured by a plurality of imaging/monitoring units. However, in the method of PTL 1, since the detection accuracy of the position of each monitoring target is low, it is not possible to manage the positional relationship among a plurality of monitoring targets.

An object of the present invention is to provide a management system capable of performing safety management by grasping a positional relationship among a plurality of monitoring targets.

Solution to Problem

A management system of one aspect of the present invention includes: a monitoring device that projects detection light for detecting a monitoring target, and identifies the monitoring target based on a detection pattern of reflected light of the detection light; and at least one detection device that is installed on the monitoring target, receives the detection light projected by the monitoring device, and reflects the detection light at a timing set to the detection device in a predetermined period starting from a timing at which the detection light is received.

Advantageous Effects of Invention

According to the present invention, it is possible to provide a management system capable of performing safety management by grasping a positional relationship among a plurality of monitoring targets.

BRIEF DESCRIPTION OF DRAWINGS

FIG. 19 is a table for explaining identification information for identifying each of detection devices mounted on a monitoring target of the management system according to the first example embodiment.

FIG. 20 is a table for explaining detection information generated by the monitoring device of the management system according to the first example embodiment.

FIG. 26 is a table for explaining identification information for identifying each of detection devices mounted on a monitoring target of the monitoring device according to the second example embodiment.

FIG. 27 is a table for explaining detection information generated by the monitoring device according to the second example embodiment.

FIG. 39 is a table illustrating an example of detection information updated by the management system of Application Example 2.

EXAMPLE EMBODIMENT

Hereinafter, example embodiments of the present invention will be described with reference to the drawings. However, the example embodiments described below have technically preferable limitations for performing the present invention, but the scope of the invention is not limited to the following. In all the drawings used in the following description of the example embodiments, the same reference signs are given to the same parts unless there is a particular reason. In the following example embodiments, repeated description of similar configurations and operations may be omitted.

First Example Embodiment

First, a management system according to a first example embodiment will be described with reference to the drawings. The management system of the present example embodiment includes a monitoring device and at least one detection device installed on a monitoring target. The monitoring device manages a positional relationship of at least one detection device located in a monitored space based on the image obtained by imaging the monitored space.

(Configuration)

Figure 1:
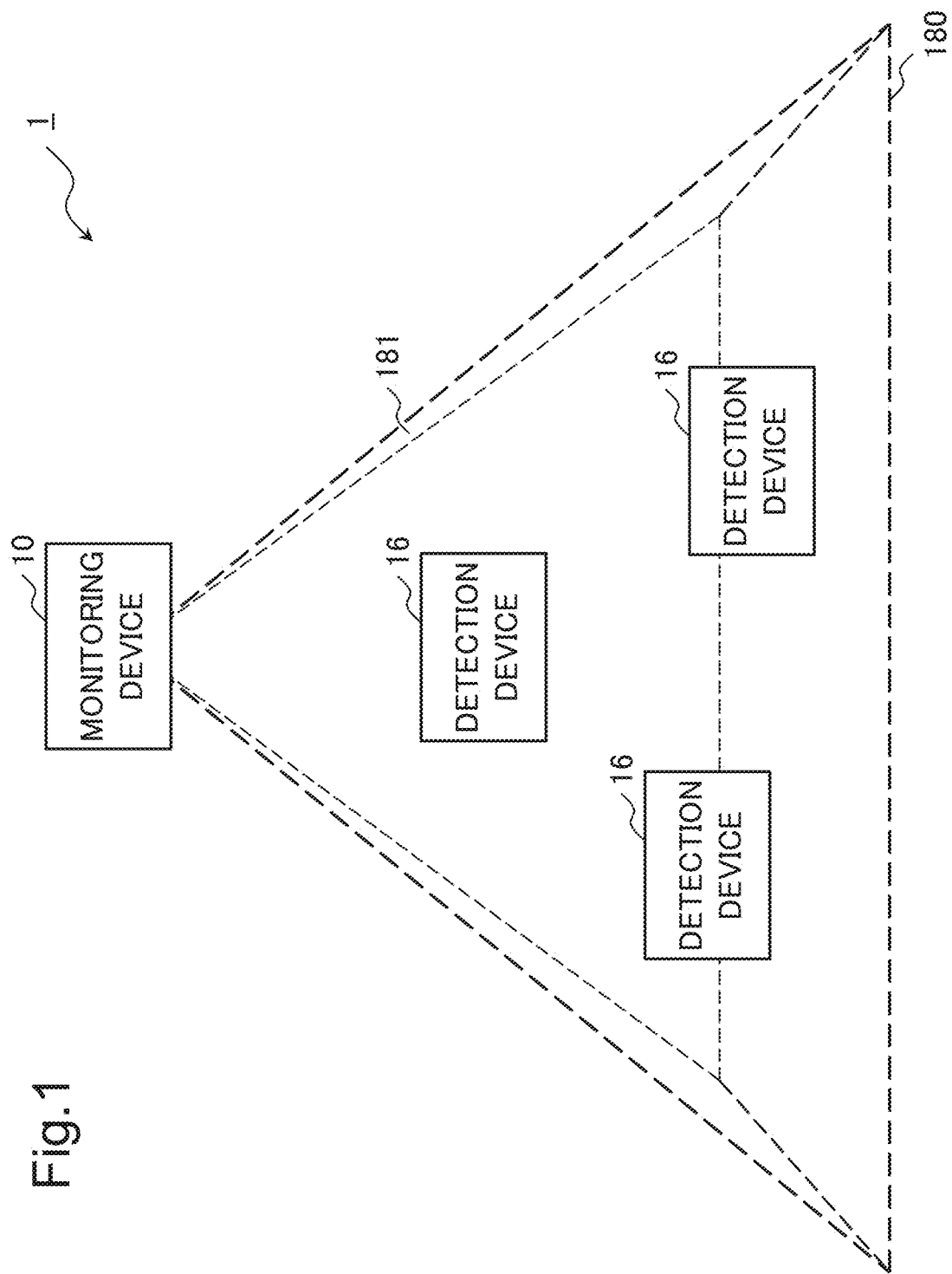
FIG. 1 is a conceptual diagram illustrating an example of a configuration of a management system according to a first example embodiment.

FIG. 1 is a conceptual diagram illustrating an example of a configuration of a management system 1 according to the present example embodiment. The management system 1 includes a monitoring device 10 and at least one detection device 16. The detection device 16 is installed on at least one monitoring target (not illustrated). Note that the management system 1 may include a plurality of monitoring devices 10, and the plurality of monitoring devices 10 may be configured to cooperate with each other.

The monitoring device 10 projects the detection light toward a projection target surface 180. A monitored space 181 monitored by the monitoring device 10 is formed between the monitoring device 10 and the projection target surface 180. The monitoring device 10 receives reflected light from the detection device 16 located in the monitored space 181. When receiving the reflected light from the detection device 16, the monitoring device 10 determines that the detection device 16 is located in monitored space 181.

Upon receiving the reflected light from the detection device 16, the monitoring device 10 images the monitored space 181 at a predetermined timing in a predetermined period starting from the reception of the reflected light while continuing the projection of the detection light. The predetermined timing at which the monitoring device 10 images the monitored space 181 is a timing commonly set in advance for all the detection devices 16 installed on the monitoring target. The monitoring device 10 identifies an identification number unique to the detection device 16 located in the monitored space 181 based on a detection pattern of the reflected light from the detection device 16 using a plurality of captured images. The monitoring device 10 associates identified identification numbers with positions on the image to specify positions of the detection devices 16.

The detection device 16 is mounted on a monitoring target. An identification number unique to each individual is assigned to each of the detection devices 16. For example, when the number of monitoring targets is 32, any one of identification numbers of 0 to 31 is assigned to each of the detection devices 16. When receiving the detection light projected by the monitoring device 10, the detection device 16 reflects the detection light at a timing set in advance in accordance with each identification number in a predetermined period starting from the reception of the detection light. The timing at which each detection device 16 reflects the detection light is set according to each identification number, and is unique to each detection device 16. For example, the timing at which the detection device 16 reflects the detection light and the timing at which the monitoring device 10 receives the reflected light of the detection light are adjusted according to the distance between the detection device 16 and the monitoring device 10.

In the management system 1 of the present example embodiment, the position of the monitoring target on which each detection device 16 is mounted is associated with the position on the image based on the plurality of images obtained by capturing the reflected light by at least one detection device 16. Therefore, according to the management system 1 of the present example embodiment, the positional relationship of the monitoring target can be managed.

Next, details of configurations of the monitoring device 10 and the detection device 16 included in the management system 1 will be described with reference to the drawings. The following configurations of the monitoring device 10 and the detection device 16 are merely examples, and do not limit the configurations of the monitoring device 10 and the detection device 16.

[Monitoring Device]

Figure 2:
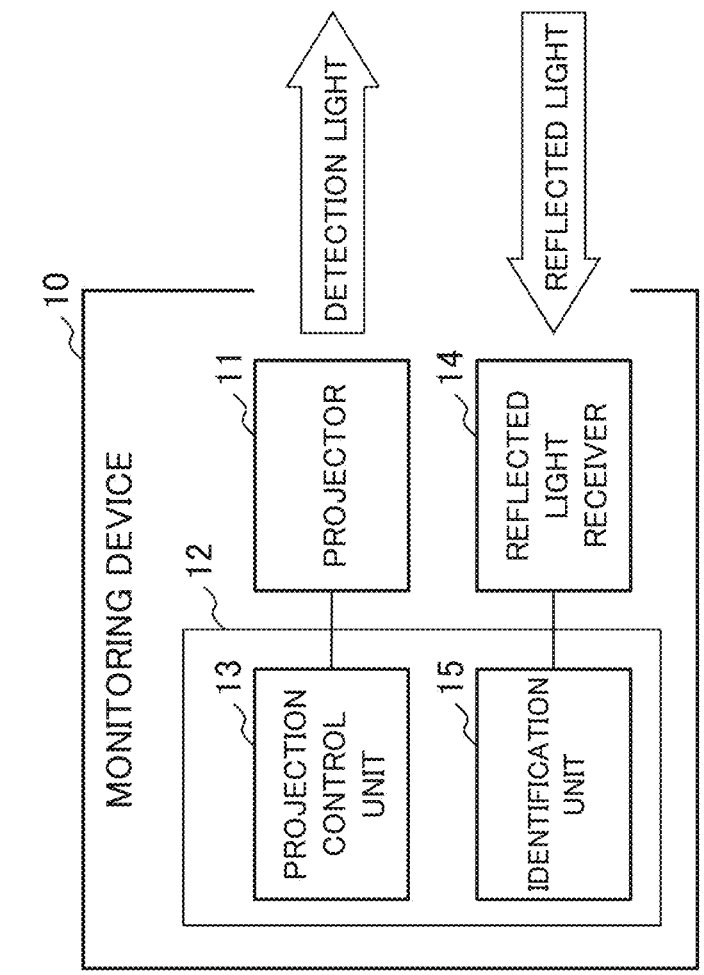
FIG. 2 is a conceptual diagram illustrating an example of a configuration of a monitoring device of the management system according to the first example embodiment.

FIG. 2 is a block diagram illustrating an example of the monitoring device 10 included in the management system 1. The monitoring device 10 includes a projector 11, a projection control unit 13, a reflected light receiver 14, and an identification unit 15. The projection control unit 13 and the identification unit 15 constitute a monitoring control unit 12.

The projector 11 is a projector including a spatial light modulator. The projector 11 projects the detection light under the control of the projection control unit 13. In the present example embodiment, the projector 11 projects detection light having a wavelength in an infrared region. The spatial light modulator of the projector 11 includes a modulation unit that displays a pattern according to the detection light to be projected. The light emitted to the modulation unit in a state where the pattern relevant to the detection light is displayed is modulated when reflected by the modulation unit. The light modulated by the modulation unit is projected toward the projection target surface 180 as detection light via a projection optical system.

The projection control unit 13 causes the modulation unit of the spatial light modulator of the projector 11 to display a pattern relevant to the detection light. The projection control unit 13 controls the emission timing of the light source of the projector 11 in a state where the pattern relevant to the detection light is displayed on the modulation unit, and causes the projector 11 to irradiate the modulation unit with light.

The reflected light receiver 14 includes a two-dimensional sensor sensitive to the infrared region. The reflected light receiver 14 images a range including the monitored space 181. For example, the reflected light receiver 14 images the reflected light reflected by the detection device 16 by a two-dimensional sensor. The reflected light receiver 14 outputs the captured image to the identification unit 15. Under the control of the identification unit 15, the reflected light receiver 14 images the monitored space 181 at a predetermined timing in a predetermined period starting from the timing at which the reflected light is received. The reflected light receiver 14 outputs the plurality of captured images to the identification unit 15.

The identification unit 15 acquires an image captured by the reflected light receiver 14. When detecting the reflected light from the acquired image, the identification unit 15 detects the position of the reflected light. The identification unit 15 causes the reflected light receiver 14 to image the monitored space 181 at a preset timing for a predetermined period from the timing at which the reflected light is detected. The timing at which the reflected light receiver 14 images the monitored space 181 is set in accordance with the timing at which the reflected light reflected by the detection device 16 is received by the reflected light receiver 14. For example, the identification unit 15 causes the reflected light receiver 14 to image the monitored space 181 at a preset time interval in accordance with the timing at which the reflected light receiver 14 receives the reflected light.

The identification unit 15 identifies the identification number of the detection device 16 that is the reflection source of the reflected light by the detection pattern of the reflected light at the same position on the plurality of images captured by the reflected light receiver 14. The identification unit 15 associates the position on the image captured by the reflected light receiver 14 with the identification number to specify the position of the detection device 16.

For example, identification numbers of 0 to 31 are assigned in advance to each of the plurality of detection devices 16. Then, each detection device 16 is set so that the detection light is reflected at the timing when the identification number of each detection device 16 matches the logical value of the bit (0, 1) expressed in binary number. For example, the detection device 16 is set so as not to reflect the detection light when the logic value is 0 and to reflect the detection light when the logic value is 1. For example, when the identification numbers of the detection devices 16 are 0 to 31, five imaging timings are set in accordance with the number of bits (5) in a predetermined period. When the reflected light is not detected at the first timing and the reflected light is detected at the second to fifth timings at a certain position, the identification unit 15 identifies that the detection device 16 with the identification number 15 (01111 in the binary number) is located at the position. The detection device 16 may be set so as not to reflect the detection light when the logic value is 1, and to reflect the detection light when the logic value is 0. The timing of reflection by detection device 16 according to the identification number may be set in ascending order of the identification number, or may be set in descending order of the identification number.

<Projector>

Figure 3:
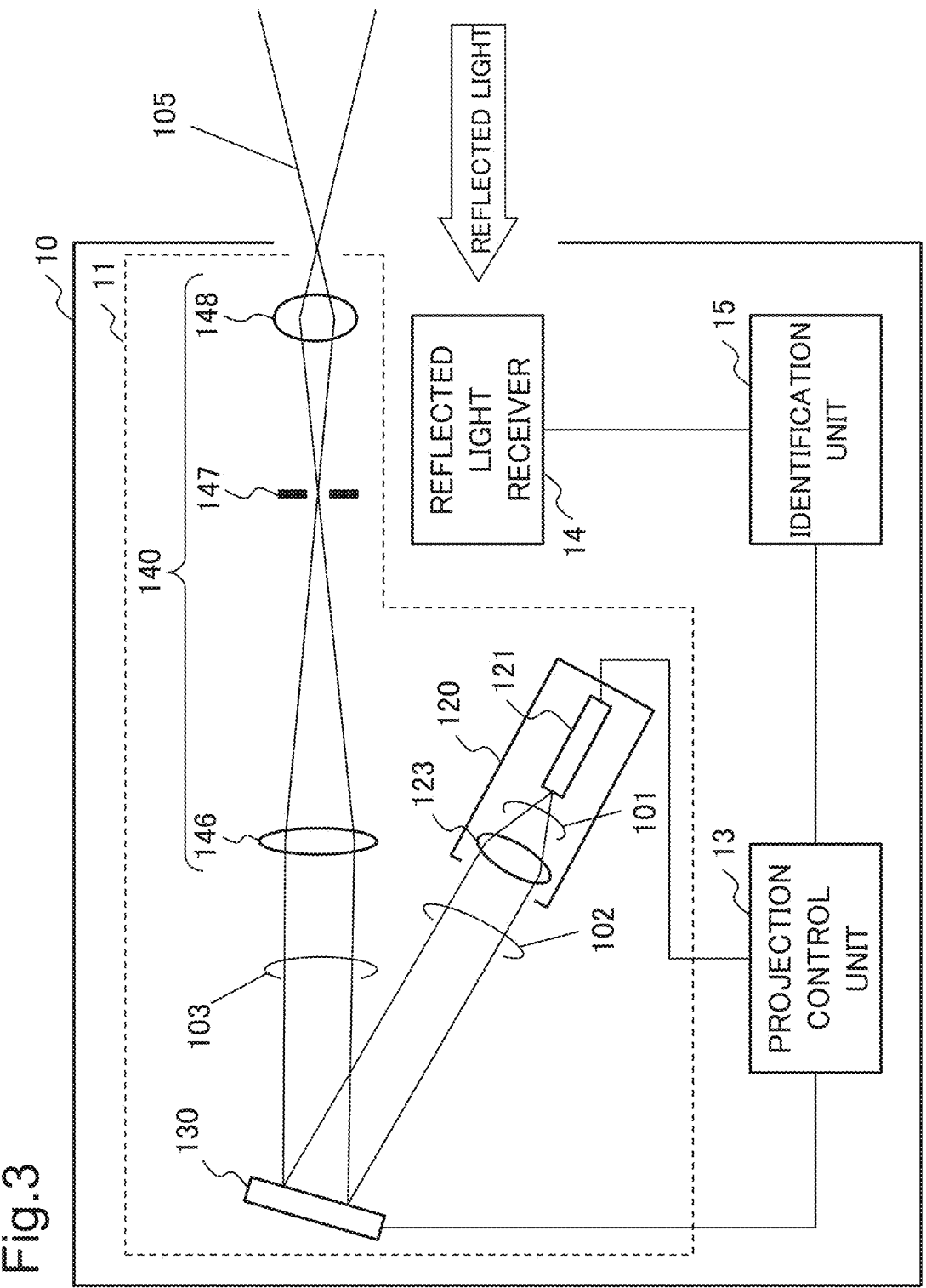
FIG. 3 is a conceptual diagram for explaining a configuration of a projector included in the monitoring device of the management system according to the first example embodiment.

FIG. 3 is a conceptual diagram for explaining a configuration of the projector 11. The projector 11 includes a light source 120, a spatial light modulator 130, and a projection optical system 140. Note that FIG. 3 is conceptual, and does not accurately represent the positional relationship between the components, the light irradiation direction, and the like.

The light source 120 includes an emitter 121 that emits laser light 101 having a wavelength in an infrared region, and a collimator 123 that converts the laser light 101 emitted from the emitter 121 into parallel light 102. The emitter 121 emits the laser light 101 having a wavelength in the infrared region under the control of the projection control unit 13. The laser light 101 emitted from the emitter 121 is converted into the parallel light 102 by the collimator 123, and emitted from the light source 120. The parallel light 102 emitted from the light source 120 travels toward the modulation unit of the spatial light modulator 130.

For example, the emitter 121 emits infrared light in a 1.0 micrometer band or a 1.5 micrometer band from the viewpoint of eye safety. The wavelength region of the laser light 101 emitted from the emitter 121 is not limited to a 1.0 micrometer band or a 1.5 micrometer band. The emitter 121 may be configured to emit light of a plurality of wavelength regions instead of a single wavelength region.

As illustrated in FIG. 3, the incident angle of the parallel light 102 is made non-perpendicular to the irradiation surface of the modulation unit of the spatial light modulator 130. That is, the emission axis of the parallel light 102 emitted from the light source 120 is inclined with respect to the irradiation surface of the modulation unit of the spatial light modulator 130. If the emission axis of the parallel light 102 is set obliquely with respect to the irradiation surface of the modulation unit of the spatial light modulator 130, the parallel light 102 can be incident on the irradiation surface of the modulation unit of the spatial light modulator 130 without using a beam splitter. Therefore, light utilization efficiency can be improved. If the emission axis of the parallel light 102 is set obliquely with respect to the irradiation surface of the modulation unit of the spatial light modulator 130, the size of the projector 11 can be made compact.

The spatial light modulator 130 includes a modulation unit irradiated with the parallel light 102. In the modulation unit of the spatial light modulator 130, a pattern relevant to the detection light is set under the control of the projection control unit 13. For example, the spatial light modulator 130 is achieved by a spatial light modulator using ferroelectric liquid crystal, homogeneous liquid crystal, vertical alignment liquid crystal, or the like. For example, the spatial light modulator 130 can be achieved by liquid crystal on silicon (LCOS). The spatial light modulator 130 may be achieved by a micro electro mechanical system (MEMS). If the laser light in the infrared region is emitted, the MEMS is more suitable than the LCOS.

Figure 4:
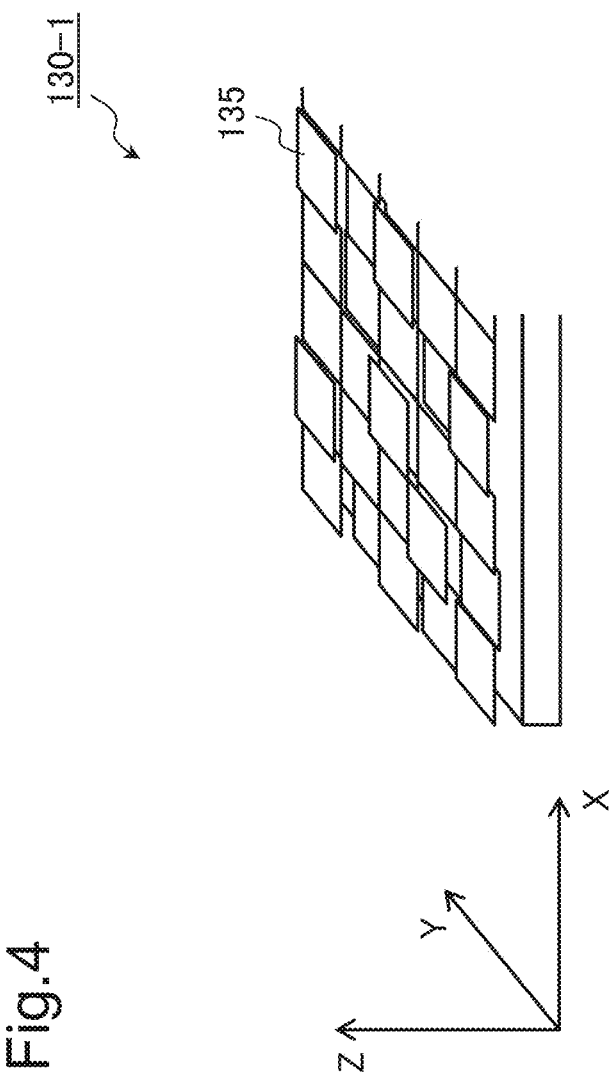
FIG. 4 is a conceptual diagram illustrating an example of a configuration of a micro electro mechanical system (MEMS) that achieves a spatial light modulator of a projector included in the monitoring device of the management system according to the first example embodiment.

FIG. 4 is a conceptual diagram for explaining an example (MEMS 130-1) of the MEMS that achieves the spatial light modulator 130. The MEMS 130-1 has a structure in which a plurality of small mirrors 135 is installed in a lattice shape for each pixel on a surface (modulation unit) that modulates the laser light. In the case of using the MEMS 130-1, the emitted parallel light 102 is modulated by displacing the height of each of the plurality of small mirrors 135 in the Z direction based on the control of the projection control unit 13.

On the modulation unit of the spatial light modulator 130, a plurality of reflection regions (relevant to pixels) capable of changing optical characteristics such as a refractive index are arrayed in an array. The spatial light modulator 130 sets optical characteristics of each pixel of the modulation unit under the control of the projection control unit 13, and sets a pattern for displaying a desired image on the projection target surface in the modulation unit. When the modulation unit in a state where the pattern is set is irradiated with light, the modulated light 103 in which the spatial distribution is modulated according to the optical characteristics of the modulation unit is emitted. For example, a modulator that modulates a spatial distribution such as a phase, an amplitude, an intensity, a polarization state, a propagation direction, and the like of light can be used as the spatial light modulator 130.

For example, the spatial light modulator 130 can be achieved by a phase modulation type spatial light modulator that modulates the phase of the incident parallel light 102. In a case where the spatial light modulator 130 is of a phase modulation type, a phase image relevant to an image to be displayed on the projection target surface is set in the modulation unit. The phase image is an image in which a pattern relevant to an image to be displayed on the projection target surface is arranged in a tile shape. Since the phase modulation type spatial light modulator 130 is focus-free, it is not necessary to change the focus according to the projection distance even if light is projected on a plurality of display regions having different projection distances. By using the phase modulation type spatial light modulator 130, energy can be concentrated on a portion of a line constituting an image by sequentially switching a region where the spatial light signal is projected. Therefore, if the outputs of the light sources 120 are the same, by using the phase modulation type spatial light modulator 130, it is possible to display an image brighter than a method of collectively transmitting light onto the entire display region.

The modulation unit of the spatial light modulator 130 is irradiated with the parallel light 102 from the light source 120 under the control of the projection control unit 13. The modulation unit of the spatial light modulator 130 is irradiated with the parallel light 102 in a state in which a pattern according to the detection light is set in accordance with the timing of emitting the detection light. As a result, the modulated light 103 modulated by the modulation unit of the spatial light modulator 130 is emitted toward the projection optical system 140.

The projection optical system 140 is an optical system that projects the modulated light 103 obtained as a result of modulation by the spatial light modulator 130 as detection light 105. As illustrated in FIG. 3, the projection optical system 140 includes a Fourier transform lens 146, an aperture 147, and a projection lens 148.

The Fourier transform lens 146 is an optical lens that forms an image formed when the modulated light 103 obtained as a result of modulation by the modulation unit of the spatial light modulator 130 is projected at infinity, at a focal position near the aperture 147.

The aperture 147 is a frame for shielding high-order light included in the light focused by the Fourier transform lens 146 and restricting an outer edge of a display region. The opening of the aperture 147 is opened smaller than the outer periphery of the display region at the position of the aperture 147, and is installed to shield the peripheral region of the image at the position of the aperture 147. For example, the opening of the aperture 147 is formed in a rectangular shape or a circular shape. The aperture 147 is preferably provided at the focal position of the Fourier transform lens 146, but may be shifted from the focal position of the Fourier transform lens 146 as long as the display region can be restricted.

The projection lens 148 is an optical lens that enlarges the light focused by the Fourier transform lens 146. The projection lens 148 enlarges the detection light 105 such that an image relevant to the phase image set in the modulation unit of the spatial light modulator 130 is formed on the projection target surface.

Figure 5:
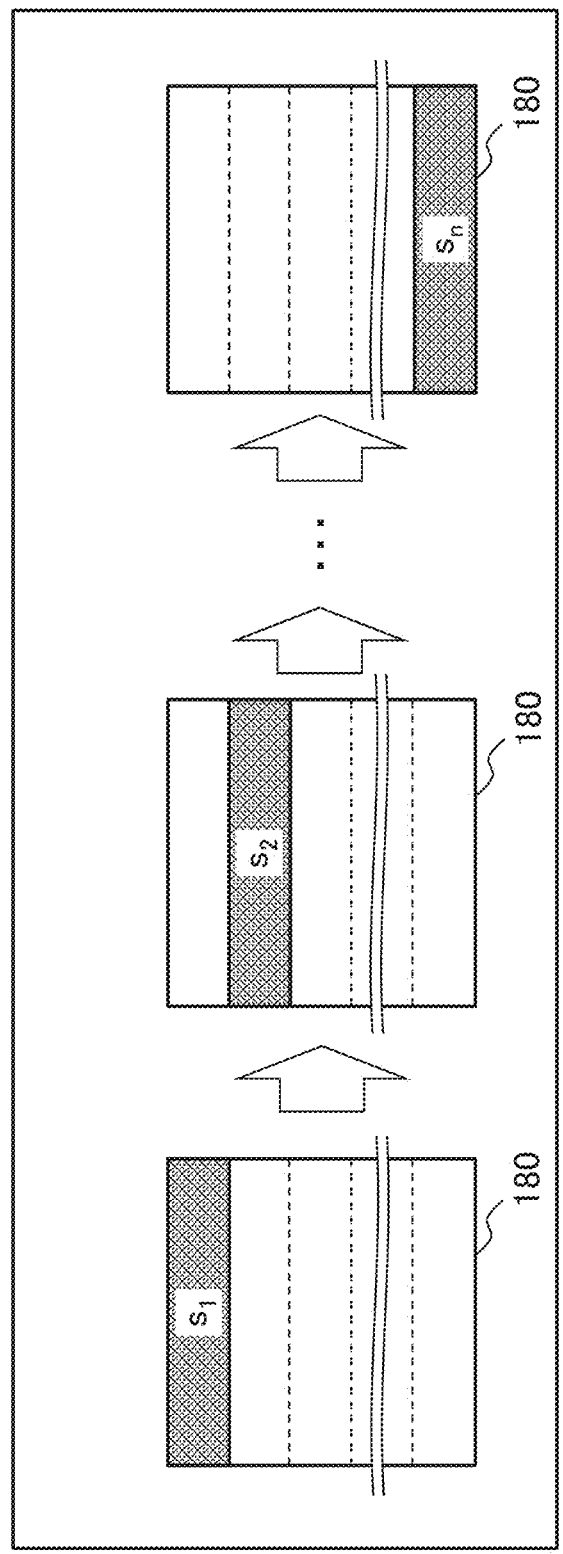
FIG. 5 is a conceptual diagram for explaining an example of projection of detection light by the projector included in the monitoring device of the management system according to the first example embodiment.

FIG. 5 is a conceptual diagram illustrating an example in which the projector 11 projects the detection light 105 to linearly scan the projection target surface 180. In the example of FIG. 5, the projector 11 projects the detection light 105 in a first region $s_1$, a second region $s_2$, . . . , and an n-th region $s_n$, in this order toward the projection target surface 180 divided into n equal parts.

Figure 6:
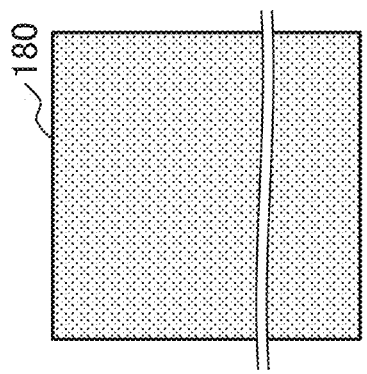
FIG. 6 is a conceptual diagram for explaining another example of projection of detection light by the projector included in the monitoring device of the management system according to the first example embodiment.

FIG. 6 is a conceptual diagram illustrating an example in which the projector 11 planarly projects the detection light 105 on the projection target surface 180. In the example of FIG. 6, the projector 11 collectively projects the detection light 105 toward the entire surface of the projection target surface 180.

When the output of the light source 120 of the projector 11 is the same, the output of the detection light 105 can be set higher in the case of projecting the detection light 105 so as to scan linearly (FIG. 5) than in the case of projecting the detection light 105 in a planar manner (FIG. 6). On the other hand, the detection time is longer in the case of projecting the detection light 105 to scan linearly (FIG. 5) than in the case of projecting the detection light 105 in a planar manner (FIG. 6). Therefore, the detection light 105 projected from the projector 11 is preferably set according to a request for the output of the light source 120, the detection time, and the like.

<Projection Control Unit>

Figure 7:
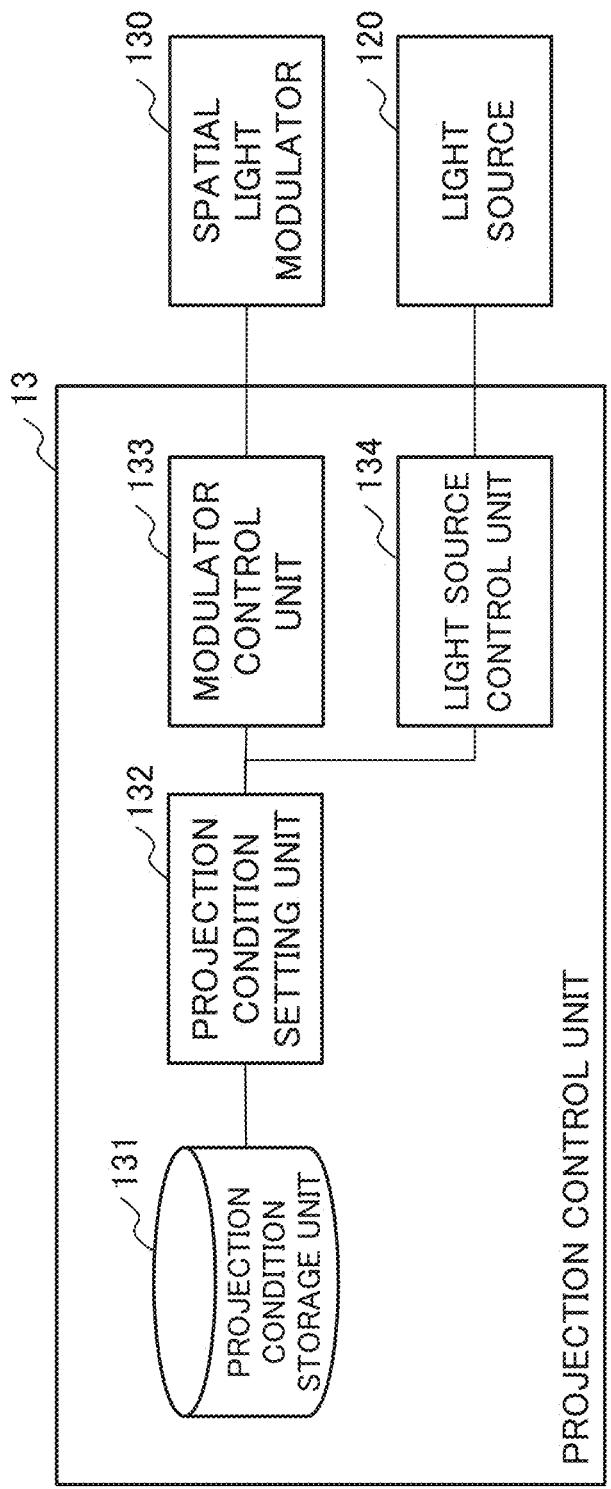
FIG. 7 is a conceptual diagram illustrating an example of a configuration of the projection control unit included in the monitoring device of the management system according to the first example embodiment.

FIG. 7 is a block diagram illustrating an example of a configuration of the projection control unit 13. The projection control unit 13 includes a projection condition storage unit 131, a projection condition setting unit 132, a modulator control unit 133, and a light source control unit 134.

The projection condition storage unit 131 stores a pattern according to the detection light 105. In a case where the spatial light modulator 130 of the projector 11 is of a phase modulation type, the projection condition storage unit 131 stores a phase distribution according to the detection light 105. The projection condition storage unit 131 stores a projection condition including a light source control condition for controlling the light source 120 and a modulation element control condition for controlling the spatial light modulator 130.

The projection condition setting unit 132 sets a projection condition for projecting the detection light 105. That is, the projection condition setting unit 132 sets, in the modulator control unit 133, a modulation element control condition for setting a pattern according to the detection light 105 in the modulation unit of the spatial light modulator 130. The projection condition setting unit 132 sets, in the light source control unit 134, a light source control condition for emitting the laser light 101 from the light source 120. The projection condition setting unit 132 matches the timing at which the modulation element control condition is set in the modulator control unit 133 with the timing at which the light source control condition is set in the light source control unit 134. As a result, the display part of the spatial light modulator 130 in a state where the pattern according to the detection light is displayed is irradiated with the laser light 101 emitted from the light source 120.

For example, the projection condition setting unit 132 sets a light source control condition for continuously emitting the laser light 101 in the emitter 121 for a predetermined period from the timing at which the reflected light is received. The projection condition setting unit 132 may set the light source control condition for causing the emitter 121 to emit the laser light 101 in a pulsed manner in the emitter 121 in accordance with the timing at which the detection device 16 reflects the detection light 105 during a predetermined period from the timing at which the reflected light is received. For example, the projection condition setting unit 132 sets a light source control condition for emitting the laser light 101 in the nanosecond order in the emitter 121. When the laser light 101 in the nanosecond order is emitted from the emitter 121, the output can be instantaneously greatly increased. The contrast can be improved by shortening the integration time in synchronization with the timing at which the reflected light of the pulsed laser light 101 is received by the reflected light receiver 14 and avoiding integrating the ambient light during the time during which the reflected light is not received by the reflected light receiver 14.

The projection condition setting unit 132 acquires a pattern according to the detection light 105 and a modulation element control condition which is a condition for setting the pattern in the modulation unit of the spatial light modulator 130 from the projection condition storage unit 131. For example, when the spatial light modulator 130 of the projector 11 is of a phase modulation type, the projection condition setting unit 132 sets the phase distribution on the display part of the spatial light modulator 130 as a pattern according to the detection light 105.

For example, the projection condition setting unit 132 may set, in the spatial light modulator 130, the modulation element control condition for selectively projecting the detection light 105 toward the position where the reflected light is detected for a predetermined period from the timing at which the reflected light is received. By restricting the projection direction of the detection light 105 to the position where the reflected light is detected, the irradiation range of the detection light 105 can be narrowed, so that power consumption in a predetermined period from the timing at which the reflected light is received can be reduced. If the projection direction is restricted, the output of the detection light 105 projected toward the position where the reflected light is detected can be set high.

The modulator control unit 133 receives the pattern according to the detection light 105 and the modulation element control condition from the projection condition setting unit 132. The modulator control unit 133 drives a driver (not illustrated) that changes the pattern set in the modulation unit of the spatial light modulator 130 according to the modulation element control condition received from the projection condition setting unit 132. As a result, a pattern according to the detection light 105 is set in the modulation unit of the spatial light modulator 130.

The light source control unit 134 is connected to the projection condition setting unit 132 and the light source 120. The light source control unit 134 drives a driving unit (not illustrated) of the emitter 121 according to the light source control condition received from the projection condition setting unit 132. As a result, the laser light 101 is emitted from the emitter 121. As a result, the modulation part of the spatial light modulator 130 is irradiated with the parallel light 102 caused by the laser light 101 in accordance with the timing at which the pattern is set in the modulation unit of the spatial light modulator 130, and the detection light 105 relevant to the pattern displayed on the modulation unit of the spatial light modulator 130 is projected.

<Reflected Light Receiver>

Figure 8:
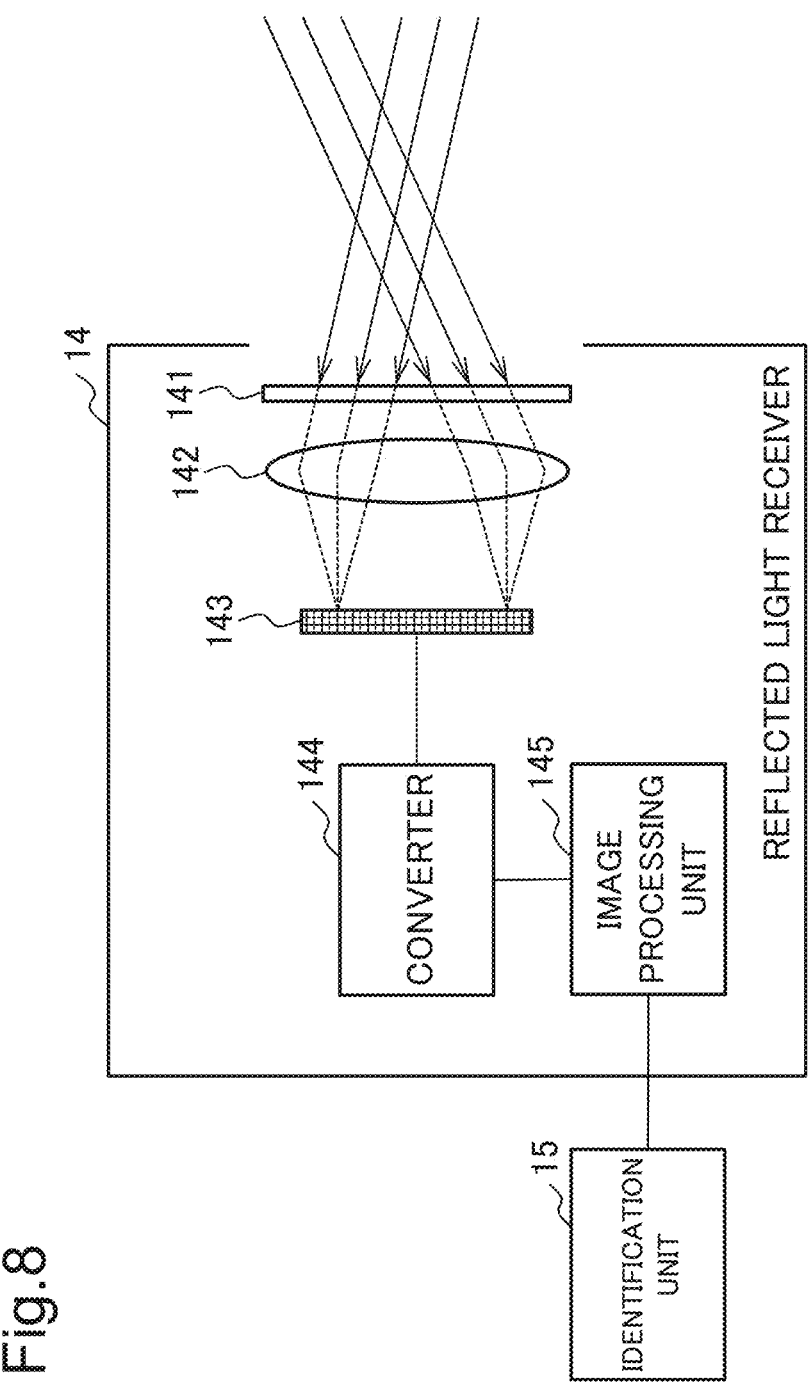
FIG. 8 is a conceptual diagram illustrating an example of a configuration of a reflected light receiver included in the monitoring device of the management system according to the first example embodiment.

FIG. 8 is a conceptual diagram illustrating an example of a configuration of the reflected light receiver 14. The reflected light receiver 14 includes a filter 141, a lens 142, a two-dimensional sensor 143, a converter 144, and an image processing unit 145.

The filter 141 is an infrared light transmitting filter that reflects light in a visible region from received light and selectively transmits reflected light in an infrared region reflected by the detection device 16. The wavelength region selected by the filter 141 is set in accordance with the wavelength region of the reflected light from the detection device 16. The reflected light transmitted through the filter 141 is guided to the lens 142. When the two-dimensional sensor 143 can selectively receive light in the infrared region, the filter 141 may be omitted.

The lens 142 is an optical lens that focuses the reflected light having passed through the filter 141 on the light receiving surface of the two-dimensional sensor 143. For example, a lens made of a material such as sapphire, calcium fluoride, barium fluoride, zinc selenide, zinc sulfide, chalcogenide glass, or plastic can be used as the lens 142. When long-wavelength infrared light is used, a lens made of a material such as germanium or silicon may be used as the lens 142.

The reflected light of the infrared region focused by the lens 142 is incident on the two-dimensional sensor 143. The two-dimensional sensor 143 is a sensor in which elements that convert reflected light in an infrared region into electric signals are installed in a lattice shape. The two-dimensional sensor 143 outputs the converted electric signal to the converter 144.

The two-dimensional sensor 143 is not particularly limited as long as it has sensitivity to light in an infrared region. For example, as the two-dimensional sensor 143, an imaging element having high sensitivity to a wavelength in a near-infrared region, such as an indium-gallium-arsenide type, an indium-antimony type, or a type 2 superlattice type, can be used. For example, an imaging element such as an indium-gallium-arsenide type, an indium-antimony type, a type 2 superlattice type, a mercury-cadmium-tellurium type, a bolometer type, or a pyroelectric type can be used as the two-dimensional sensor 143. A general-purpose two-dimensional sensor 143 for visible light may be used as the two-dimensional sensor 143 as long as it has sensitivity to the wavelength of the detection light 105.

The converter 144 obtains an electric signal from the two-dimensional sensor 143. The converter 144 converts the acquired electric signal from analog to digital. The converter 144 outputs the electric signal converted into digital to the image processing unit 145.

The image processing unit 145 acquires the electric signal converted into digital from the converter 144. The image processing unit 145 generates image data of the monitored space 181 using the acquired electric signal. The image processing unit 145 outputs the generated image data to the identification unit 15.

<Identification Unit>

Figure 9:
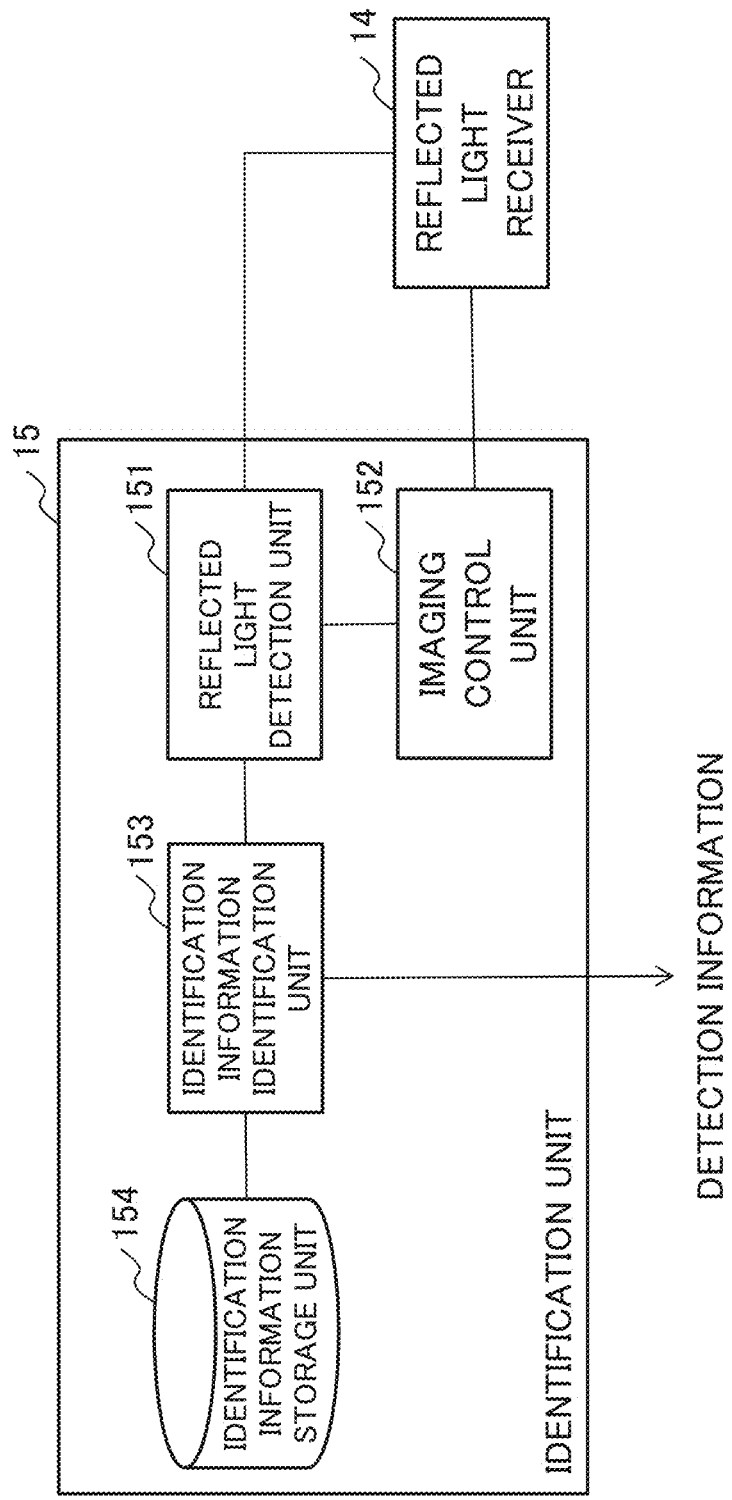
FIG. 9 is a conceptual diagram illustrating an example of a configuration of an identification unit included in the monitoring device of the management system according to the first example embodiment.

FIG. 9 is a block diagram illustrating an example of a configuration of the identification unit 15. The identification unit 15 includes a reflected light detection unit 151, an imaging control unit 152, an identification information identification unit 153, and an identification information storage unit 154.

The reflected light detection unit 151 acquires image data from the reflected light receiver 14. The reflected light detection unit 151 detects reflected light from the acquired image data. When detecting the reflected light from the image data, the reflected light detection unit 151 issues an imaging instruction to the imaging control unit 152. For example, when the number of bits of the identification number assigned to each of the detection devices 16 to be monitored is 5, an imaging instruction to perform imaging five times at a predetermined timing is issued to the imaging control unit 152 in a predetermined period from the timing at which the reflected light is detected. The reflected light detection unit 151 detects the position of the reflected light from the plurality of pieces of image data captured according to the imaging instruction in order of imaging, and outputs the detected position to the identification information identification unit 153 in order.

In response to the imaging instruction from the reflected light detection unit 151, the imaging control unit 152 controls the reflected light receiver 14 to perform imaging at a predetermined timing in a predetermined period from the timing at which the reflected light is detected. For example, when the number of bits of the identification number assigned to each of the detection devices 16 to be monitored is 5, the imaging control unit 152 controls the reflected light receiver 14 to perform imaging five times at a predetermined timing in a predetermined period from the timing at which the reflected light is detected.

The identification information identification unit 153 acquires the positions of the reflected light detected from the plurality of pieces of image data from the reflected light detection unit 151 in the order of imaging. The identification information identification unit 153 identifies the identification number of the detection device 16 based on the detection pattern of the reflected light detected at the same position on the image. For example, in a case where the number of bits of the identification number is 5, the timing at which the reflected light is detected at five imaging timings is set to 1, and the timing at which the reflected light is not detected is set to 0. For example, if the first time is 1, the second time is 0, the third time is 1, the fourth time is 0, and the fifth time is 1, the identification information identification unit 153 identifies the detection device 16 with the identification number 21 (10101 in the binary number).

The identification information storage unit 154 stores identification information including identification numbers associated with the plurality of detection devices 16. The identification information stored in the identification information storage unit 154 is referred to by the identification information identification unit 153.

[Detection Device]

Figure 10:
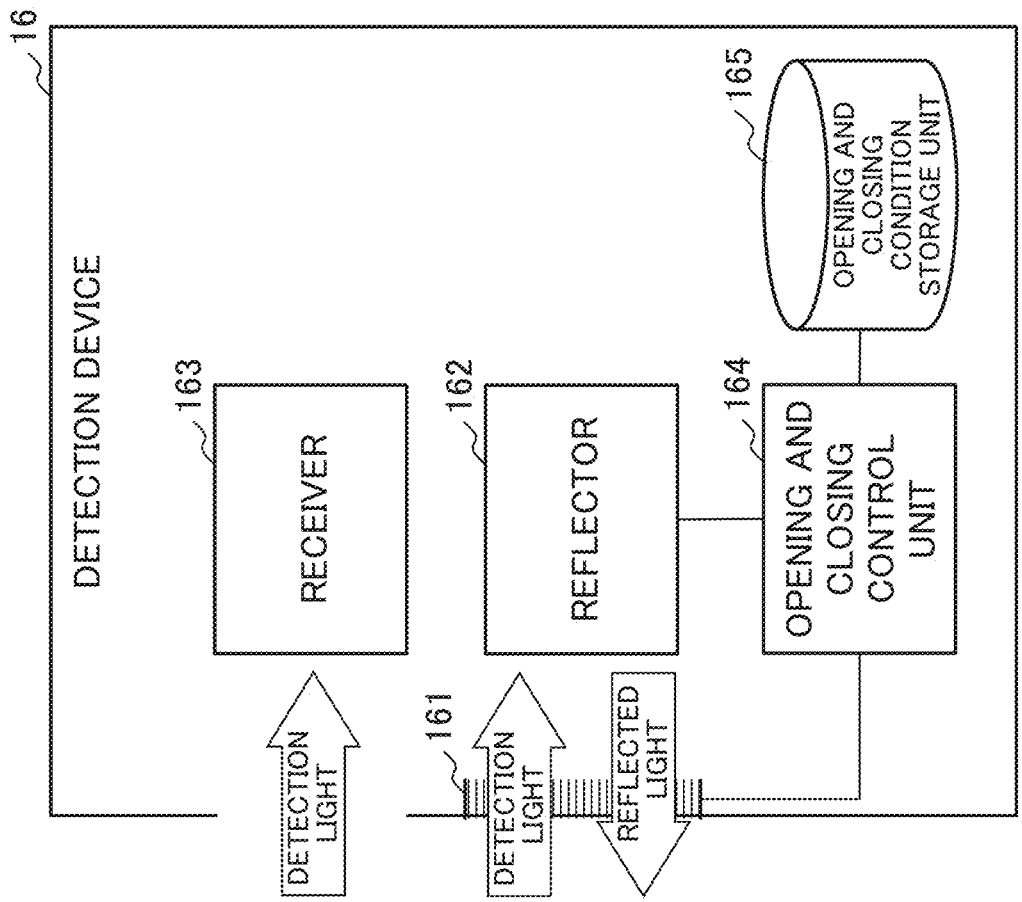
FIG. 10 is a conceptual diagram illustrating an example of a configuration of a detection device of the management system according to the first example embodiment.
Figure 11:
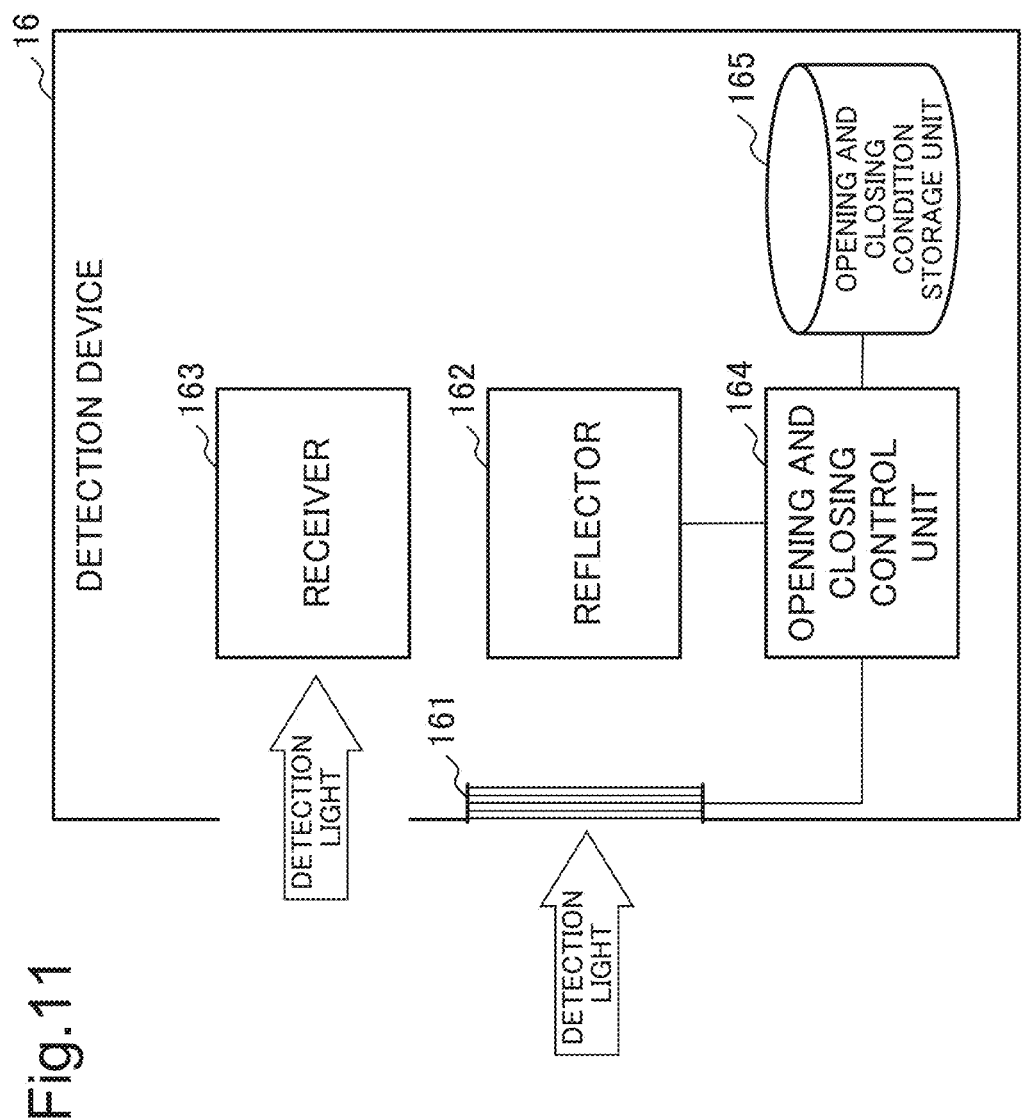
FIG. 11 is a conceptual diagram for explaining an example of a state of the detection device of the management system according to the first example embodiment.

FIGS. 10 and 11 are conceptual diagrams illustrating an example of a configuration of the detection device 16. The detection device 16 includes a shutter 161, a reflector 162, a receiver 163, an opening and closing control unit 164, and an opening and closing condition storage unit 165.

The shutter 161 is installed to face the reflecting surface of the reflector 162. The shutter 161 is opened and closed under the control of the opening and closing control unit 164. FIG. 10 illustrates a state where the shutter 161 is opened, and FIG. 11 illustrates a state where the shutter 161 is closed. As illustrated in FIG. 10, when the shutter 161 is opened, the detection light enters the reflector 162. As illustrated in FIG. 11, when the shutter 161 is closed, the detection light is shielded by the shutter 161 and is not incident on the reflector 162. In the present example embodiment, it is assumed that the shutter 161 is open in the initial state. The shutter 161 may extend to a position facing the light receiving surface of the receiver 163. For example, the shutter 161 can be achieved by a flexible liquid crystal element.

The reflector 162 has a reflecting surface that reflects the detection light. The reflector 162 is installed such that the reflecting surface faces the shutter 161. The reflector 162 reflects the detection light incident on the reflecting surface toward the monitoring device 10. For example, the reflector 162 is achieved by a retroreflector that retroreflects the detection light. Although not illustrated in FIG. 10, it is preferable to install an infrared light transmitting filter similar to the filter 141 of the reflected light receiver 14 between the reflecting surface of the reflector 162 and the shutter 161.

Figure 12:
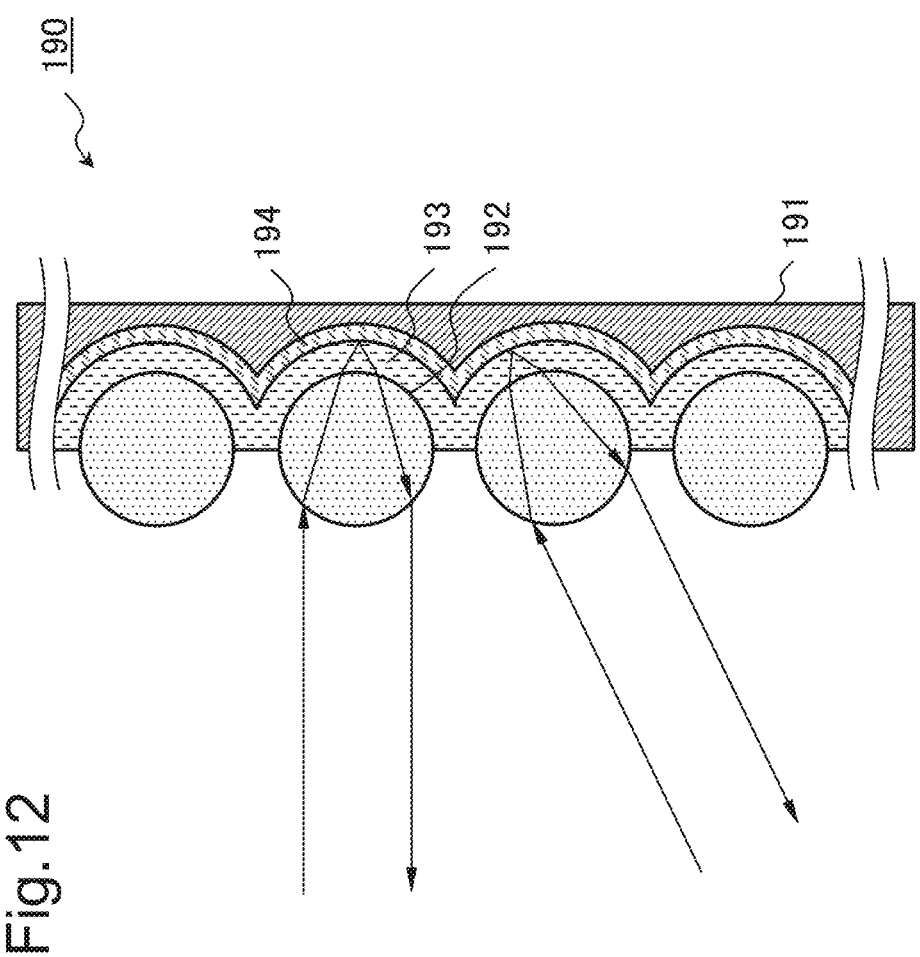
FIG. 12 is a conceptual diagram illustrating an example of a configuration of a reflector included in the detection device of the management system according to the first example embodiment.

FIG. 12 is a conceptual diagram illustrating an example of a retroreflector (retroreflector 190) that achieves the reflector 162. The retroreflector 190 includes a substrate 191, a spherical bead 192, a focus layer 193, and a reflection layer 194. A plurality of spherical bead 192 having a high refractive index is placed on one surface (hereinafter, referred to as an incident surface) of the substrate 191 of the retroreflector 190. For example, the spherical bead 192 is glass beads having a refractive index larger than that of general glass. On the back side of the plurality of spherical beads 192 installed on the incident surface of the retroreflector 190, a focus layer 193 in which light incident from the incident surface side is focused is installed. On the back side of the focus layer 193, a reflection layer 194 for reflecting light focused on the focus layer 193 is installed. For example, the reflection layer 194 can be formed by depositing metal such as aluminum on the incident surface side of the substrate 191.

The light incident on the retroreflector 190 is refracted by the surface of the spherical bead 192 and travels inside the spherical bead 192. The light reaching the back surface (the focus layer 193 side) of the spherical bead 192 is refracted by the back surface of the spherical bead 192 and focused in the focus layer 193. When the light focused on the focus layer 193 is reflected by the reflection layer 194 and the reflected light reaches the back surface of the spherical bead 192, the light is refracted by the back surface and travels inside the spherical bead 192. The light having reached the surface of the spherical bead 192 is refracted by the surface and emitted toward the incident direction.

The receiver 163 is a photodetector that receives detection light. An opening is formed on the light receiving surface side of the receiver 163. The receiver 163 converts the received detection light into an electric signal. The receiver 163 outputs the converted electric signal to the opening and closing control unit 164.

For example, the receiver 163 can be achieved by an element such as a photodiode or a phototransistor. The receiver 163 achieved by an avalanche photodiode can support high-speed communication. The receiver 163 may be achieved by an element other than a photodiode, a phototransistor, or an avalanche photodiode as long as it can convert an optical signal into an electric signal.

The receiver 163 receives light in a wavelength region of the detection light. In the present example embodiment, the receiver 163 receives detection light in an infrared region. It is sufficient that the receiver 163 is selected in accordance with the wavelength of the detection light projected from the monitoring device 10. The receiver 163 is sensitive to light having a wavelength in the 1.0 micrometer band or the 1.5 micrometer band, for example. For example, the 1.0 micrometer band is a wavelength region of 0.84 to 0.95 micrometers. The wavelength band of the light detected by the receiver 163 is not limited to the 1.0 micrometer band or the 1.5 micrometer band. The wavelength band of the light detected by the receiver 163 may be set to, for example, a 0.8 micrometer band, a 1.55 micrometer band, or a 2.2 micrometer band. The wavelength band of the optical signal detected by the receiver 163 may be, for example, a 0.8 to 1.0 micrometer band. The receiver 163 may be sensitive to a plurality of wavelength regions.

The opening and closing control unit 164 receives an electric signal from the receiver 163. When receiving the electric signal, the opening and closing control unit 164 performs opening and closing control of the shutter 161 based on the opening and closing condition stored in the opening and closing condition storage unit 165.

Figure 13:
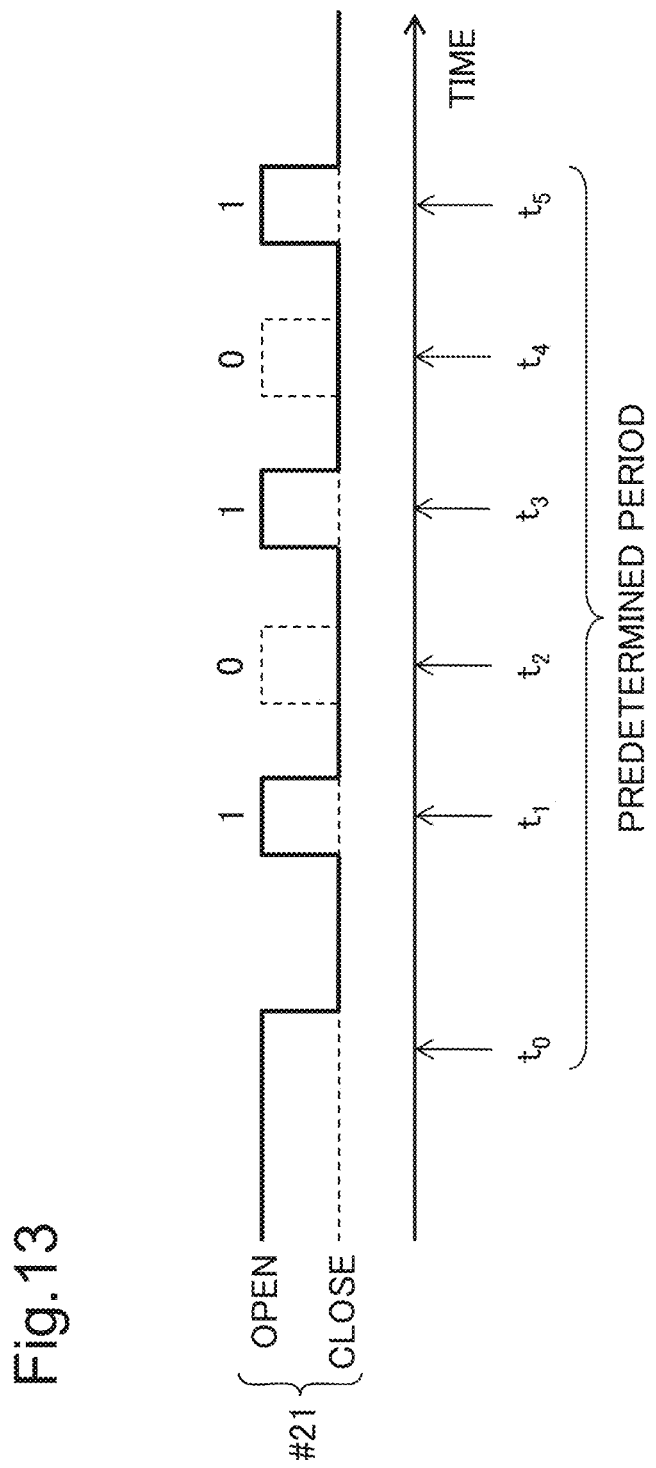
FIG. 13 is a conceptual diagram for explaining an opening and closing timing of a shutter by an opening and closing control unit included in the detection device of the management system according to the first example embodiment.

FIG. 13 is a conceptual diagram illustrating an example of the opening and closing timing of the shutter 161 of the detection device 16 with the identification number 21. When the receiver 163 receives the detection light, the opening and closing control unit 164 controls opening and closing of the shutter 161 in accordance with a predetermined timing in a predetermined period starting from timing to at which the detection light is received. The predetermined timing includes timing $t_1$, timing $t_2$, timing $t_3$, timing $t_4$, and timing $t_5$.

In the example of FIG. 13, the opening and closing control unit 164 controls opening and closing of the shutter 161 in the order of opening (1), closing (0), opening (1), closing (0), and opening (1) based on the opening and closing condition stored in the opening and closing condition storage unit 165. As a result, the reflector 162 reflects the reflected light at the time of opening (1) and does not reflect the reflected light at the time of closing (0). The monitoring device 10 identifies that the reflection source of the detected reflected light is the detection device 16 of the identification number 21 according to the light reception timing of the reflected light in a predetermined period.

The opening and closing condition storage unit 165 stores the opening and closing condition of the shutter 161 set in the detection device 16. For example, in the case of the identification number 21 of the detection device 16, the opening and closing condition storage unit 165 of the detection device 16 stores the opening and closing condition for controlling opening and closing of the shutter 161 in the order of opening (1), closing (0), opening (1), closing (0), and opening (1).

Application Example

Figure 14:
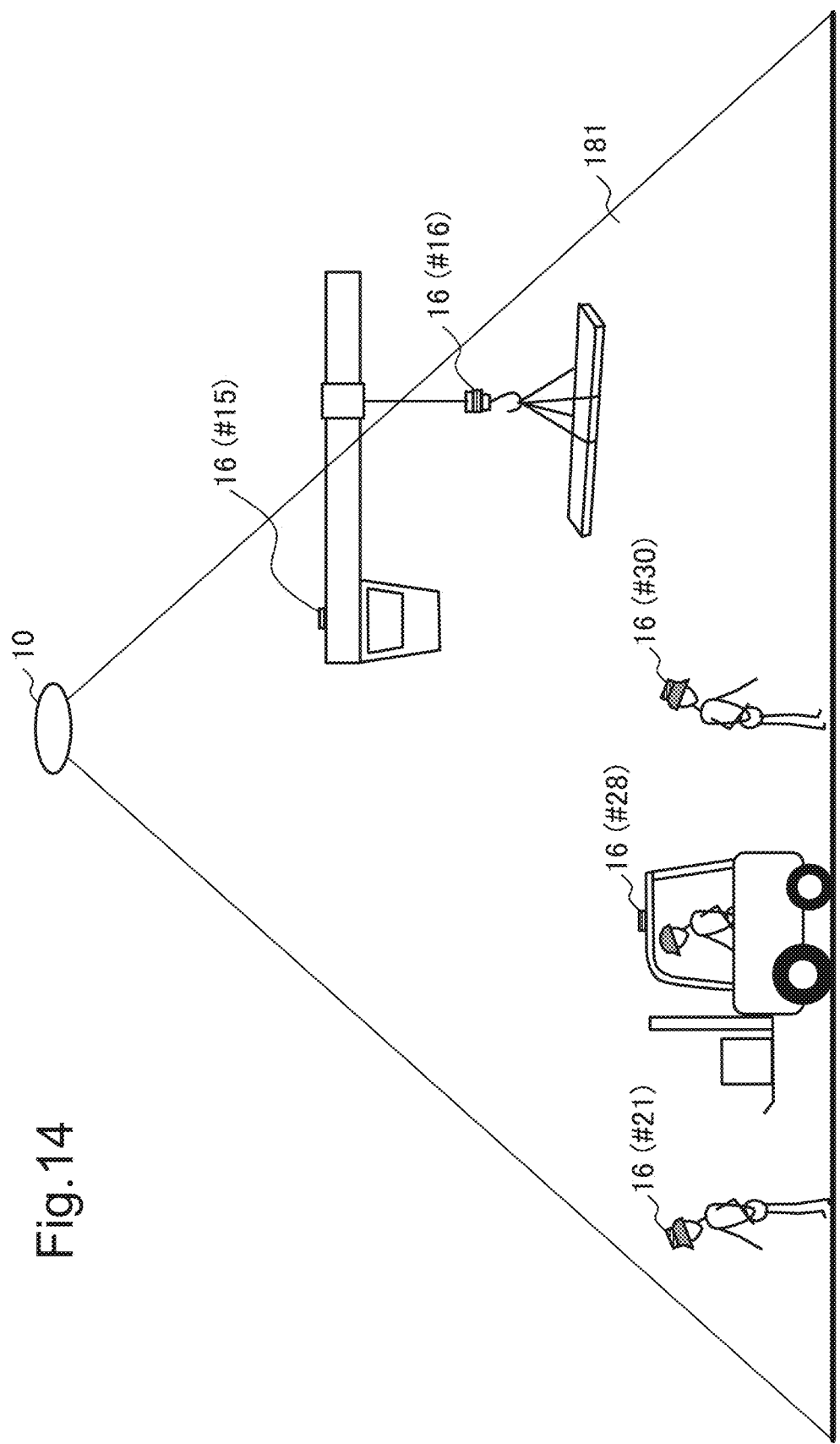
FIG. 14 is a conceptual diagram for explaining an example of a monitoring target range by the monitoring device of the management system according to the first example embodiment.

FIG. 14 is a conceptual diagram for explaining an application example in which the management system 1 is applied to management of a plurality of monitoring targets inside a factory. In the example of FIG. 14, detection devices 16 with the identification numbers 15, 16, 21, 28, and 30 are located in the monitored space 181. The detection device 16 with the identification number 15 is installed in an upper part of an operating room of a crane. The detection device 16 with the identification number 16 is installed in a hook portion of the crane. The detection devices 16 with the identification numbers 21 and 30 are installed on the top of a helmet of a worker. The detection device 16 with the identification number 28 is installed in an upper part of a cab of a forklift.

Figure 15:
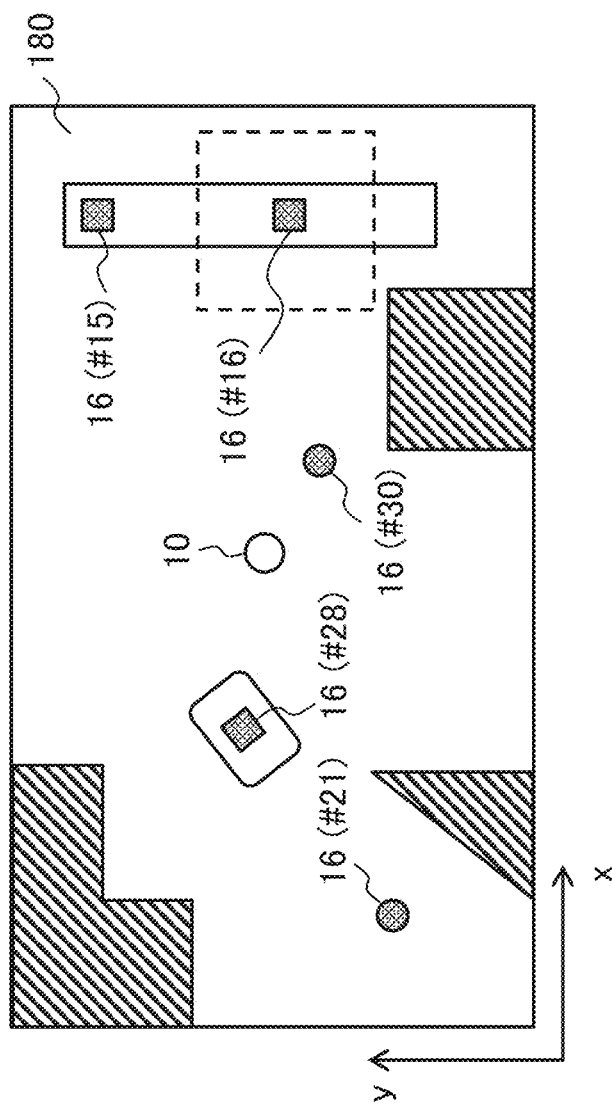
FIG. 15 is a conceptual diagram for explaining an example of a monitoring target range by the monitoring device of the management system according to the first example embodiment.

FIG. 15 is a conceptual diagram illustrating a positional relationship between the detection device 16 and the monitoring device 10 projected on the projection target surface 180 when the monitored space 181 is viewed from above. An x-axis and a y-axis orthogonal to each other are set on the projection target surface 180. For example, the position on the projection target surface 180 can be expressed by an xy coordinate system set on the projection target surface 180. In FIG. 15, a place where the monitoring target cannot pass is shaded. For example, when a place where the monitoring target cannot pass is known in advance, the detection light may be projected while avoiding the place where the monitoring target cannot pass.

Figure 16:
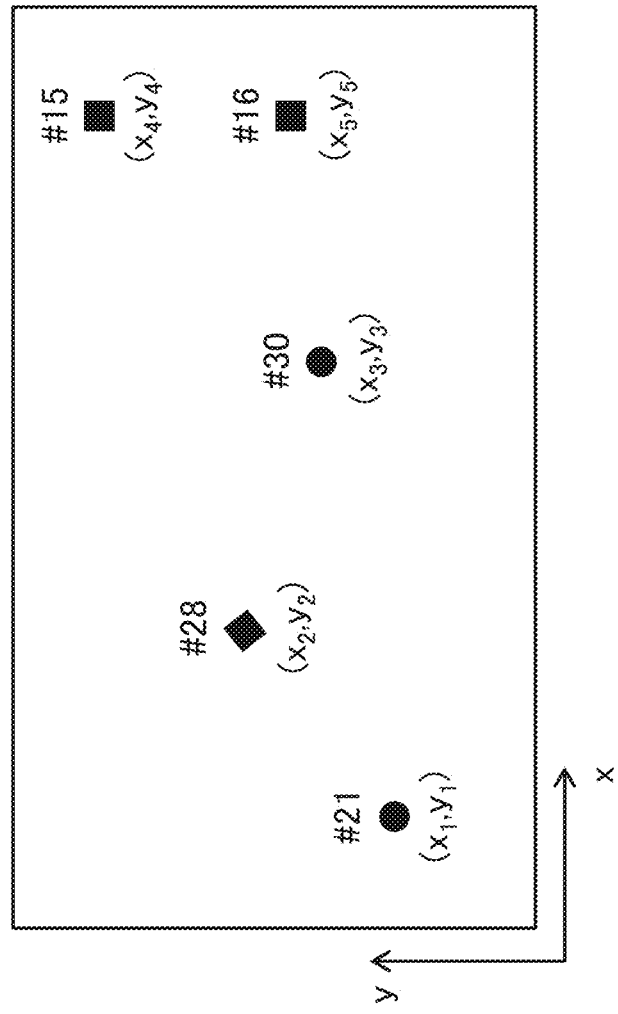
FIG. 16 is a conceptual diagram illustrating an example of an image captured by the monitoring device of the management system according to the first example embodiment.

FIG. 16 is an example of an image obtained by capturing the monitored space 181. In FIG. 16, the position where the reflected light is detected is filled in black. In FIG. 16, the coordinates of the position where the reflected light is detected and the identification number of the detection device 16 located at the position coordinates are also written.

Figure 17:
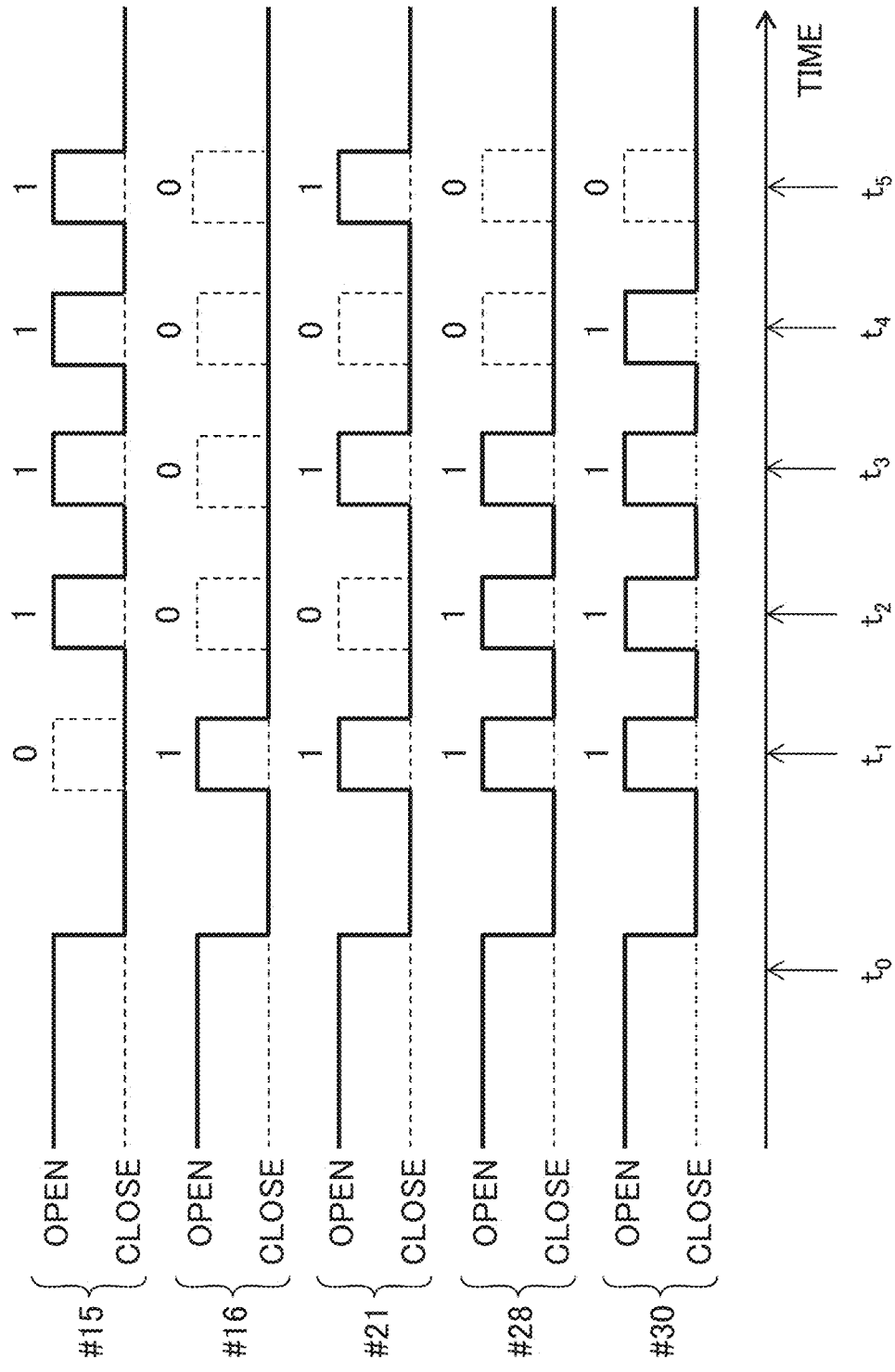
FIG. 17 is a conceptual diagram for explaining an opening and closing timing of a shutter by an opening and closing control unit included in the detection device of the management system according to the first example embodiment.

FIG. 17 is a time chart for explaining a timing at which the plurality of detection devices 16 controls opening and closing of the shutter 161 in a predetermined period starting from the timing to at which the reflected light is detected. Each detection device 16 controls opening and closing of the shutter 161 in accordance with a predetermined timing (timing $t_1$, timing $t_2$, timing $t_3$, timing $t_4$, and timing $t_5$). In other words, each detection device 16 controls opening and closing of the shutter 161 in the arrangement order of the logical values of the bits when the identification number set in the detection device is expressed in the binary number.

The opening and closing control unit 164 of the detection device 16 with the identification number 15 controls opening and closing of the shutter 161 in the order of closing (0), opening (1), opening (1), opening (1), and opening (1). The opening and closing control unit 164 of the detection device 16 with the identification number 16 controls opening and closing of the shutter 161 in the order of opening (1), closing (0), closing (0), closing (0), and closing (0). The opening and closing control unit 164 of the detection device 16 with the identification number 21 controls opening and closing of the shutter 161 in the order of opening (1), closing (0), opening (1), closing (0), and opening (1). The opening and closing control unit 164 of the detection device 16 with the identification number 28 controls opening and closing of the shutter 161 in the order of opening (1), opening (1), opening (1), closing (0), and closing (0). The opening and closing control unit 164 of the detection device 16 with the identification number 30 controls opening and closing of the shutter 161 in the order of opening (1), opening (1), opening (1), opening (1), and closing (0).

Figure 18:
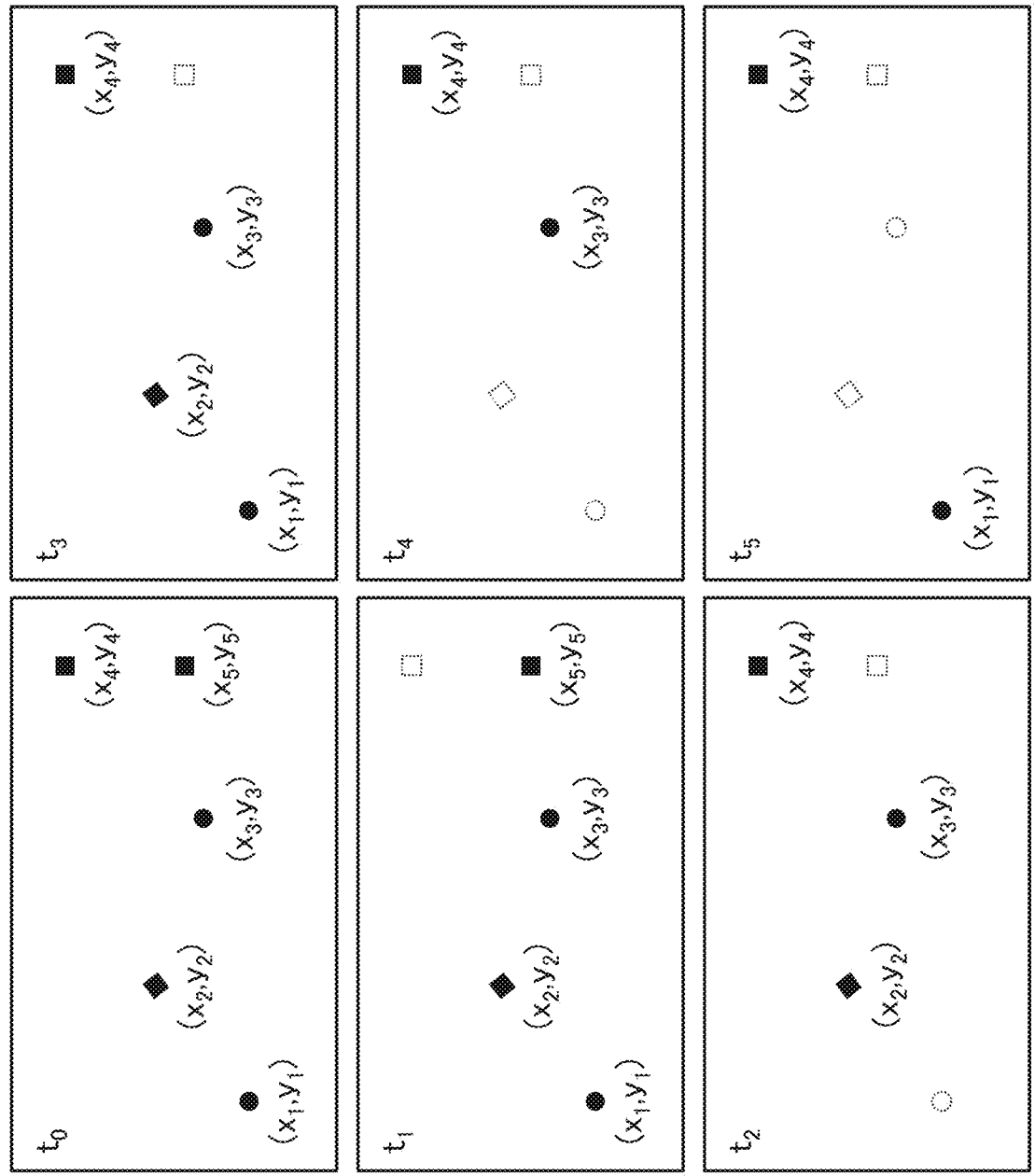
FIG. 18 is a conceptual diagram illustrating an example of transition of an image captured in a predetermined period by the monitoring device of the management system according to the first example embodiment.

FIG. 18 is a conceptual diagram illustrating an example of reflected light detected on an image captured by the monitoring device 10 at each of timing to, timing $t_1$, timing $t_2$, timing $t_3$, timing $t_4$, and timing $t_5$. It is indicated that the reflected light is not detected at the position of the outlined figure at each timing in FIG. 18. By verifying at which timing of timing $t_1$, timing $t_2$, timing $t_3$, timing $t_4$, and timing $t_5$ the reflected light is detected, the identification number of the detection device 16 for each position coordinate on the image can be identified.

In the example of FIG. 18, reflected light is detected at each of timing to, timing $t_1$, timing $t_2$, timing $t_3$, timing $t_4$, and timing $t_5$ as follows. At timing to, reflected light is detected at $(x_1, y_1)$, $(x_2, y_2)$, $(x_3, y_3)$, $(x_4, y_4)$, and $(x_5, y_5)$. At timing $t_1$, reflected light is detected at $(x_1, y_1)$, $(x_2, y_2)$, $(x_3, y_3)$, and $(x_4, y_4)$. At timing $t_2$, reflected light is detected at $(x_2, y_2)$, $(x_3, y_3)$, and $(x_4, y_4)$. At timing $t_3$, reflected light is detected at $(x_1, y_1)$, $(x_2, y_2)$, $(x_3, y_3)$, and $(x_4, y_4)$. At timing $t_4$, reflected light is detected at $(x_3, y_3)$, and $(x_4, y_4)$. At timing $t_5$, reflected light is detected at $(x_1, y_1)$, and $(x_4, y_4)$.

FIG. 19 illustrates an example (identification information 1440) of the identification information stored in the monitoring device 10. The identification information 1440 stores identification numbers set for the plurality of detection devices 16 and light reception timings relevant to the identification numbers. The monitoring device 10 identifies the identification number according to the detection pattern of the reflected light detected at the predetermined timing.

FIG. 20 illustrates an example of the detection information (detection information 1430) in which the position of the reflected light detected on the image obtained by imaging the projection target surface 180 is associated with the identification number. By referring to the detection information 1430, it is possible to grasp the positional relationship of the plurality of detection devices 16 in the monitored space 181 projected on the projection target surface 180. The detection device 16 with the identification number 21 is located at $(x_1, y_1)$. The detection device 16 with the identification number 28 is located at $(x_2, y_2)$. The detection device 16 with the identification number 30 is located at $(x_3, y_3)$. The detection device 16 with the identification number 15 is located at $(x_4, y_4)$. The detection device 16 with the identification number 16 is located at $(x_5, y_5)$.

The monitoring device 10 transmits the detection information as illustrated in FIG. 20 to a management center (not illustrated). For example, an administrator of the management center uses the received detection information to display the position of the monitoring target where the detection device 16 is installed on the screen in real time or to issue a warning according to the positional relationship between the monitoring targets.

(Operation)

Next, the operation of the monitoring device 10 and the detection device 16 included in the management system 1 will be described with reference to the drawings. Hereinafter, the operation of the monitoring device 10 and the detection device 16 will be individually described.

[Monitoring Device]

Figure 21:
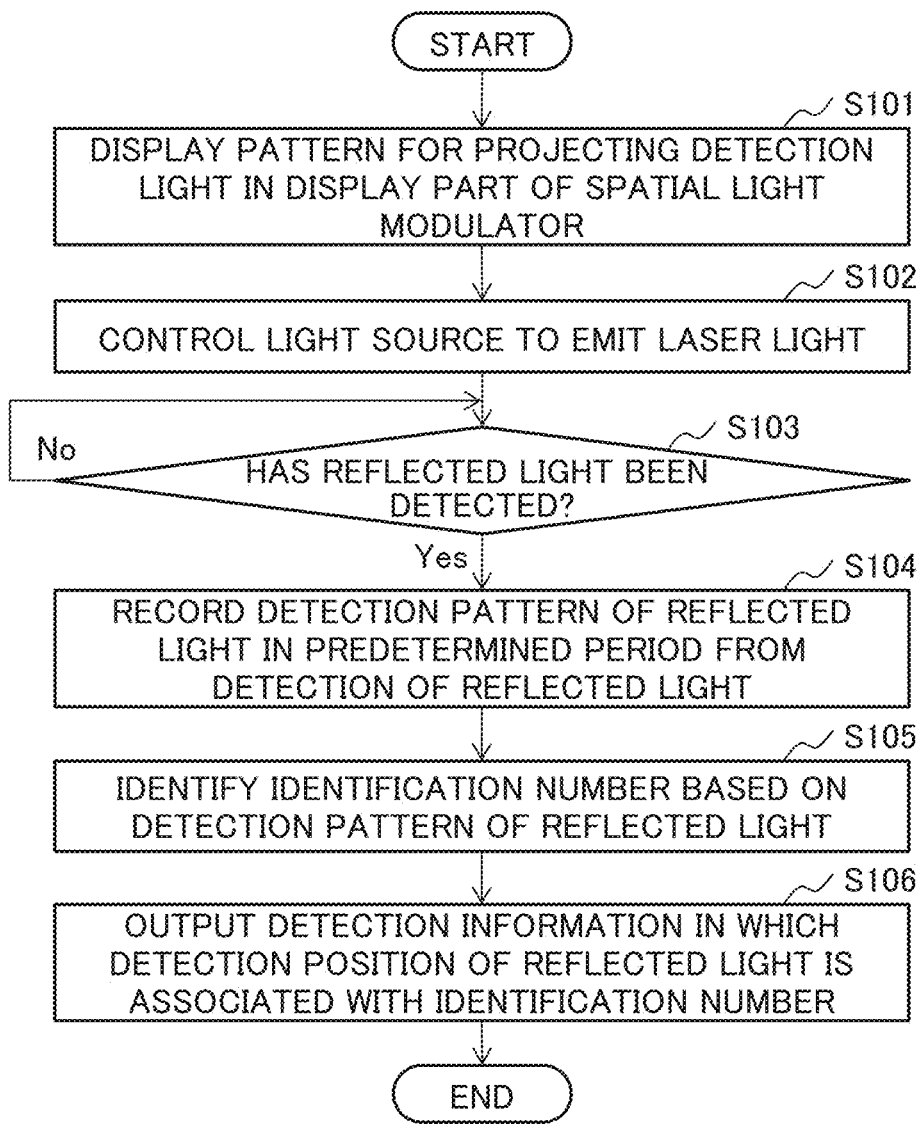
FIG. 21 is a flowchart for explaining an example of an operation of the monitoring device of the management system according to the first example embodiment.

FIG. 21 is a flowchart for explaining an example of the operation of the monitoring device 10. In the description along FIG. 21, the monitoring device 10 will be described as main operation.

In FIG. 21, first, the monitoring device 10 sets a pattern for projecting the detection light 105 as the display part of the spatial light modulator 130 (step S101).

Next, the monitoring device 10 controls the light source 120 to emit laser light (parallel light 102) (step S102). As a result, the parallel light 102 emitted to the display part of the spatial light modulator 130 is modulated, and the detection light 105 is projected from the monitoring device 10.

When the reflected light is detected (Yes in step S103), the monitoring device 10 records a detection pattern of the reflected light in a predetermined period after the reflected light is detected (step S104). On the other hand, when the reflected light is not detected (No in step S103), the monitoring device 10 waits until the reflected light is detected.

After step S104, the monitoring device 10 identifies the identification number based on the detected detection pattern of the reflected light (step S105).

Then, the monitoring device 10 outputs the detection information in which the identification number is associated with the detection position of the reflected light (step S106). In step S106, the process according to the flowchart of FIG. 21 ends. In a case where the process according to the flowchart of FIG. 21 is continued, the process may be set to return to step S101 or step S103 after step S106.

[Detection Device]

Figure 22:
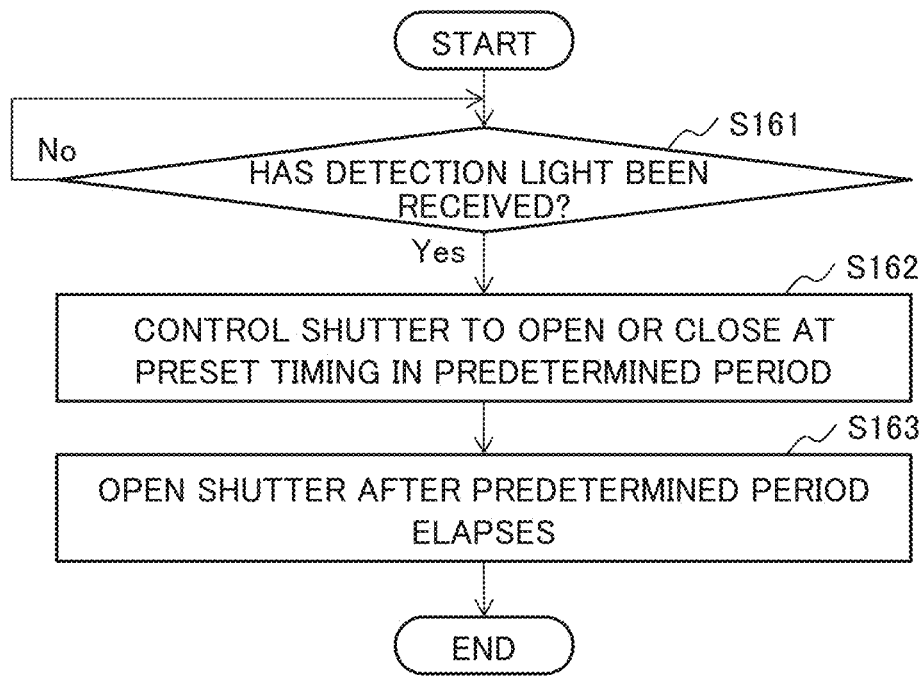
FIG. 22 is a flowchart for explaining an example of an operation of the detection device of the management system according to the first example embodiment.

FIG. 22 is a flowchart for explaining an example of the operation of the detection device 16. In the description along FIG. 22, the detection device 16 will be described as main operation.

When the detection light 105 is detected (Yes in step S161), the detection device 16 controls the shutter 161 to open and close at a timing set in advance based on the identification number of the detection device in a predetermined period from the timing at which the detection light 105 is detected (step S162). On the other hand, when the detection light is not detected (No in step S161), the detection device 16 keeps the shutter 161 open.

After step S162, when a predetermined period has elapsed from the timing at which the detection light 105 is detected, the detection device 16 opens the shutter 161 (step S163).

As described above, the management system of the present example embodiment includes the monitoring device and at least one detection device. The monitoring device projects detection light for detecting a monitoring target. The detection device is installed on the monitoring target. The detection device receives the detection light projected by the monitoring device, and reflects the detection light at a timing set in the detection device in a predetermined period starting from a timing at which the detection light is received. The monitoring device identifies the monitoring target based on the detection pattern of the reflected light of the detection light.

According to the present example embodiment, since the monitoring target can be identified according to the pattern of the reflected light, it is possible to grasp the positional relationship of the monitoring target located in the monitored space and perform safety management.

In one mode of the present example embodiment, the detection device includes a light receiver, a reflector, a shutter, an opening and closing condition storage unit, and an opening and closing control unit. The light receiver receives detection light projected from the monitoring device.

The reflector retroreflects the detection light projected from the monitoring device. The shutter is opened and closed to control the incidence of light on the reflector. The opening and closing condition storage unit stores the opening and closing condition of the shutter according to the identification number set in the detection device. The opening and closing control unit opens and closes the shutter based on the opening and closing condition stored in the opening and closing condition storage unit in a predetermined period starting from the timing at which the light receiver receives the detection light.

In one mode of the present example embodiment, the detection device opens and closes the shutter in the arrangement order of the logical values of the bits when the identification number set in the detection device is expressed in the binary number in a predetermined period starting from the timing at which the detection light is received. The monitoring device identifies the identification numbers of the detection devices at the plurality of positions where the reflected light is detected based on the detection patterns of the reflected light at the plurality of positions where the reflected light is detected.

In one mode of the present example embodiment, the monitoring device identifies the identification numbers of the plurality of detection devices at the positions where the reflected light is detected based on the detection patterns of the reflected light at the plurality of positions where the reflected light is detected, and outputs the detection information including the positional relationship among the plurality of detection devices.

In one mode of the present example embodiment, the monitoring device includes a projector, a projection control unit, a reflected light receiver, and an identification unit. The projector includes a light source that emits light having a wavelength in an infrared region, and a spatial light modulator including a display part irradiated with the light emitted from the light source. The projection control unit controls the spatial light modulator to set a pattern to be displayed on the display part, and controls the light source to set the irradiation timing of the light emitted to the display part. The reflected light receiver receives the reflected light. When the reflected light receiver receives the reflected light, the identification unit identifies the identification number of the detection device at the position where the reflected light is detected based on the detection pattern of the reflected light at the position where the reflected light is detected in a predetermined period starting from the timing at which the reflected light is detected.

Second Example Embodiment

Next, a management system according to a second example embodiment will be described with reference to the drawings. The present example embodiment is different from the first example embodiment in that a monitoring device projects projection light in a visible region in addition to detection light in an infrared region.

(Configuration)

Figure 23:
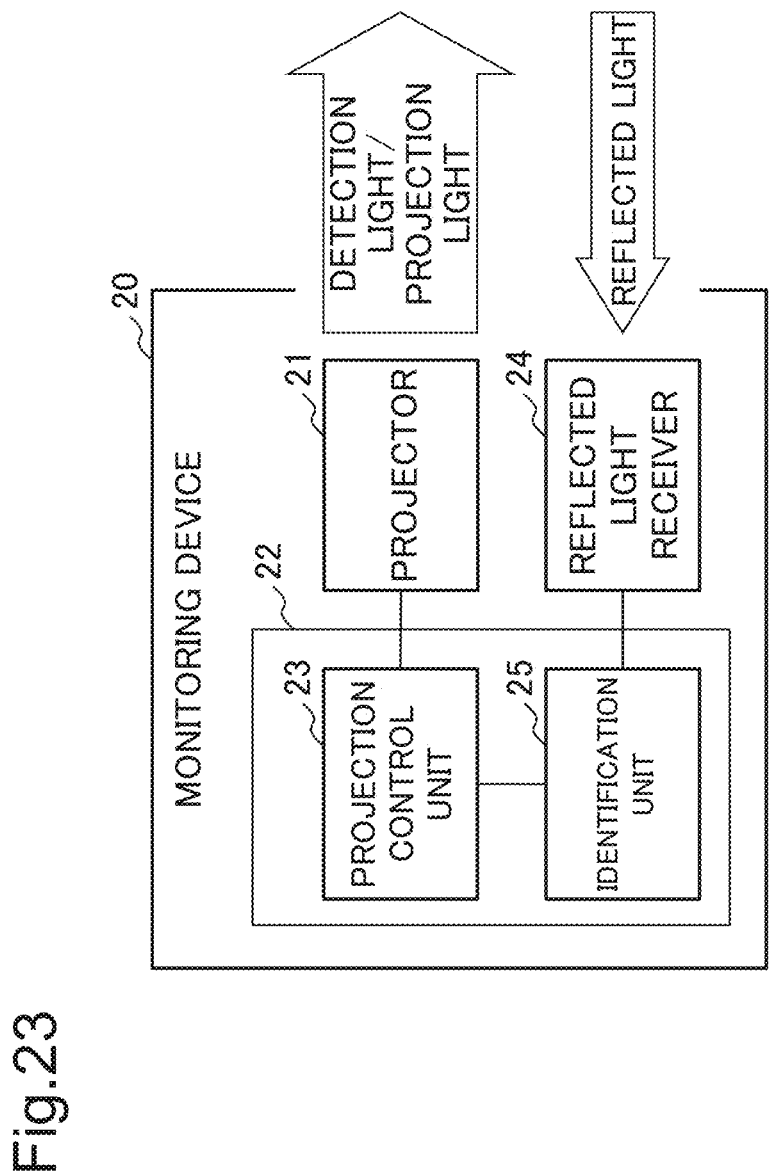
FIG. 23 is a conceptual diagram illustrating an example of a configuration of a monitoring device according to a second example embodiment.

FIG. 23 is a block diagram illustrating an example of the monitoring device 20 according to the present example embodiment. The monitoring device 20 includes a projector 21, a projection control unit 23, a reflected light receiver 24, and an identification unit 25. The projection control unit 23 and the identification unit 25 constitute a monitoring control unit 22. The reflected light receiver 24 and the identification unit 25 is similar to the reflected light receiver 14 and the identification unit 15, respectively, of the first example embodiment, and thus, a detailed description thereof will be omitted.

The projector 21 is a projector including a spatial light modulator. The projector 21 projects detection light having a wavelength in an infrared region under the control of the projection control unit 23. The projector 21 projects projection light having a wavelength in the visible region under the control of the projection control unit 23. The spatial light modulator of the projector 21 includes a modulation unit that displays a pattern according to the detection light or the projection light to be projected. The light emitted to the modulation unit in a state where the pattern according to the detection light or the projection light is displayed is modulated when reflected by the modulation unit. The light modulated by the modulation unit is projected as detection light or projection light via the projection optical system. For example, the projector 21 switches and projects the detection light or the projection light under the control from the projection control unit 23. For example, the projector 21 simultaneously projects the detection light and the projection light under the control from the projection control unit 23.

The projection control unit 23 causes the modulation unit of the spatial light modulator of the projector 21 to display a pattern according to the detection light or the projection light. The projection control unit 23 controls the emission timing of the light source of the projector 21 in a state where the pattern according to the detection light or the projection light is displayed on the modulation unit, and causes the light source to irradiate the modulation unit with light. For example, the projection control unit 23 receives an instruction to switch the projection of the detection light and the projection light from the identification unit 25, and switches the projection of the detection light and the projection light according to the received instruction.

When the reflected light is not received by the reflected light receiver 24, the projection control unit 23 causes the projector 21 to project the detection light in the infrared region. When the reflected light receiver 24 receives the reflected light, the projection control unit 23 causes the projector 21 to continuously project the detection light in the infrared region for a predetermined period from the timing at which the reflected light is received. Then, when the identification number of the detection device is specified after a lapse of a predetermined period from the timing at which the reflected light is received, the projection control unit 23 causes the projector 21 to project the projection light in the visible region such that display-information according to the identification number is displayed near the monitoring target to which the identification number is assigned.

<Projector>

Figure 24:
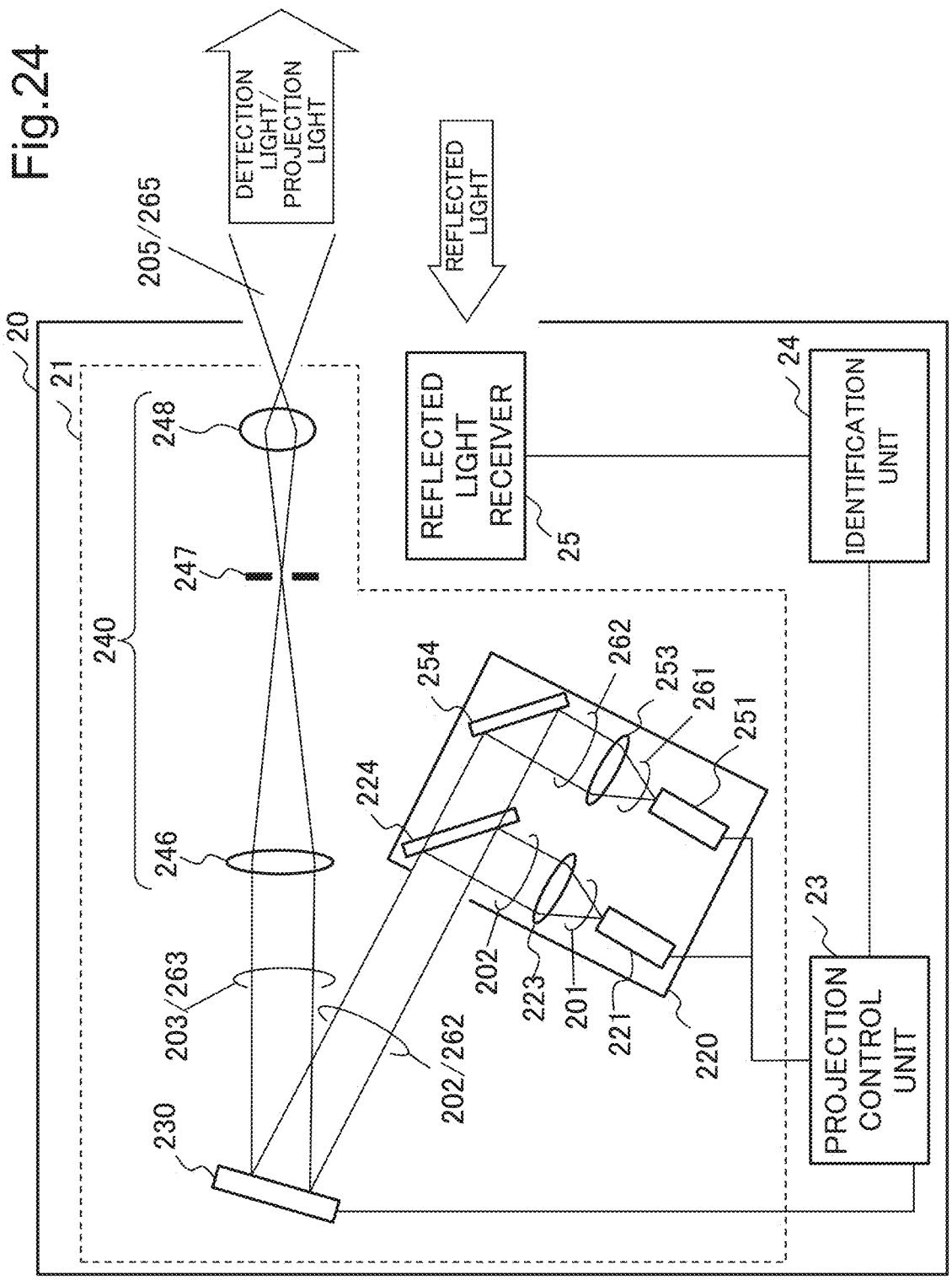
FIG. 24 is a conceptual diagram for explaining a configuration of a projector included in the monitoring device according to the second example embodiment.

FIG. 24 is a conceptual diagram illustrating an example of a configuration of the projector 21. The projector 21 includes a light source 220, a spatial light modulator 230, and a projection optical system 240. Note that FIG. 24 is conceptual, and does not accurately represent the positional relationship between the components, the light irradiation direction, and the like. The projector 21 is different from the projector 11 of the first example embodiment in the configuration of the light source. In the following description, the configuration of the light source 220 will be mainly focused.

The light source 220 includes an emitter 221 that emits laser light 201 having a wavelength in an infrared region, a collimator 223 that converts the laser light 201 emitted from the emitter 221 into parallel light 202, and a half mirror 224 that reflects the parallel light 202 toward a display part of the spatial light modulator 230. The light source 220 includes an emitter 251 that emits laser light 261 having a wavelength in the visible region, a collimator 253 that converts the laser light 261 emitted from the emitter 251 into parallel light 262, and a mirror 254 that reflects the parallel light 262 toward a display part of the spatial light modulator 230.

The emitter 221 emits the laser light 201 having a wavelength in the infrared region under the control of the projection control unit 23. The laser light 201 emitted from the emitter 221 is converted into the parallel light 202 by the collimator 223. The parallel light 202 is reflected by the half mirror 224 and emitted from the light source 220. The parallel light 202 emitted from the light source 220 travels toward the modulation unit of the spatial light modulator 230. For example, the emitter 221 emits laser light 201 in a 1.0 micrometer band or a 1.5 micrometer band. The wavelength region of the light emitted from the emitter 221 is not limited to a 1.0 micrometer band or a 1.5 micrometer band. The emitter 221 may be configured to emit light of a plurality of wavelength regions instead of a single wavelength region.

The emitter 251 emits the laser light 261 having a wavelength in the visible region under the control of the projection control unit 23. The laser light 261 emitted from the emitter 251 is converted into the parallel light 262 by the collimator 253. The parallel light 262 is reflected by the mirror 254, passes through the half mirror 224, and is emitted from the light source 220. The parallel light 262 emitted from the light source 220 travels toward the modulation unit of the spatial light modulator 230. For example, the emitter 221 emits laser light 261 having a wavelength included in a wavelength region of 380 to 750 nanometers. The emitter 221 may be configured to emit laser light 261 of a plurality of wavelength regions instead of laser light 261 of a single wavelength region.

The parallel light 202 incident on the modulation unit of the spatial light modulator 230 is modulated into the modulated light 203 when reflected by the modulation unit of the spatial light modulator 230. The modulated light 203 is projected as the detection light 205 via the projection optical system 240. The parallel light 262 incident on the modulation unit of the spatial light modulator 230 is modulated into the modulated light 263 when reflected by the modulation unit of the spatial light modulator 230. The modulated light 263 is projected as the projection light 265 via the projection optical system 240. In actual, materials suitable for the Fourier transform lens 246 and the projection lens 248 included in the projection optical system 240 are different between the modulated light 203 in the infrared region and the modulated light 263 in the visible region. Therefore, it is preferable that the modulated light 203 having the wavelength in the infrared region and the modulated light 263 having the wavelength in the visible region are projected via different projection optical systems 240 suitable for the light.

Figure 25:
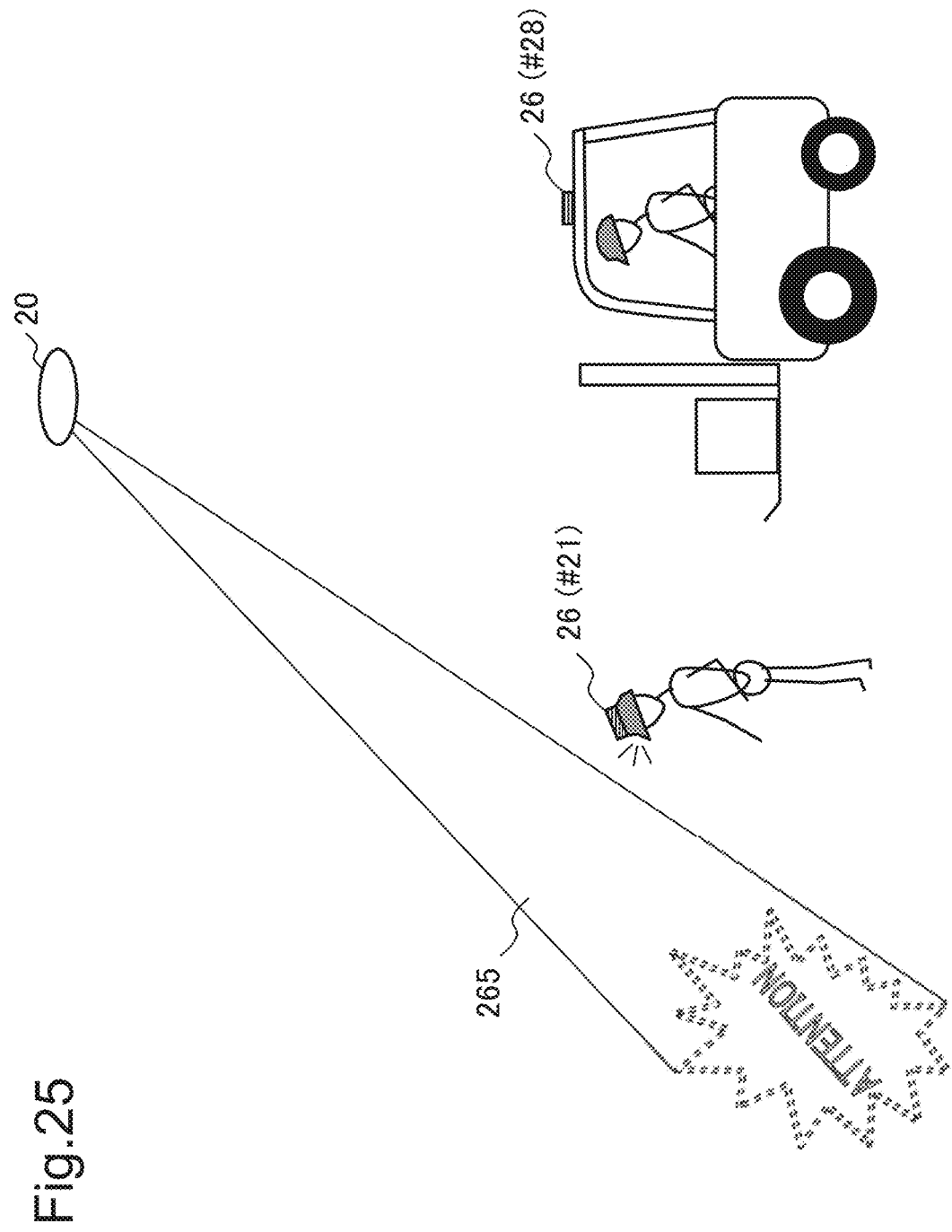
FIG. 25 is a conceptual diagram illustrating an example in which display-information is displayed by the projector included in the monitoring device according to the second example embodiment.

FIG. 25 illustrates an example in which the display-information formed by the projection light 265 projected from the monitoring device 20 is displayed near the detection device 26 of the identification number 21. In the example of FIG. 25, the forklift in which the detection device 26 of the identification number 28 is installed approaches from behind the worker wearing the helmet in which the detection device 26 of the identification number 21 is installed. For example, a warning range according to the distance between the detection device 26 with the identification number 21 and the detection device 26 with the identification number 28 is set between these detection devices 26. When the distance between the detection device 26 with the identification number 21 and the detection device 26 with the identification number 28 falls within the warning range, display-information indicating a warning is displayed near the detection device 26 with the identification number 21. As a result, the worker wearing the helmet in which the detection device 26 of the identification number 21 is installed can sense danger by the display-information displayed in the vicinity.

FIG. 26 illustrates an example (identification information 2440) of the identification information stored in the monitoring device 20. The identification information 2440 stores identification numbers set for the plurality of detection devices 26 and light reception timings relevant to the identification numbers. The identification information 2440 also stores a warning range associated with the identification number of each of the plurality of detection devices 26. For example, the warning range is set according to the type of the monitoring target in which the detection device 26 is installed. The monitoring device 20 identifies the identification number according to the detection pattern of the reflected light detected at the predetermined timing.

FIG. 27 illustrates an example of the detection information (detection information 2430) in which the position of the reflected light detected is associated with the identification number. The detection information 2430 of FIG. 27 includes a positional relationship of the detected identification numbers and a warning flag based on a warning range associated with the identification numbers.

The positional relationship among the plurality of detection devices 26 can be grasped with reference to the detection information 2430. The detection device 16 with the identification number 21 is located at $(x_1, y_1)$. The detection device 16 with the identification number 28 is located at $(x_2, y_2)$. The detection device 16 with the identification number 30 is located at $(x_3, y_3)$. The detection device 16 with the identification number 15 is located at $(x_4, y_4)$. The detection device 16 with the identification number 16 is located at $(x_5, y_5)$. Presence or absence of the warning according to the positional relationship among the plurality of detection devices 26 can be grasped with reference to the detection information 2430. The monitoring device 20 displays the display-information near at least one of the detection devices 26 in which the warning ranges overlap based on the identified identification number. For example, the monitoring device 20 displays display-information indicating a warning near the detection device 26 with the identification number in which the warning flag is 1.

(Operation)

Figure 28:
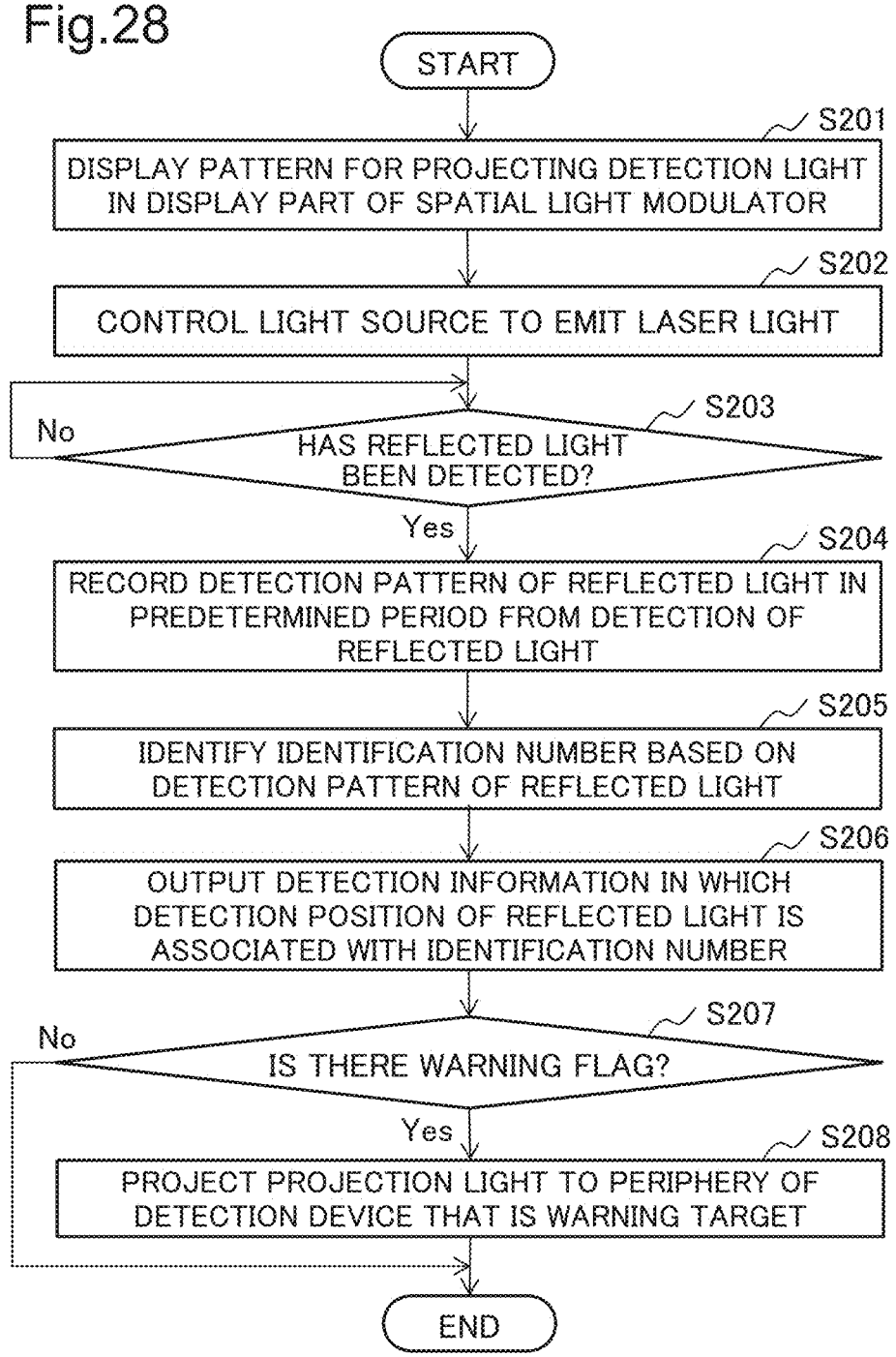
FIG. 28 is a flowchart for explaining an example of an operation of the monitoring device according to the second example embodiment.

Next, the operation of the monitoring device 20 will be described with reference to the drawings. FIG. 28 is a flowchart for explaining the operation of the monitoring device 20. In the description along FIG. 28, the monitoring device 20 will be described as main operation.

In FIG. 28, first, the monitoring device 20 sets a pattern for projecting the detection light 105 as the display part of the spatial light modulator 230 (step S201).

Next, the monitoring device 20 controls the light source 220 to emit laser light (parallel light 202) having a wavelength in an infrared region (step S202). As a result, the parallel light 202 emitted to the display part of the spatial light modulator 230 is modulated, and the detection light 205 is projected from the monitoring device 20.

When the reflected light is detected (Yes in step S203), the monitoring device 20 records a detection pattern of the reflected light in a predetermined period after the reflected light is detected (step S204). On the other hand, when the reflected light is not detected (No in step S203), the monitoring device 20 waits until the reflected light is detected.

After step S204, the monitoring device 20 identifies the identification number based on the detected detection pattern of the reflected light (step S205).

Next, the monitoring device 20 outputs the detection information in which the identification number is associated with the detection position of the reflected light (step S206). When the detection information is not output, step S206 may be omitted.

When the warning flag is set on the identified identification number (Yes in step S207), the monitoring device 20 projects projection light for displaying display-information according to a warning content toward the periphery of the detection device 26 as a warning target (step S208). In a case of projecting the projection light, the monitoring device 20 sets a pattern for projecting the projection light according to the warning content in the display part of the spatial light modulator 230, and controls the light source 220 to emit the laser light 261 in the visible region from the emitter 251. In step S208, the process according to the flowchart of FIG. 28 ends. In a case where the process according to the flowchart of FIG. 28 is continued, the process may be set to return to step S201 or step S203 after step S208.

On the other hand, when the warning flag is not set for the identified identification number (No in step S207), the process of step S208 is not performed, and the process according to the flowchart of FIG. 28 ends. In a case where the process according to the flowchart of FIG. 28 is continued, the process may be set to return to step S201 or step S203.

As described above, the monitoring device according to the present example embodiment includes a projector, a projection control unit, a reflected light receiver, and an identification unit. The projector includes a light source that emits light having a wavelength in an infrared region and a visible region, and a spatial light modulator including a display part irradiated with the light emitted from the light source. When projecting the detection light, the projection control unit controls the spatial light modulator to set a pattern to be displayed on the display part, and controls the light source to set the irradiation timing of the light having a wavelength in an infrared region emitted to the display part. The reflected light receiver receives the reflected light. When the reflected light receiver receives the reflected light, the identification unit identifies the identification number of the detection device at the position where the reflected light is detected based on the detection pattern of the reflected light at the position where the reflected light is detected in a predetermined period starting from the timing at which the reflected light is detected.

The identification unit of one mode of the present example embodiment issues, in response to the identification of the identification number of the detection device, an instruction to the projection control unit to display display-information according to the identified identification number of the detection device near the detection device. The projection control unit controls the spatial light modulator in order to set a pattern for projecting the projection light for displaying display-information is displayed near the detection device on the display part according to the instruction of the identification unit. The projection control unit controls the light source in order to set the irradiation timing of the light having the wavelength in the visible region that is emitted to the display part in accordance with the control of the spatial light modulator.

The identification unit of one mode of the present example embodiment issues, in response to the identification of the identification numbers of a plurality of detection device, an instruction to the projection control unit to display display-information including notification contents according to the positional relationship of the identified detection devices near the detection devices. The projection control unit controls the spatial light modulator in order to set a pattern for projecting the projection light for displaying display-information is displayed near the detection device on the display part according to the instruction of the identification unit. The projection control unit controls the light source in order to set the irradiation timing of the light having the wavelength in the visible region that is emitted to the display part in accordance with the control of the spatial light modulator.

When the identification unit of one mode of the present example embodiment identifies the identification numbers of a plurality of detection device, the identification unit issues an instruction to the projection control unit to display display-information including a warning according to a space between at least two detection devices near the detection devices. The projection control unit controls the spatial light modulator in order to set a pattern for projecting the projection light for displaying display-information including a warning is displayed near the detection device on the display part according to the instruction of the identification unit. The projection control unit controls the light source in order to set the irradiation timing of the light having the wavelength in the visible region that is emitted to the display part in accordance with the control of the spatial light modulator.

Third Example Embodiment

Next, a management system according to a third example embodiment will be described with reference to the drawings. The present example embodiment is different from the first and second example embodiments in that communication light is projected onto a detection device in addition to detection light for detecting the detection device. In addition, the present example embodiment is different from the first and second example embodiments in including a notification device that operates according to communication light when the detection device receives the communication light.

(Configuration)

Figure 29:
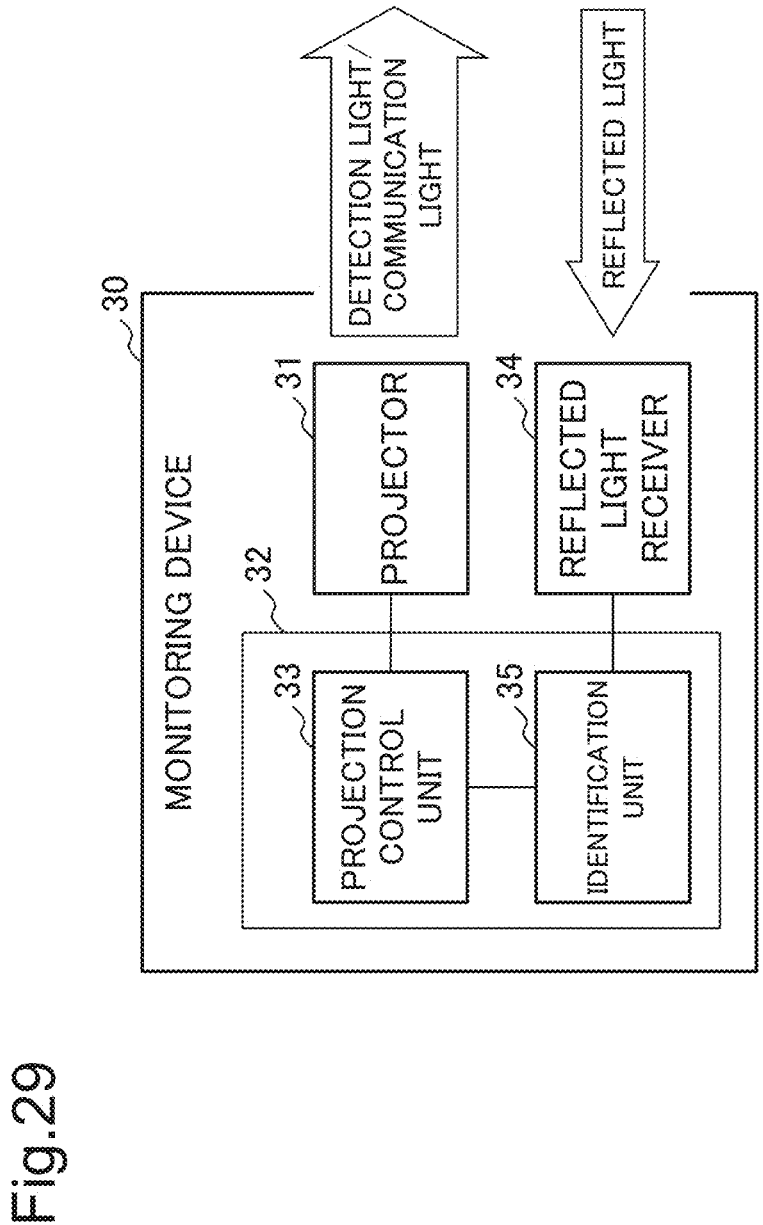
FIG. 29 is a conceptual diagram illustrating an example of a configuration of a monitoring device of a management system according to a third example embodiment.

FIG. 29 is a block diagram illustrating an example of the monitoring device 30 according to the present example embodiment. The monitoring device 30 includes a projector 31, a projection control unit 33, a reflected light receiver 34, and an identification unit 35. The projection control unit 33 and the identification unit 35 constitute a monitoring control unit 32. The reflected light receiver 34 and the identification unit 35 is similar to the reflected light receiver 14 and the identification unit 15, respectively, of the first example embodiment, and thus, a detailed description thereof will be omitted.

The projector 31 is a projector including a spatial light modulator. The projector 31 projects detection light having a wavelength in an infrared region at a first output under the control of the projection control unit 33. The projector 31 projects communication light having a wavelength in an infrared region at a second output under the control of the projection control unit 33. The first output is set to be higher than the second output. The spatial light modulator of the projector 31 includes a modulation unit that displays a pattern according to the detection light and the communication light to be projected. The light emitted to the modulation unit in a state where the pattern according to the detection light and the communication light is displayed is modulated when reflected by the modulation unit. The light modulated by the modulation unit is projected as detection light and communication light via the projection optical system. For example, the projector 31 switches and projects the detection light or the communication light under the control from the projection control unit 33.

The projection control unit 33 causes the modulation unit of the spatial light modulator of the projector 31 to display a pattern according to the detection light and the communication light. The projection control unit 33 controls the emission timing of the light source of the projector 31 in a state where the pattern according to the detection light and the communication light is displayed on the modulation unit, and causes the light source to irradiate the modulation unit with light. For example, the projection control unit 33 receives an instruction to switch the projection of the detection light and the communication light from the identification unit 35, and switches the projection of the detection light and the projection light according to the received instruction.

When the reflected light is not received by the reflected light receiver 34, the projection control unit 33 causes the projector 31 to project the detection light in the infrared region. When the reflected light receiver 34 receives the reflected light, the projection control unit 33 causes the projector 31 to project the detection light in the infrared region for a predetermined period from the timing at which the reflected light is received. Then, when a predetermined period has elapsed from the timing at which the reflected light is received and the identification number and position of the detection device are specified, the projection control unit 33 causes the projector 31 to project communication light including communication information according to the specified identification number.

<Projector>

Figure 30:
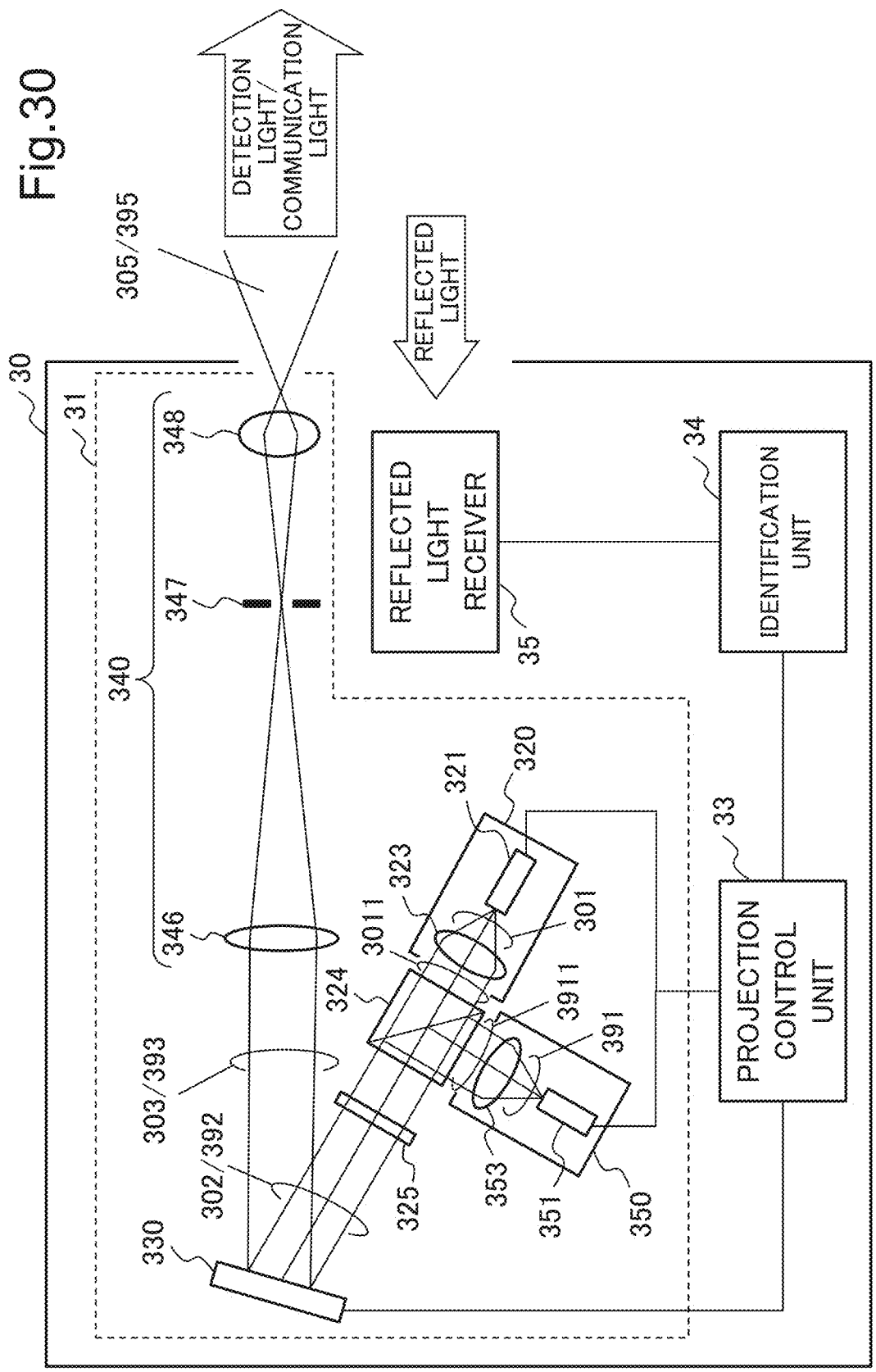
FIG. 30 is a conceptual diagram for explaining a projector included in the monitoring device of the management system according to the third example embodiment.

FIG. 30 is a conceptual diagram illustrating an example of a configuration of the projector 31. The projector 31 includes a first light source 320, a second light source 350, a polarization prism 324, a liquid crystal element 325, a spatial light modulator 330, and a projection optical system 340. Note that FIG. 30 is conceptual, and does not accurately represent the positional relationship between the components, the light irradiation direction, and the like. The projector 31 is different from the projector 11 of the first example embodiment in the configuration of the light source. In the following description, the configuration of the light source (first light source 320 and second light source 350) will be mainly focused.

The first light source 320 includes an emitter 321 that emits laser light 301 having a wavelength in an infrared region, and a collimator 323 that converts the laser light 301 emitted from the emitter 321 into parallel light 3011. The emitter 321 emits the laser light 301 having a wavelength in the infrared region under the control of the projection control unit 33. The laser light 301 emitted from the emitter 321 is converted into the parallel light 3011 by the collimator 323, and emitted from the first light source 320. The parallel light 3011 emitted from the first light source 320 is converted into polarized light 302 by the polarization prism 324, then converted into modulated light 303 by the modulation unit of the spatial light modulator 330, and projected as detection light 305.

For example, the emitter 321 emits laser light 301 in a 1.0 micrometer band. The wavelength region of the light emitted from the emitter 321 is not limited to a 1.0 micrometer band. The emitter 321 may be configured to emit light of a plurality of wavelength regions instead of a single wavelength region. The emitter 321 may emit light in the same wavelength region as that of the emitter 351, or may emit light in a wavelength region different from that of the emitter 351. As the emitter 321, an emitter capable of setting a higher output than the emitter 351 is used.

The second light source 350 includes an emitter 351 that emits laser light 391 having a wavelength in an infrared region, and a collimator 353 that converts the laser light 391 emitted from the emitter 351 into parallel light 3911. The emitter 351 emits the laser light 391 having a wavelength in the infrared region under the control of the projection control unit 33. The laser light 391 emitted from the emitter 351 is converted into the parallel light 3911 by the collimator 353, and emitted from the second light source 350.

The laser light 391 emitted from the emitter 351 is directly modulated under the control of the projection control unit 33. For example, the projection control unit 33 modulates the laser light 391 emitted from the emitter 351 by operating the emitter 351 to generate a pulse in which the laser light having a second luminance higher than a first luminance is added to the laser light having the first luminance. For example, the emitter 351 emits laser light 261 in a 1.5 micrometer band. The wavelength region of the light emitted from the emitter 351 is not limited to a 1.5 micrometer band. The emitter 351 may be configured to emit light of a plurality of wavelength regions instead of a single wavelength region.

The polarization prism 324 is installed on a path of parallel light 3011 emitted from first light source 320 and parallel light 3911 emitted from second light source 350. The polarization prism 324 is irradiated with the parallel light 3011 emitted from first light source 320 and the parallel light 3911 emitted from second light source 350. The polarization prism 324 converts each of the parallel light 3011 and the parallel light 3911 respectively emitted from the first light source 320 and the second light source 350 into completely polarized light (polarized light 302, polarized light 392). The polarized light 302 and the polarized light 392 converted into the completely polarized light by the polarization prism 324 travel toward the liquid crystal element 325.

The liquid crystal element 325 is installed between the polarization prism 324 and the spatial light modulator 330. The liquid crystal element 325 is irradiated with the polarized light 302 and the polarized light 392 converted into the completely polarized light by the polarization prism 324. The liquid crystal element 325 rotates the polarization planes of the emitted polarized light 302 and polarized light 392. The polarized light 302 and the polarized light 392 with the rotated polarization plane travel toward the display part of the spatial light modulator 330.

A pattern for projecting the detection light 305 is set in the modulation unit of the spatial light modulator 330. The polarized light 302 incident on the modulation unit of the spatial light modulator 330 in which the pattern for projecting the detection light 305 is set is modulated into the modulated light 303 when reflected by the modulation unit of the spatial light modulator 330. The modulated light 303 is projected as the detection light 305 via the projection optical system 340.

A pattern for determining the projection direction of the communication light 395 is set in the modulation unit of the spatial light modulator 330. The polarized light 392 incident on the modulation unit of the spatial light modulator 330 in which the pattern for determining the projection direction of the communication light 395 is set is reflected by the modulation unit of the spatial light modulator 330. Since the polarized light 392 has already been modulated, it is not modulated by the modulation unit of the spatial light modulator 330. The reflected light (modulated light 393) reflected by the modulation unit of the spatial light modulator 330 has a component similar to that of the polarized light 392. The modulated light 393 is projected as the communication light 395 via the projection optical system 340.

<Projection Control Unit>

Figure 31:
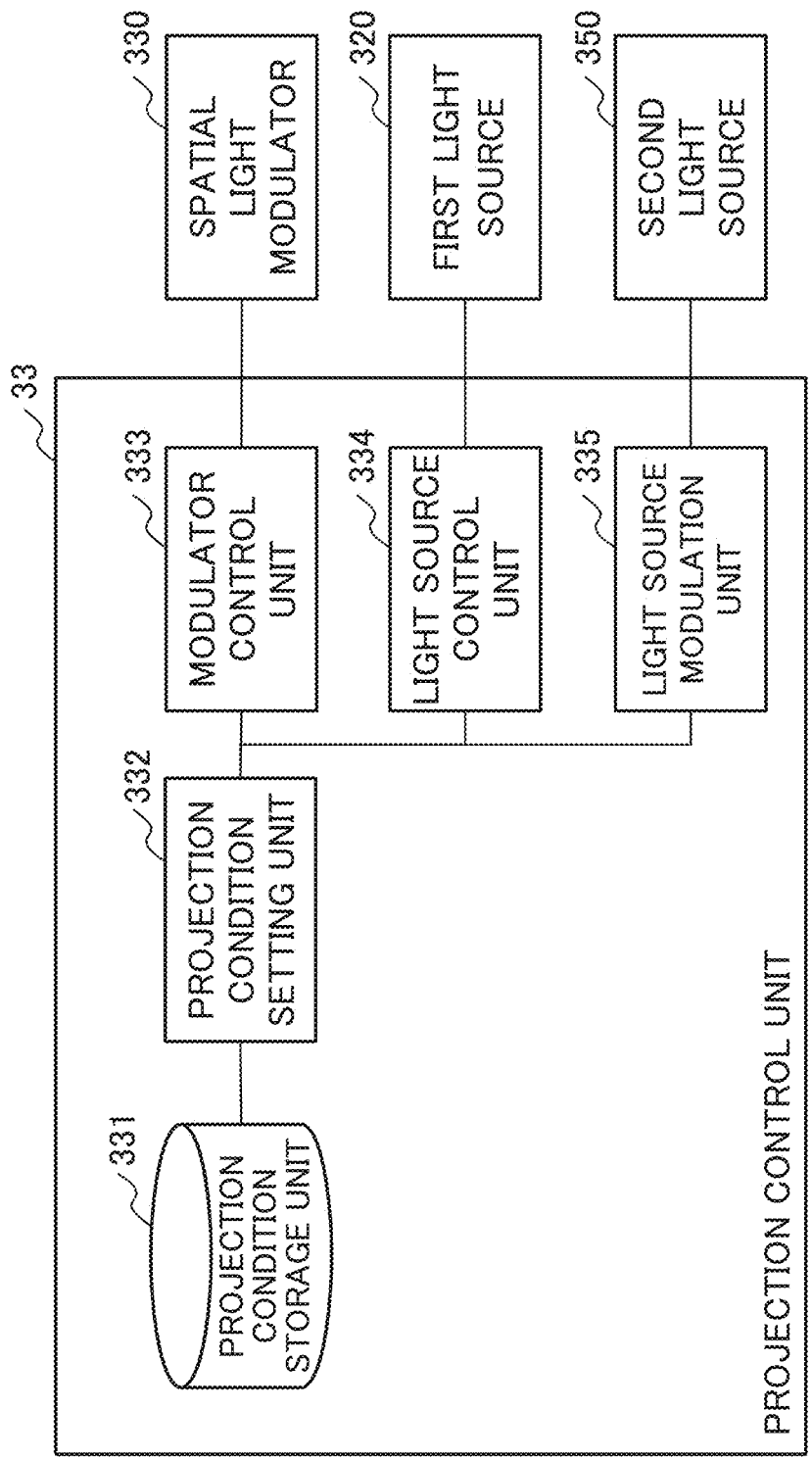
FIG. 31 is a conceptual diagram illustrating an example of a configuration of the projection control unit included in the monitoring device of the management system according to the third example embodiment.

FIG. 31 is a block diagram illustrating an example of a configuration of the projection control unit 33. The projection control unit 33 includes a projection condition storage unit 331, a projection condition setting unit 332, a modulator control unit 333, a light source control unit 334, and a light source modulation unit 335. In a case where the light source control unit 334 has a modulation function, the light source control unit 334 and the light source modulation unit 335 may have a single configuration.

The projection condition storage unit 331 stores a pattern according to the detection light 305 and a pattern according to the communication light 395. In a case where the spatial light modulator 330 of the projector 31 is of a phase modulation type, the projection condition storage unit 331 stores a phase distribution according to the detection light 305 and the communication light 395. The projection condition storage unit 331 stores the projection condition including a light source control condition for controlling the first light source 320, a light source modulation condition for controlling the second light source 350, and a modulation element control condition for controlling the spatial light modulator 330.

In a case of projecting the detection light 305, the projection condition setting unit 332 sets a projection condition for projecting the detection light 305. That is, the projection condition setting unit 332 sets, in the modulator control unit 333, a modulation element control condition for setting a pattern according to the detection light 305 in the modulation unit of the spatial light modulator 330. The projection condition setting unit 332 sets, in the light source control unit 334, a light source control condition for emitting the laser light 301 from the first light source 320. The projection condition setting unit 332 matches the timing at which the modulation element control condition is set in the modulator control unit 333 with the timing at which the light source control condition is set in the light source control unit 334 for emitting the detection light 305. As a result, the display part of the spatial light modulator 330 in a state where the pattern according to the detection light 305 is displayed is irradiated with the polarized light 302 based on the laser light 301 emitted from the first light source 320.

In a case of projecting the communication light 395, the projection condition setting unit 332 sets a projection condition for projecting the communication light 395. That is, the projection condition setting unit 332 sets, in the modulator control unit 333, a modulation element control condition for setting a pattern according to the communication light 395 in the modulation unit of the spatial light modulator 330. The projection condition setting unit 332 sets a light source modulation condition for adding a signal to the communication light 395 to the second light source 350. The projection condition setting unit 332 matches the timing at which the modulation element control condition is set in the modulator control unit 333 with the timing at which the light source modulation condition is set in the light source modulation unit 335 for emitting the communication light 395. As a result, the display part of the spatial light modulator 330 in a state where the pattern according to the projection direction of the communication light 395 is displayed is irradiated with the polarized light 392 based on the laser light 391 emitted from the second light source 350.

In a case of projecting the detection light 305, the modulator control unit 333 receives the pattern according to the detection light 305 and the modulation element control condition from the projection condition setting unit 332. The modulator control unit 333 drives a driver (not illustrated) that changes the pattern set in the modulation unit of the spatial light modulator 330 according to the modulation element control condition received from the projection condition setting unit 332. As a result, a pattern according to the detection light 305 is set in the modulation unit of the spatial light modulator 330.

In a case of projecting the communication light 395, the modulator control unit 333 receives the pattern according to the communication light 395 and the modulation element control condition from the projection condition setting unit 332. The modulator control unit 333 drives a driver (not illustrated) that changes the pattern set in the modulation unit of the spatial light modulator 330 according to the modulation element control condition received from the projection condition setting unit 332. As a result, a pattern according to the communication light 395 is set in the modulation unit of the spatial light modulator 330. In a case of projecting the communication light 395, not a pattern for modulating the polarized light 392 but a pattern for setting the projection direction of the communication light 395 is set in the modulation unit of the spatial light modulator 330.

The light source control unit 334 is connected to the projection condition setting unit 332 and the first light source 320. The light source control unit 334 drives a driving unit (not illustrated) of the emitter 321 according to the light source control condition received from the projection condition setting unit 332. As a result, the laser light 301 is emitted from the emitter 321. Then, the modulation unit of the spatial light modulator 330 is irradiated with the polarized light 302 caused by the laser light 301 in accordance with the timing at which the pattern is set in the modulation unit of the spatial light modulator 330, and the detection light 305 relevant to the pattern displayed on the modulation unit of the spatial light modulator 330 is projected.

The light source modulation unit 335 is connected to the projection condition setting unit 332 and the second light source 350. The light source modulation unit 335 controls the current of the emitter 351 included in the second light source 350 according to the light source modulation condition received from the projection condition setting unit 332, and modulates the light intensity of the laser light 391 emitted from the second light source 350. The light source control unit 334 modulates the pulse of the laser light 391 emitted from the second light source 350 according to the pattern of the signal to be added to the communication light 395. A pulsed laser light 391 according to a pattern of a signal to be added to the communication light 395 is emitted from the emitter 351. As a result, the modulation unit of the spatial light modulator 330 is irradiated with the polarized light 392 caused by the laser light 391 in accordance with the timing at which the pattern is set in the modulation unit of the spatial light modulator 330, and the communication light 395 is projected in the projection direction based on the pattern displayed on the modulation unit of the spatial light modulator 330.

[Detection Device]

Figure 32:
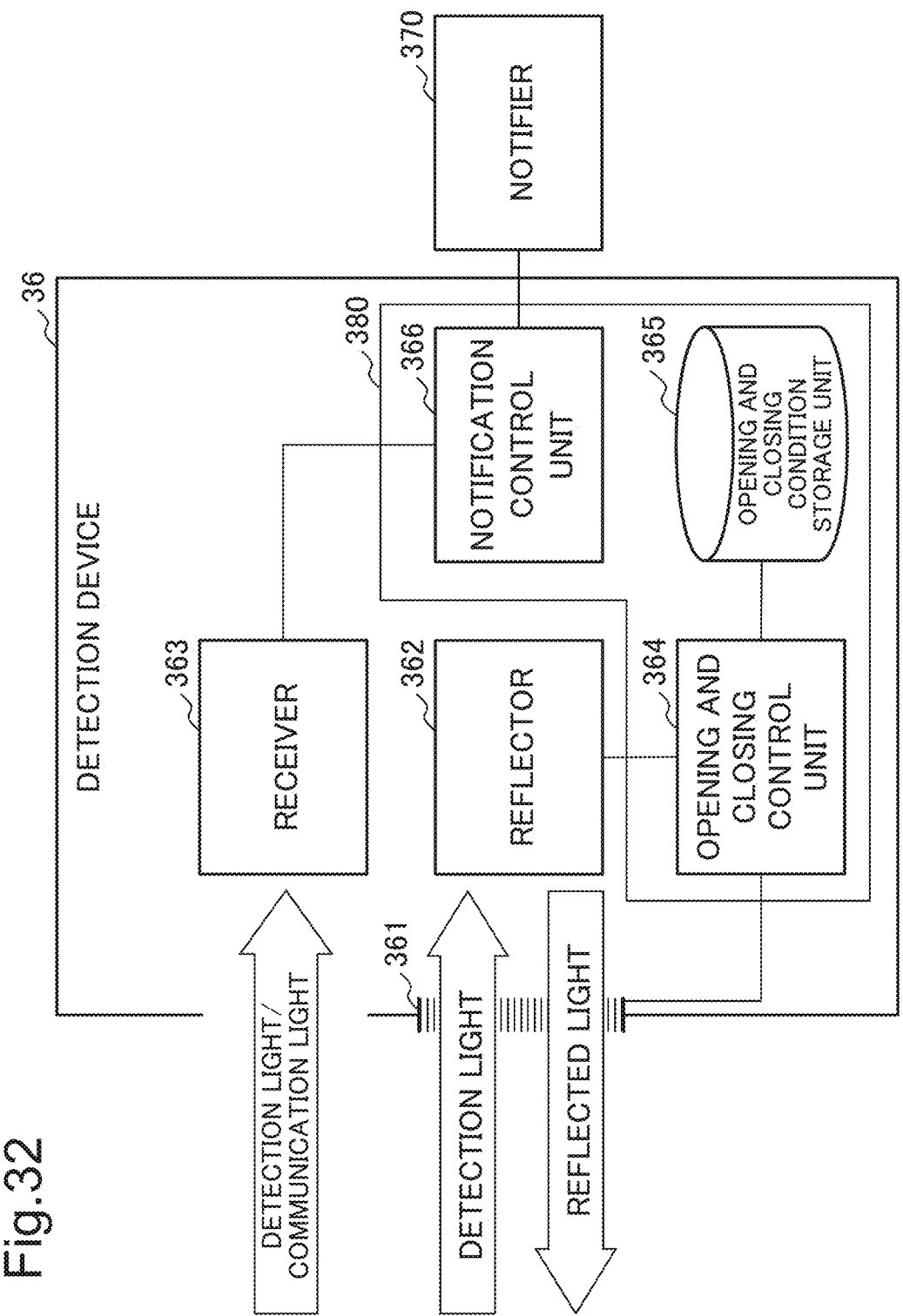
FIG. 32 is a conceptual diagram illustrating an example of a configuration of a detection device of the management system according to the third example embodiment.

FIG. 32 is a conceptual diagram illustrating an example of a configuration of a detection device 36 according to the present example embodiment. The detection device 36 includes a shutter 361, a reflector 362, a receiver 363, an opening and closing control unit 364, an opening and closing condition storage unit 365, and a notification control unit 366. The opening and closing control unit 364, the opening and closing condition storage unit 365, and the notification control unit 366 constitute a detection control unit 380. The notification control unit 366 is connected to a notifier 370. The notifier 370 may be included in the configuration of the detection device 36. Since the shutter 361, the reflector 362, the receiver 363, the opening and closing control unit 364, and the opening and closing condition storage unit 365 are similar to those of the first example embodiment, detailed description thereof will be omitted. In the following description, differences from the first and second example embodiments will be focused on.

The notifier 370 is a device that notifies reception of the detection light 305 or the communication light 395. The notifier 370 generates light, sound, vibration, and the like under the control of the notification control unit 366. For example, the notifier 370 is achieved by a device that emits light, such as a light emitting diode or a light bulb. For example, the notifier 370 is achieved by a device that emits sound, such as a headphone, an earphone, or a speaker. For example, the notifier 370 is achieved by a device that emits vibration, such as a vibration generator.

The receiver 363 is a photodetector that receives the detection light 305 and the communication light 395. When receiving the detection light 305 and the communication light 395, the receiver 363 converts the received detection light 305 and communication light 395 into an electric signal. The receiver 363 outputs the converted electric signal to the opening and closing control unit 164. The detection light 305 and the communication light 395 may be received by different light receivers 363.

The notification control unit 366 receives an electric signal based on the detection light 305 or the communication light 395 from the receiver 363. The notification control unit 366 controls the notifier 370 in accordance with the received electric signal. For example, upon receiving an electric signal based on the detection light 305, the notification control unit 366 controls the notifier 370 to generate light, sound, or vibration.

Figure 33:
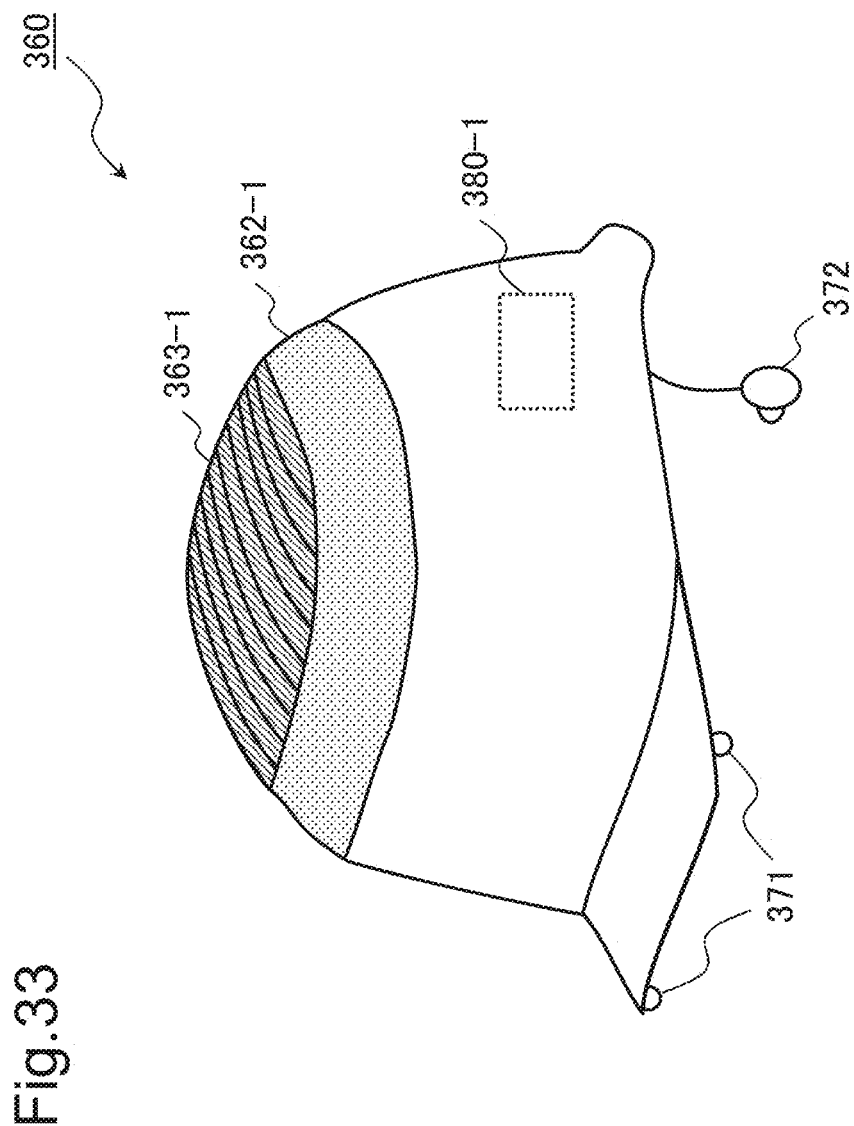
FIG. 33 is a conceptual diagram illustrating an example of a detection device of the management system according to the third example embodiment.

FIG. 33 is a conceptual diagram illustrating an example of a helmet 360 that achieves the detection device 36. The helmet 360 includes a shutter (not illustrated), a reflector 362-1, a receiver 363-1, and a detection control unit 380-1. In FIG. 33, a shutter is not illustrated in order to make the reflector 362-1 easily visible. The helmet 360 includes a first notifier 371 and a second notification device 372. For example, the first notifier 371 is installed on the back side or the side of the brim of the helmet 360 and emits light under the control of the detection control unit 380-1. For example, the second notifier 372 is installed on the side of the helmet 360 and the second notifier 372 emits sound under the control of the detection control unit 380-1. The worker wearing the helmet 360 can recognize the notification from the monitoring device 30 by the light emission of the first notifier 371 and the sound from the second notifier 372.

The shutter is installed to face the reflecting surface of the reflector 362-1. The shutter is opened and closed under the control of the detection control unit 380-1. When the shutter is opened, the detection light 305 is incident on the reflector 362-1. When the shutter is closed, the detection light 305 is not incident on the reflector 362-1. Opening/closing control of the shutter is similar to that of the shutter 361 of the detection device 36. For example, if the shutter is achieved by a flexible liquid crystal element, it is easy to form the shutter according to the shape of the helmet 360.

The reflector 362-1 has a reflecting surface that reflects the detection light and the communication light. The reflector 362-1 is installed such that the reflecting surface faces the shutter. The reflector 362-1 reflects the detection light and the communication light incident on the reflecting surface toward the monitoring device 30. The reflector 362-1 has the same configuration as the reflector 162 of the first example embodiment.

The receiver 363-1 is a photodetector that receives the detection light 305 and the communication light 395. When receiving the detection light 305 or the communication light 395, the receiver 363-1 converts the received detection light 305 or communication light 395 into an electric signal. The receiver 363 outputs the converted electric signal to the detection control unit 380-1.

For example, the receiver 363-1 can be achieved by a combination of an optical fiber formed in a linear shape or a plate shape and a light detection element installed with a light receiving surface facing an emission end of the optical fiber. For example, the receiver 363-1 receives the detection light 305 and the communication light 395 from the side surface of the optical fiber, totally reflects the received light inside the optical fiber, and guides the light toward a light detection element installed at one end portion of the optical fiber. The receiver 363-1 converts light received by the light detection element installed at one end portion of the optical fiber into an electric signal and outputs the electric signal to the detection control unit 380-1.

The detection control unit 380-1 receives an electric signal from the receiver 363-1. When receiving the electric signal based on the detection light, the detection control unit 380-1 performs the opening and closing control of the shutter based on the opening and closing condition set in the detection device. When receiving the electric signal based on the communication light, the detection control unit 380-1 controls at least one of the first notifier 371 and the second notifier 372 to cause the first notifier 371 to emit light or cause the second notifier 372 to generate sound. For example, the worker wearing the helmet 360 recognizes the notification based on the communication light 395 by visually recognizing that the first notifier 371 emits light or listening to the sound from the second notifier 372.

For example, when the worker wearing the helmet 360 is in danger, the detection control unit 380-1 transmits the communication light 395 for notifying that danger is imminent to the helmet 360. The worker wearing the helmet 360 can sense that danger is imminent according to the light emission of the first notifier 371 and the sound from the second notifier 372.

(Operation)

Next, the operation of the monitoring device 30 and the detection device 36 included in the management system of the present example embodiment will be described with reference to the drawings. Hereinafter, the operation of the monitoring device 30 and the detection device 36 will be individually described.

[Monitoring Device]

Figure 34:
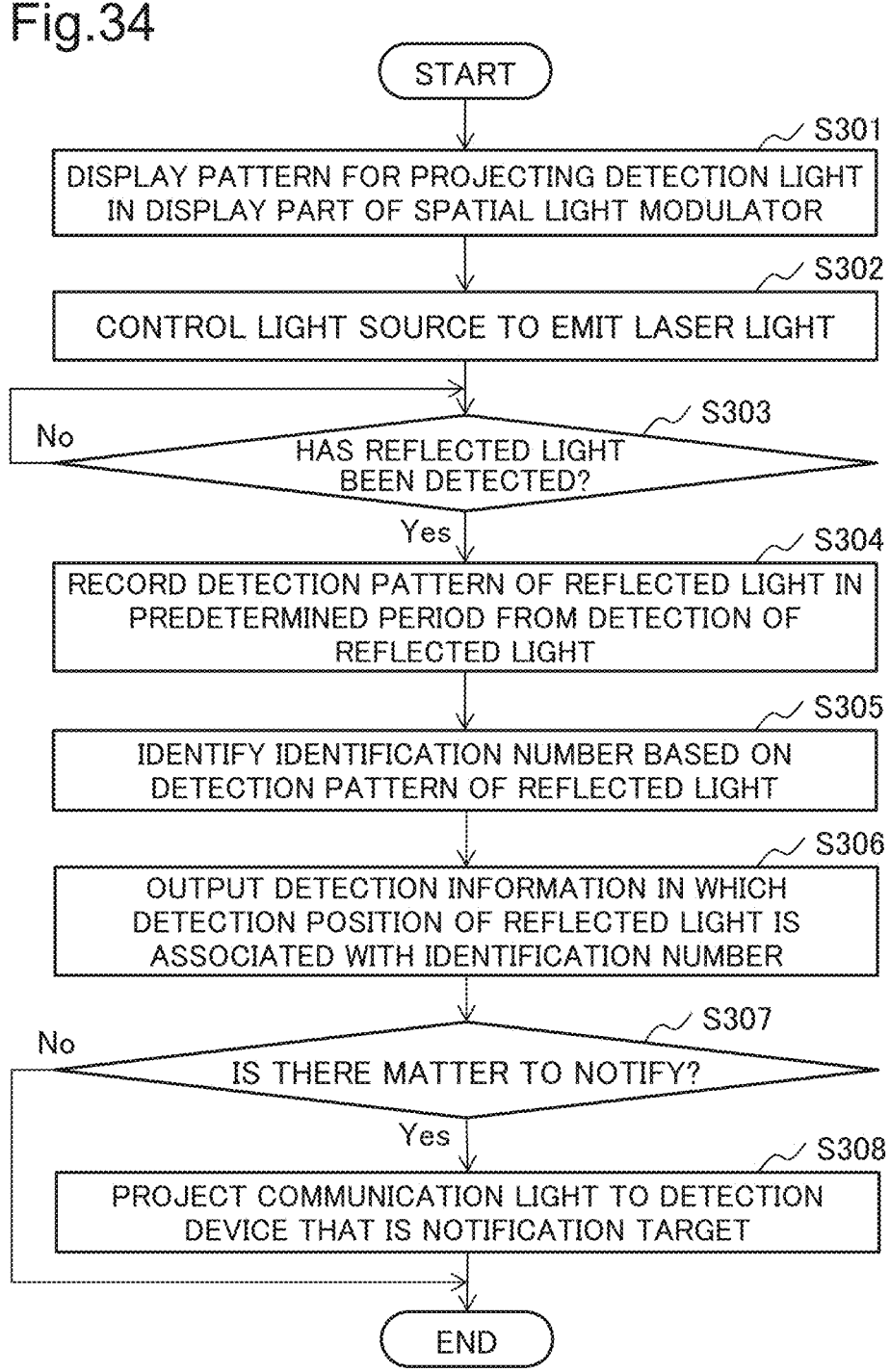
FIG. 34 is a flowchart for explaining an example of an operation of the monitoring device of the management system according to the third example embodiment.

In FIG. 34, first, the monitoring device 30 sets a pattern for projecting the detection light as the display part of the spatial light modulator 330 (step S301).

Next, the monitoring device 30 controls the first light source 320 to emit laser light (polarized light 302) having a wavelength in an infrared region (step S302). As a result, the polarized light 302 emitted to the display part of the spatial light modulator 330 on which the display is performed is modulated, and the detection light 305 is projected from the monitoring device 30.

When the reflected light is detected (Yes in step S303), the monitoring device 30 records a detection pattern of the reflected light in a predetermined period after the reflected light is detected (step S304). On the other hand, when the reflected light is not detected (No in step S303), the monitoring device 30 waits until the reflected light is detected.

After step S304, the monitoring device 30 identifies the identification number based on the detected detection pattern of the reflected light (step S305).

Next, the monitoring device 30 outputs the detection information in which the identification number is associated with the detection position of the reflected light (step S306). When the detection information is not output, step S306 may be omitted.

When there is a notification to any of the identified detection devices 36 (Yes in step S307), the monitoring device 30 projects communication light including the notification to the detection device 36 as the notification target (step S308). In a case of projecting the communication light, the monitoring device 30 sets a pattern for projecting the communication light on the display part of the spatial light modulator 330, and controls the second light source 350 to emit the laser light 391 in the infrared region from the emitter 351. In step S308, the process according to the flowchart of FIG. 34 ends. In a case where the process according to the flowchart of FIG. 34 is continued, the process may be set to return to step S301 or step S303 after step S308.

On the other hand, when there is no notification (No in step S307), the process of step S308 is not performed, and the process according to the flowchart of FIG. 34 ends. In a case where the process according to the flowchart of FIG. 34 is continued, the process may be set to return to step S301 or step S303.

[Detection Device]

Figure 35:
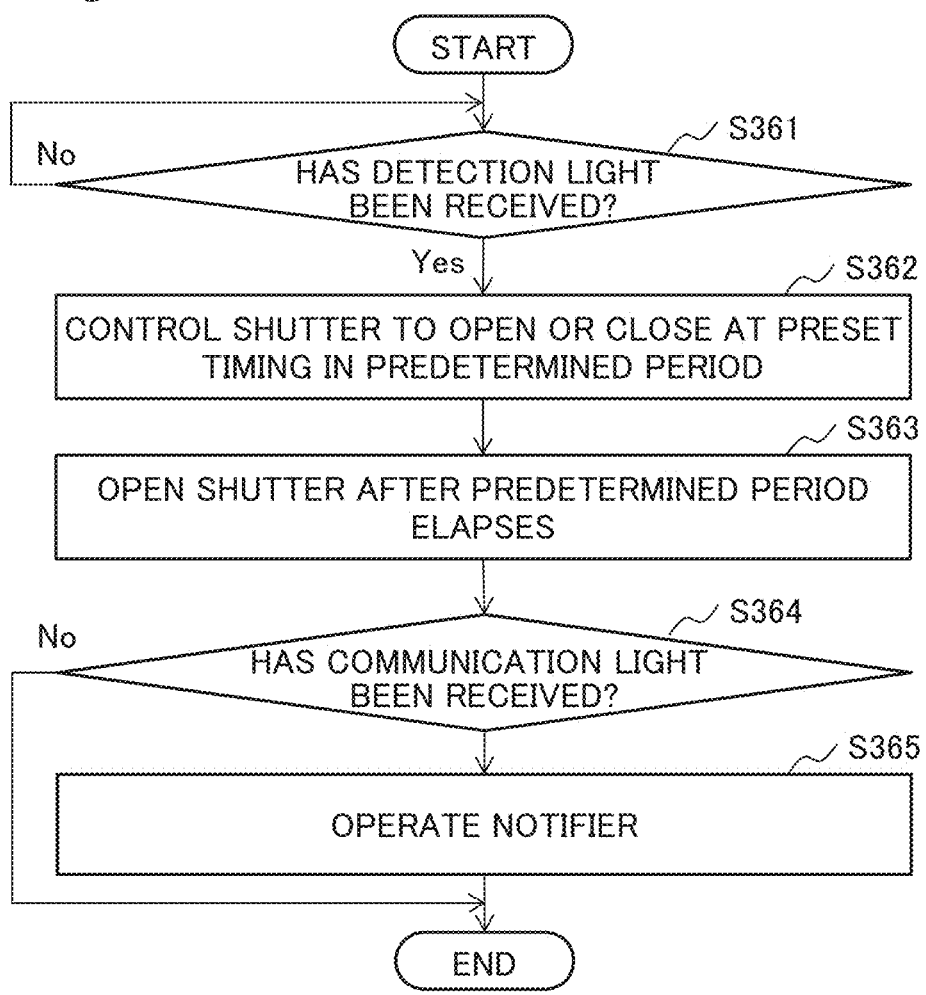
FIG. 35 is a flowchart for explaining an example of an operation of the detection device of the management system according to the third example embodiment.

FIG. 35 is a flowchart for explaining an example of the operation of the detection device 36. In the description along FIG. 35, the detection device 36 will be described as main operation.

When the detection light 305 is detected (Yes in step S361), the detection device 36 controls the shutter 361 to open and close at a timing set in advance based on the identification number in a predetermined period from the timing at which the detection light 305 is detected (step S362). On the other hand, when the detection light is not detected (No in step S361), the detection device 36 keeps the shutter 361 open.

After step S362, when a predetermined period has elapsed from the timing at which the detection light 305 is detected, the detection device 36 opens the shutter 361 (step S363).

When the communication light 395 is received (Yes in step S364), the detection device 36 operates the notifier 370 (step S365). In step S365, the process according to the flowchart of FIG. 35 ends. In a case where the process according to the flowchart of FIG. 35 is continued, the process may be set to return to step S361 after step S365.

On the other hand, when the communication light 395 is not received (No in step S364), the process according to the flowchart of FIG. 35 ends. In a case where the process according to the flowchart of FIG. 35 is continued, the process may be set to return to step S361.

As described above, the monitoring device according to the present example embodiment includes a projector, a projection control unit, a reflected light receiver, and an identification unit. The detection device of the present example embodiment includes a notifier that performs notification according to notification contents of communication light.

The projector includes a first light source that emits light having a wavelength in an infrared region at a first output, a second light source that emits light having a wavelength in an infrared region at a second output lower than the first output, and a spatial light modulator including a display part irradiated with the light emitted from the first light source and the second light source. When projecting the detection light, the projection control unit controls the spatial light modulator to set a pattern to be displayed on the display part, and controls the first light source to set the irradiation timing of the light emitted to the display part. The reflected light receiver receives the reflected light. When the reflected light receiver receives the reflected light, the identification unit identifies the identification number of the detection device at the position where the reflected light is detected based on the detection pattern of the reflected light at the position where the reflected light is detected in a predetermined period starting from the timing at which the reflected light is detected.

In one mode of the present example embodiment, when the identification unit identifies the identification number of the detection device, the identification unit issues an instruction to the projection control unit to project communication light according to the identified identification number of the detection device. In response to an instruction from the identification unit, the projection control unit controls the spatial light modulator to set a pattern for projecting the communication light toward the detection device in the display part, and controls the second light source to set the irradiation timing of the light that is emitted to the display part.

In one mode of the present example embodiment, when the identification unit identifies the identification numbers of a plurality of detection device, the identification unit issues an instruction to the projection control unit to project communication light including notification contents according to the positional relationship of the identified detection devices to the detection devices. In response to an instruction from the identification unit, the projection control unit controls the spatial light modulator to set a pattern for projecting the communication light toward the detection device in the display part, and controls the second light source to set the irradiation timing of the light that is emitted to the display part.

In the present example embodiment, a notifier is provided in the detection device to directly notify the worker wearing the detection device. Therefore, according to the present example embodiment, it is possible to more reliably notify the worker wearing the detection device according to the surrounding situation.

Application Example

Next, an application example in which the management system of each example embodiment is applied to management of monitoring targets such as workers and facilities will be described with some examples. The following application example is an example, and does not limit the management system according to each example embodiment.

Application Example 1

Figure 36:
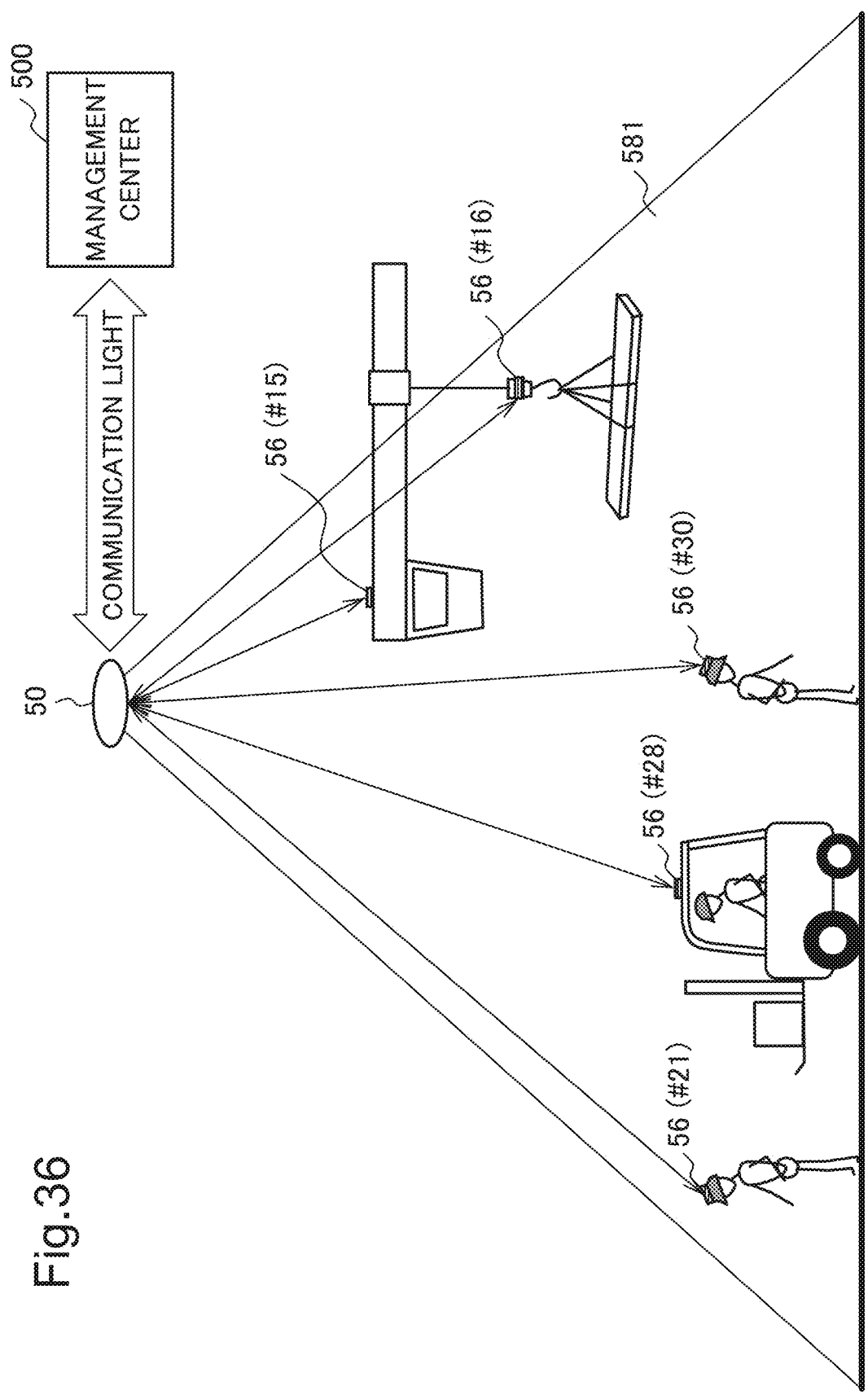
FIG. 36 is a conceptual diagram illustrating an example of a management system of Application Example 1.

FIG. 36 is a conceptual diagram for explaining Application Example 1. In Application Example 1, the monitoring device 50 also transmits communication light to a management center 500 managed by an administrator of a factory.

In the example of FIG. 36, detection devices 56 with the identification numbers 15, 16, 21, 28, and 30 are located in a monitored space 581 monitored by the monitoring device 50. The detection device 56 with the identification number 15 is installed in an upper part of an operating room of a crane. The detection device 56 with the identification number 16 is installed in a hook portion of the crane. The detection devices 56 with the identification numbers 21 and 30 are installed on the top of a helmet of a worker. The detection device 56 with the identification number 28 is installed in an upper part of a cab of a forklift.

Figure 37:
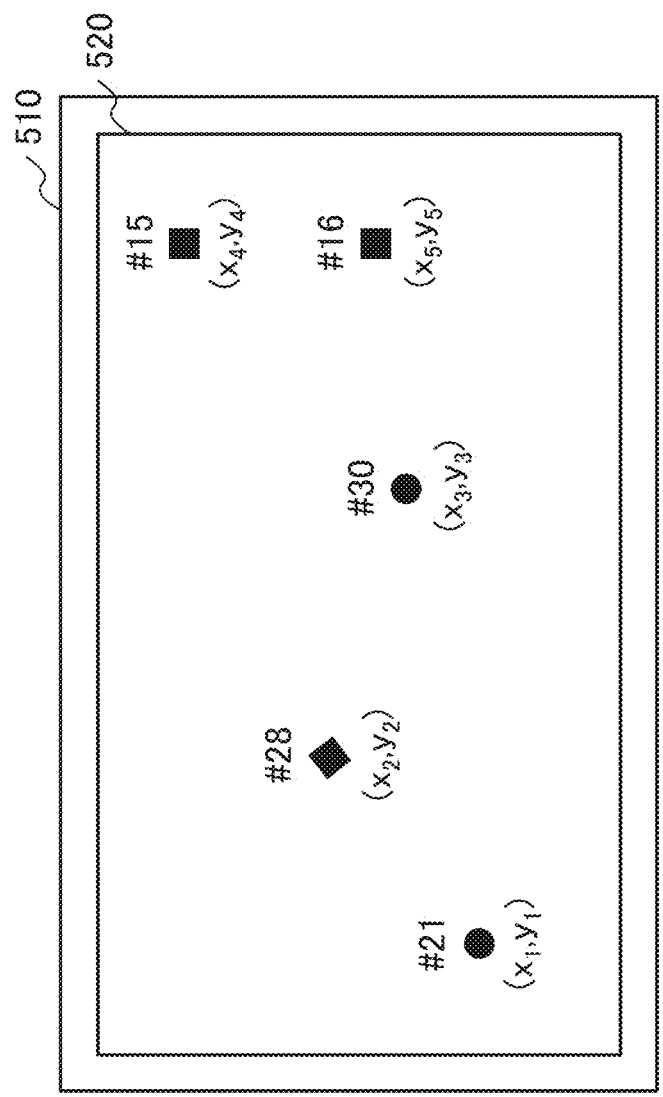
FIG. 37 is a conceptual diagram illustrating an example of detection information displayed on a terminal of a management center by the management system of Application Example 1.

FIG. 37 illustrates an example in which an image 520 indicating the positional relationship among the detection devices 56 with the identification numbers 15, 16, 21, 28, and 30 is displayed on the display device 510 installed in the management center 500. In the image 520, the position where the reflected light is detected is filled in black. In FIG. 37, the coordinates of the position where the reflected light is detected and the identification number of the detection device 56 located at the position coordinates are also written.

According to the present application example, the administrator who manages the factory in the management center 500 can grasp the positional relationship of the plurality of detection devices 56 located in the monitored space 581 by referring to the image 520 based on the communication light transmitted from the monitoring device 50.

Application Example 2

Figure 38:
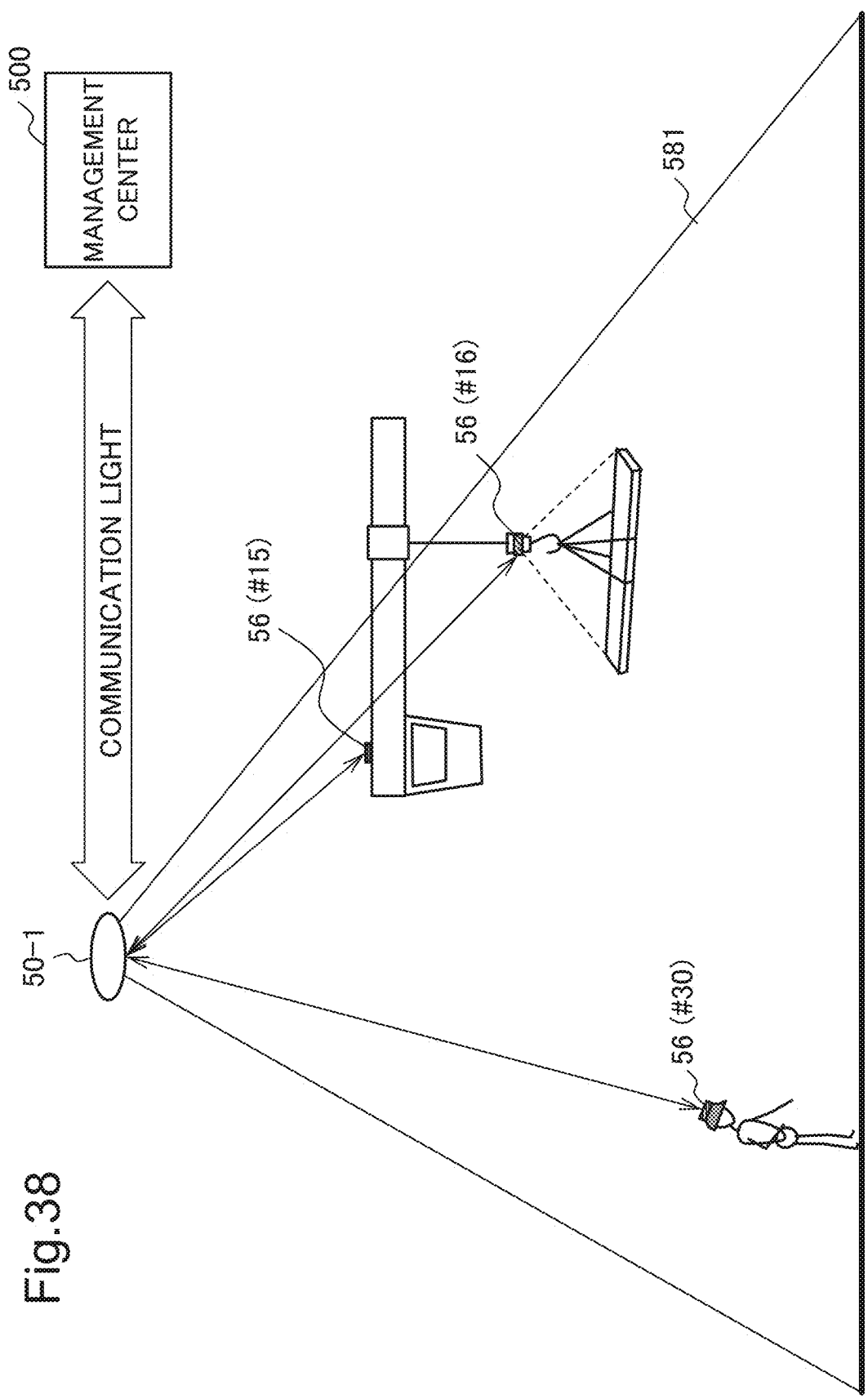
FIG. 38 is a conceptual diagram illustrating an example of a management system of Application Example 2.

FIG. 38 is a conceptual diagram for explaining Application Example 2. Application Example 2 is different from Application Example 1 in that a monitoring device 50-1 includes a camera. In Application Example 2, imaging is performed by a camera to detect a shape and a position from the ground of an object suspended by a crane.

In the example of FIG. 38, detection devices 56 with the identification numbers 15, 16, and 30 are located in a monitored space 581 monitored by the monitoring device 50-1. For example, the monitoring device 50-1 images a material suspended by a hook on which the detection device 56 with the identification number 16 is installed by a camera. The monitoring device 50-1 analyzes image data generated by imaging and updates identification information.

FIG. 39 illustrates an example (identification information 5440) of the identification information stored in the monitoring device 50-1. The identification information 5440 stores identification numbers set for the plurality of detection devices 26 and light reception timings relevant to the identification numbers. The identification information 5440 also stores a warning range associated with the identification number of each of the plurality of detection devices 56. The warning range stored in the identification information 5440 includes an initial value and a correction value.

For example, the initial value of the warning range is set according to the size of the monitoring target in which the detection device 56 is installed. For example, the correction value of the warning range is set according to the analysis result of the image captured by the monitoring device 50-1. In the example of FIG. 39, the warning range of the detection device 56 with the identification number 16 changes depending on the size of the material suspended by the hook. For example, the monitoring device 50-1 detects the detection device 56 to which the warning is to be sent based on the warning range obtained by adding the correction value to the initial value.

In the present application example, the warning range is updated according to the substantial size of the monitoring target. Therefore, according to the present application example, it is possible to more accurately grasp the substantial positional relationship of the monitoring target.

Application Example 3

Figure 40:
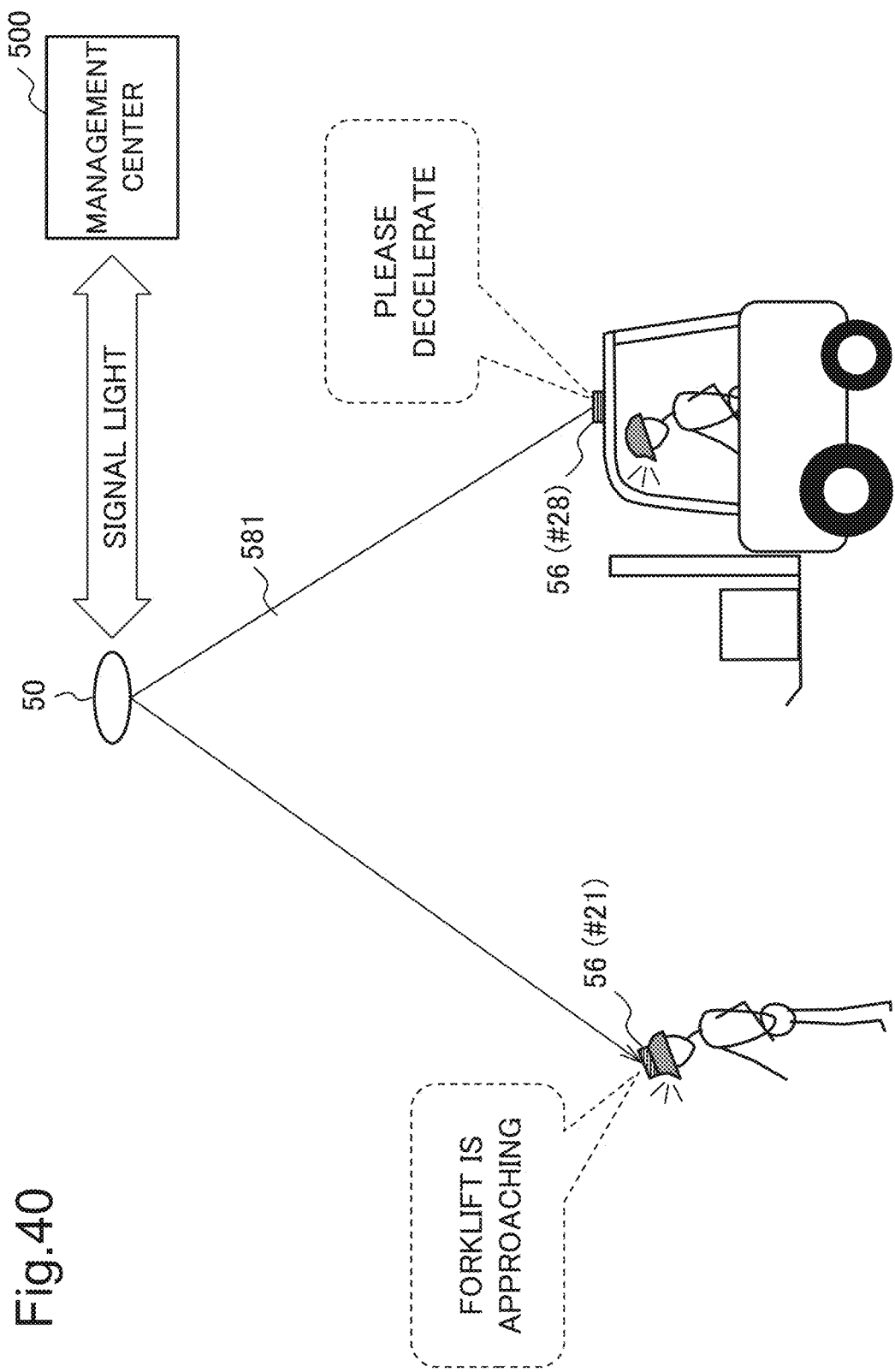
FIG. 40 is a conceptual diagram illustrating an example of a management system of Application Example 3.

FIG. 40 is a conceptual diagram for explaining Application Example 3. Application Example 3 is different from Application Example 1 in that a notification according to the positional relationship of the monitoring target is notified to the detection device.

In the example of FIG. 40, detection devices 56 with the identification numbers 21 and 28 are located in a monitored space 581 monitored by the monitoring device 50. The monitoring device 50 transmits the communication light including the notification according to the positional relationship to the detection devices 56 with the identification numbers 21 and 28.

The monitoring device 50 transmits communication light for notifying the detection device 56 with the identification number 21 that a forklift is approaching. The detection device 56 with the identification number 21 emits a voice notifying that "forklift is approaching". The worker wearing the detection device 56 with the identification number 21 recognizes that a forklift is approaching based on a voice "forklift is approaching" from the detection device 56.

The monitoring device 50 transmits communication light for notifying the detection device 56 with the identification number 28 of deceleration. The detection device 56 with the identification number 28 emits a voice "please decelerate". A worker who drives a forklift in which the detection device 56 with the identification number 28 is mounted recognizes that it is better to decelerate based on a voice "please decelerate" from the detection device 56.

According to the present application example, each detection device is notified of a notification according to a situation such as a size, a state, and a positional relationship of a monitoring target. Therefore, according to the present application example, an appropriate notification can be sent to the monitoring target according to the situation of the monitoring target.

Application Example 4

Figure 41:
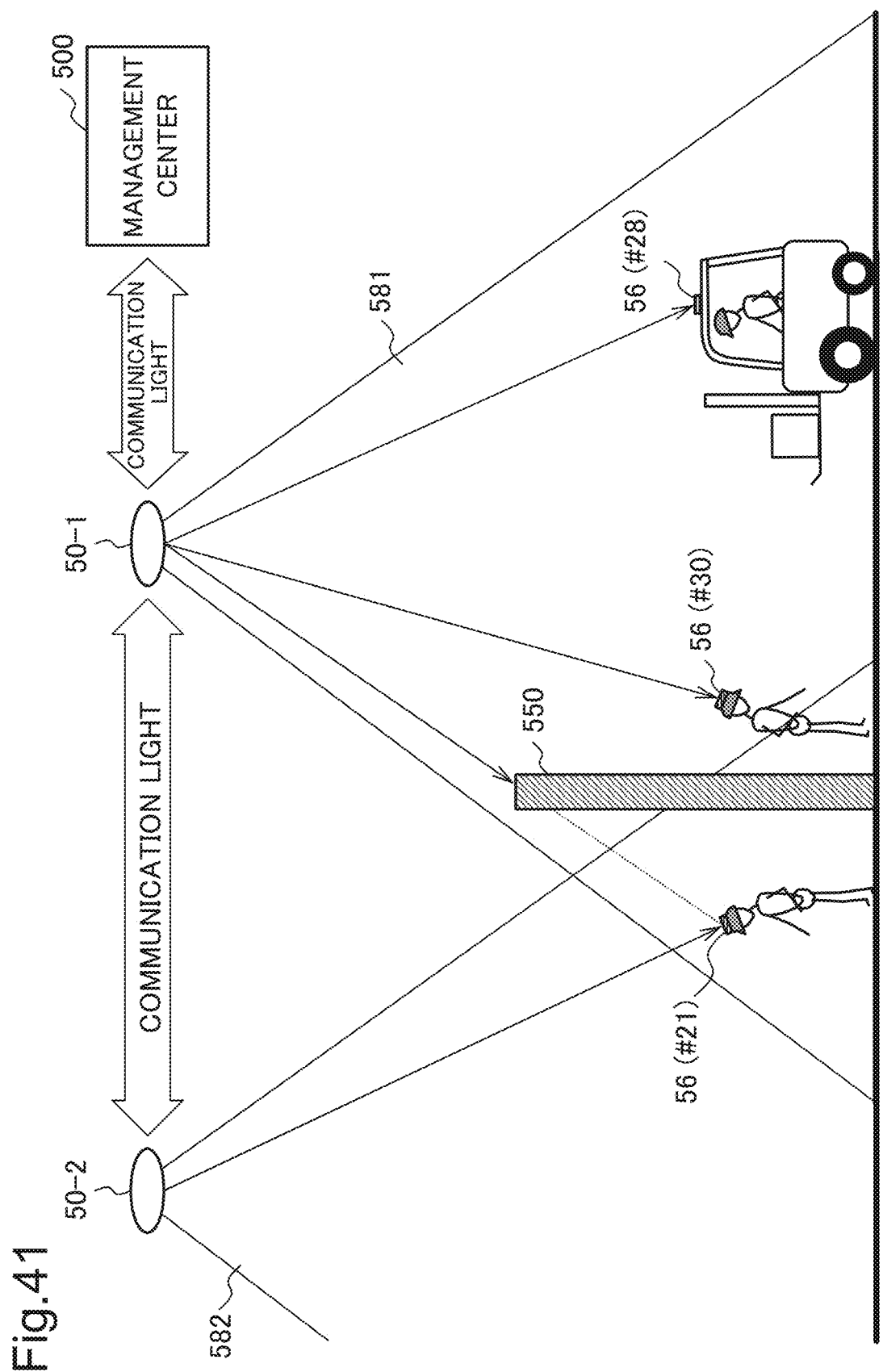
FIG. 41 is a conceptual diagram illustrating an example of a management system of Application Example 4.

FIG. 41 is a conceptual diagram for explaining Application Example 4. Application Example 4 is different from Application Example 1 in that a plurality of monitoring devices 50 cooperate each other.

In the present application example, monitoring devices 50-1 and 50-2 that communicate with each other by communication light are used. The monitoring device 50-1 also communicates with the management center 500 by communication light. The detection devices 56 with the identification numbers 21, 28, and 30 are located in a monitored space 581 monitored by the monitoring device 50-1. The detection device 56 with the identification number 21 is shielded by an obstacle 550 and is not detected by the monitoring device 50-1. However, the detection device 56 with the identification number 21 is located in the monitored space 582 monitored by the monitoring device 50-2. Therefore, when the monitoring device 50-1 and the monitoring device 50-2 cooperate with each other, all detection devices 56 located in the monitored space 581 and the monitored space 582 can be identified.

According to the present application example, by cooperation of a plurality of monitoring devices, it is possible to manage a detection device that is located in a monitored space of any of the monitoring devices but cannot be directly detected from the monitoring device.

(Hardware)

Here, a hardware configuration for executing processing of the control system (the monitoring control unit 12, the detection control unit 380, and the like) according to each example embodiment will be described using an information processing apparatus 90 of FIG. 42 as an example. The information processing apparatus 90 in FIG. 42 is a configuration example for performing processing of the control system of each example embodiment, and does not limit the scope of the present invention.

Figure 42:
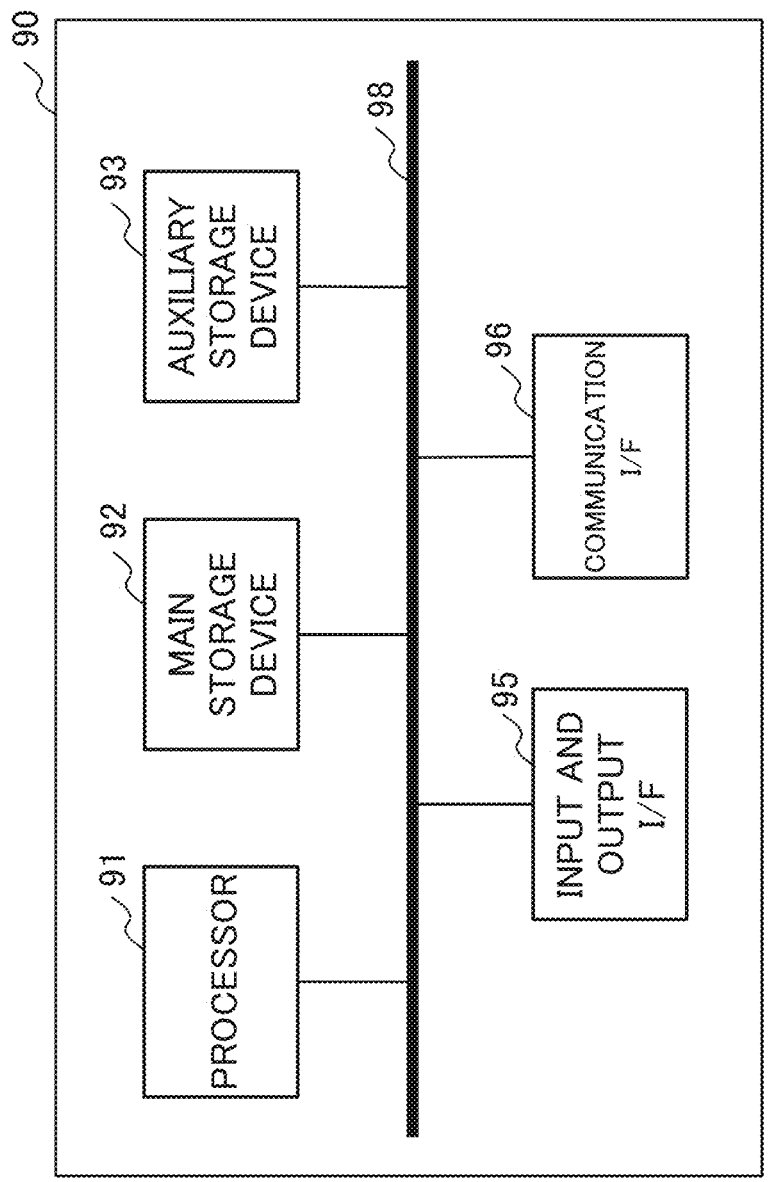
FIG. 42 is a block diagram illustrating an example of a hardware configuration that achieves a control system according to each example embodiment.

As illustrated in FIG. 42, the information processing apparatus 90 includes a processor 91, a main storage device 92, an auxiliary storage device 93, an input and output interface 95, and a communication interface 96. In FIG. 42, the interface is abbreviated as I/F. The processor 91, the main storage device 92, the auxiliary storage device 93, the input and output interface 95, and the communication interface 96 are data-communicably connected to each other via a bus 98. The processor 91, the main storage device 92, the auxiliary storage device 93, and the input and output interface 95 are connected to a network such as the Internet or an intranet via the communication interface 96.

The processor 91 develops the program stored in the auxiliary storage device 93 or the like in the main storage device 92 and performs the developed program. In the present example embodiment, it is sufficient that a software program installed in the information processing apparatus 90 is used. The processor 91 performs processing by the control system according to the present example embodiment.

The main storage device 92 has a region in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Various data may be stored in the main storage device 92, and the auxiliary storage device 93 may be omitted.

The input and output interface 95 is an interface for connecting the information processing apparatus 90 and a peripheral device. The communication interface 96 is an interface for connecting to an external system or device through a network such as the Internet or an intranet based on a standard or a specification. The input and output interface 95 and the communication interface 96 may be shared as an interface connected to an external device.

An input device such as a keyboard, a mouse, or a touch panel may be connected to the information processing apparatus 90 as necessary. These input devices are used to input information and settings. When a touch panel is used as an input device, it is sufficient that the display screen of the display device serves as an interface of the input device. It is sufficient that data communication between the processor 91 and the input device is mediated by the input and output interface 95.

The information processing apparatus 90 may be provided with a display device for displaying information. When a display device is provided, the information processing apparatus 90 preferably includes a display control device (not illustrated) for controlling display of the display device. The display device may be connected to the information processing apparatus 90 via the input and output interface 95.

The above is an example of a hardware configuration for enabling processing by the control system according to each example embodiment. The hardware configuration of FIG. 42 is an example of a hardware configuration for performing processing by the control system according to each example embodiment, and does not limit the scope of the present invention. A program for causing a computer to execute processing by the control system according to each example embodiment is also included in the scope of the present invention. A recording medium in which a program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card, a magnetic recording medium such as a flexible disk, or another recording medium.

The components of the control system of each example embodiment can be arbitrarily combined. The components of the control system of each example embodiment may be achieved by software or may be achieved by a circuit.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-039649 filed on Mar. 9, 2020, the disclosure of which is incorporated herein in its entirety by reference.

REFERENCE SIGNS LIST 1 management system
10, 20, 30, 50 monitoring device
11, 21, 31 projector
12, 22, 32 monitoring control unit
13, 23, 33 projection control unit
14, 24, 34 reflected light receiver
15, 25, 35 identification unit
16, 26, 36, 56 detection device
120, 220 light source
121, 221, 251, 321, 351 emitter
123, 223, 253, 323, 353 collimator
130, 230, 330 spatial light modulator
131, 331 projection condition storage unit
132, 332 projection condition setting unit
133, 333 modulator control unit
134, 334 light source control unit
140, 240, 340 projection optical system
141 filter
142 lens
143 two-dimensional sensor
144 converter
145 image processing unit
146, 246, 346 Fourier transform lens
147, 247, 347 aperture
148, 248, 348 projection lens
151 reflected light detection unit
152 imaging control unit
153 identification information identification unit
154 identification information storage unit
161, 361 shutter
162, 362 reflector
163, 363 receiver
164, 364 opening and closing control unit
165, 365 opening and closing condition storage unit
190 retroreflector
191 substrate
192 spherical bead
193 focus layer
194 reflection layer
224 half mirror
254 mirror
320 first light source
324 polarization prism
325 liquid crystal element
335 light source modulation unit
350 second light source
360 helmet
366 notification control unit
370 notifier
371 first notifier
372 second notifier
380 detection control unit
500 management center
510 display device

What is claimed is:

1. The management system comprising:
a monitoring device that projects detection light for detecting a monitoring target to identify the monitoring target based on a detection pattern of reflected light of the detection light; and
at least one detection device that is installed on the monitoring target, receives the detection light projected by the monitoring device, and reflects the detection light at a timing set to the detection device in a predetermined period starting from a timing at which the detection light is received, wherein
the monitoring device includes
a projector including a light source that emits light having a wavelength in an infrared region, and a spatial light modulator including a display part irradiated with the light emitted from the light source,
a reflected light receiver that receives the reflected light,
at least one memory storing instructions, and
at least one processor connected to the at least one memory and configured to execute the instructions to
control the spatial light modulator to set a pattern to be displayed on the display part,
control the light source to set an irradiation timing of light to be emitted to the display part, and
identify, in response to the reception of the reflected light by the reflected light receiver, an identification number of the detection device at a position where the reflected light is detected based on a detection pattern of the reflected light at the position where the reflected light is detected in the predetermined period starting from a timing at which the reflected light is detected.

2. The management system according to claim 1, wherein the detection device includes
a receiver that receives the detection light projected from the monitoring device,
a reflector that retroreflects the detection light projected from the monitoring device,
a shutter opened and closed to control incidence of light on the reflector,
an opening and closing condition storage that stores an opening and closing condition of the shutter according to an identification number set in the detection device,
an opening and closing controller that opens and closes the shutter based on the opening and closing condition stored in the opening and closing condition storage in the predetermined period starting from a timing at which the receiver receives the detection light.

3. The management system according to claim 2, wherein the opening and closing controller of the detection device opens and closes the shutter in an arrangement order of logical values of bits in which the identification number set in the detection device is expressed in a binary number in the predetermined period starting from the timing at which the detection light is received, and
the monitoring device includes
at least one memory storing instructions, and
at least one processor connected to the at least one memory and configured to execute the instructions to
identify an identification number of the detection device at a plurality of positions where the reflected light is detected based on a detection pattern of the reflected light at the plurality of positions where the reflected light is detected.

4. The management system according to claim 3, wherein the at least one processor of the monitoring device is configured to execute the instructions to p1 identify the identification numbers of the plurality of the detection device at the positions where the reflected light is detected based on the detection pattern of the reflected light at the plurality of positions where the reflected light is detected, and
output detection information including a positional relationship among the plurality of the detection device.

5. The management system comprising:
a monitoring device that projects detection light for detecting a monitoring target to identify the monitoring target based on a detection pattern of reflected light of the detection light; and
at least one detection device that is installed on the monitoring target, receives the detection light projected by the monitoring device, and reflects the detection light at a timing set to the detection device in a predetermined period starting from a timing at which the detection light is received, wherein
the monitoring device includes
a projector including a light source that emits light having a wavelength in an infrared region and a visible region, and a spatial light modulator including a display part irradiated with the light emitted from the light source,
a reflected light receiver that receives the reflected light,
at least one memory storing instructions, and
at least one processor connected to the at least one memory and configured to execute the instructions to
control the spatial light modulator to set a pattern to be displayed on the display part,
control the light source to set an irradiation timing of light having a wavelength in an infrared region to be emitted to the display part to project the detection light,
identify, in response to the reception of the reflected light by the reflected light receiver, an identification number of the detection device at a position where the reflected light is detected based on a detection pattern of the reflected light at a position where the reflected light is detected in the predetermined period starting from a timing at which the reflected light is detected,
issue, in response to the identification of the identification number of the detection device, an instruction to display display-information according to the identification number of the detection device that has been identified in a vicinity of the detection device,
control, in response to the instruction to display the display-information, the spatial light modulator to set a pattern for projecting projection light for displaying the display-information near the detection device on the display part, and
control the light source to set an irradiation timing of light having a wavelength in a visible region that is emitted to the display part.

6. The management system according to claim 5, wherein the at least one processor is configured to execute the instructions to
issue, in response to the identification of the identification numbers of a plurality of the detection device, an instruction to display the display-information including notification contents according to a positional relationship among the plurality of the detection device that has been identified in a vicinity of the detection device,
control, in response to the instruction to display the display-information, the spatial light modulator to set a pattern for projecting projection light for displaying the display-information near the detection device on the display part, and
control the light source to set an irradiation timing of light having a wavelength in a visible region to be emitted to the display part.

7. The management system according to claim 5, wherein the at least one processor is configured to execute the instructions to
issue, in response to the identification of the numbers of a plurality of the detection device, an instruction to display the display-information including a warning according to a space between at least two of the detection device in a vicinity of the detection device,
control, in response to an instruction to display the display-information, the spatial light modulator to set a pattern for projecting projection light for displaying the display-information including the warning near the detection device in the display part, and
control the light source to set an irradiation timing of light having a wavelength in a visible region to be emitted to the display part.

8. The management system according to claim 5, wherein the detection device includes
a receiver that receives the detection light projected from the monitoring device,
a reflector that retroreflects the detection light projected from the monitoring device,
a shutter opened and closed to control incidence of light on the reflector,
an opening and closing condition storage that stores an opening and closing condition of
the shutter according to an identification number set in the detection device,
an opening and closing controller that opens and closes the shutter based on the opening and closing condition stored in the opening and closing condition storage in the predetermined period starting from a timing at which the receiver receives the detection light.

9. The management system according to claim 8, wherein the opening and closing controller of the detection device opens and closes the shutter in an arrangement order of logical values of bits in which the identification number set in the detection device is expressed in a binary number in the predetermined period starting from the timing at which the detection light is received, and
the monitoring device includes
at least one memory storing instructions, and
at least one processor connected to the at least one memory and configured to execute the instructions to
identify an identification number of the detection device at a plurality of positions where the reflected light is detected based on a detection pattern of the reflected light at the plurality of positions where the reflected light is detected.

10. The management system according to claim 9, wherein
the at least one processor of the monitoring device is configured to execute the instructions to
identify the identification numbers of the plurality of the detection device at the positions where the reflected light is detected based on the detection pattern of the reflected light at the plurality of positions where the reflected light is detected, and
output detection information including a positional relationship among the plurality of the detection device.

11. The management system comprising:
a monitoring device that projects detection light for detecting a monitoring target to identify the monitoring target based on a detection pattern of reflected light of the detection light; and
at least one detection device that is installed on the monitoring target, receives the detection light projected by the monitoring device, and reflects the detection light at a timing set to the detection device in a predetermined period starting from a timing at which the detection light is received, wherein the monitoring device includes, a projector including a first light source that emits light having a wavelength in an infrared region at a first output, a second light source that emits light having a wavelength in an infrared region at a second output lower than the first output, and a spatial light modulator including a display part irradiated with the light emitted from the first light source and the second light source, a reflected light receiver that receives the reflected light, at least one memory storing instructions, at least one processor connected to the at least one memory and configured to execute the instructions to control the spatial light modulator to set a pattern to be displayed on the display part, control the first light source to set an irradiation timing of light to be emitted to the display part to project the detection light, identify, in response to the reception of the reflected light by the reflected light receiver, an identification number of the detection device at a position where the reflected light is detected based on a detection pattern of the reflected light at the position where the reflected light is detected in the predetermined period starting from a timing at which the reflected light is detected, issue, in response to the identification of the identification number of the detection device, an instruction to project communication light according to the identification number of the detection device that has been identified, and control, in response to the instruction to project communication light, the spatial light modulator to set a pattern for projecting the communication light to the detection device in the display part, and control the second light source to set an irradiation timing of light that is emitted to the display part.

12. The management system according to claim 11, wherein the detection device includes a notifier that makes a notification according to notification contents of the communication light, the at least one processor is configured to execute the instructions to issue, in response to the identification of the identification number of a plurality of the detection device, an instruction to project the communication light including notification contents according to a positional relationship among the plurality of the detection device that has been identified to the detection device, control, in response to the instruction to project the communication light, the spatial light modulator to set a pattern for projecting the communication light to the detection device in the display part, and control the second light source to set an irradiation timing of light to be emitted to the display part.

13. The management system according to claim 11, wherein the detection device includes a receiver that receives the detection light projected from the monitoring device, a reflector that retroreflects the detection light projected from the monitoring device, a shutter opened and closed to control incidence of light on the reflector, an opening and closing condition storage that stores an opening and closing condition of the shutter according to an identification number set in the detection device, an opening and closing controller that opens and closes the shutter based on the opening and closing condition stored in the opening and closing condition storage in the predetermined period starting from a timing at which the receiver receives the detection light.

14. The management system according to claim 13, wherein the opening and closing controller of the detection device opens and closes the shutter in an arrangement order of logical values of bits in which the identification number set in the detection device is expressed in a binary number in the predetermined period starting from the timing at which the detection light is received, and the monitoring device includes at least one memory storing instructions, and at least one processor connected to the at least one memory and configured to execute the instructions to identify an identification number of the detection device at a plurality of positions where the reflected light is detected based on a detection pattern of the reflected light at the plurality of positions where the reflected light is detected.

15. The management system according to claim 14, wherein the at least one processor of the monitoring device is configured to execute the instructions to identify the identification numbers of the plurality of the detection device at the positions where the reflected light is detected based on the detection pattern of the reflected light at the plurality of positions where the reflected light is detected, and output detection information including a positional relationship among the plurality of the detection device.

* * * * *